US012214389B2

(12) United States Patent
Schneider et al.

(10) Patent No.: US 12,214,389 B2
(45) **Date of Patent: *Feb. 4, 2025**

(54) AUTO-INDEXING LANCE POSITIONER APPARATUS AND SYSTEM

(71) Applicant: STONEAGE, INC., Durango, CO (US)

(72) Inventors: Joseph A. Schneider, Durango, CO (US); Adam Christopher Markham, Durango, CO (US); Scott Howell, Durango, CO (US); Daniel Szabo, Durango, CO (US); Cody Montoya, Aztec, NM (US); Jeffery R. Barnes, Ignacio, CO (US); Cooper Hanley, Durango, CO (US)

(73) Assignee: STONEAGE, INC., Durango, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,935

(22) Filed: Aug. 28, 2023

(65) Prior Publication Data

US 2023/0405646 A1 Dec. 21, 2023

Related U.S. Application Data

(63) Continuation of application No. 18/075,186, filed on Dec. 5, 2022, now Pat. No. 11,738,378, which is a (Continued)

(51) Int. Cl.

*B08B 9/043* (2006.01)
*B08B 9/047* (2006.01)
(Continued)

(52) U.S. Cl.

CPC ............ *B08B 9/0433* (2013.01); *B08B 9/047* (2013.01); *F28G 1/163* (2013.01); *F28G 15/04* (2013.01);
(Continued)

(58) Field of Classification Search

CPC ......... B08B 9/047; B08B 9/0433; B08B 9/04; F28G 1/163; F28G 15/04; F28G 15/003; F28G 15/08

See application file for complete search history.

(56) References Cited

U.S. PATENT DOCUMENTS 4,576,123 A * 3/1986 Lahoda ................. F28G 15/003 122/382
4,891,767 A * 1/1990 Rzasa .................... B25J 9/1692 901/30

(Continued)

*Primary Examiner* — Benjamin L Osterhout
(74) *Attorney, Agent, or Firm* — Stephen Y. Liu; Carstens, Allen & Gourley, LLP

(57) ABSTRACT

A system and an apparatus for positioning a plurality of flexible cleaning lances through tubes penetrating a tube sheet of a heat exchanger tube sheet, includes a smart lance tractor drive, a controller, and a tumble box connected to the controller operable to generate and/or distribute electrical power to the AC induction sensor from an air pressure source, supply electrical power to the controller and distribute pneumatic power to pneumatic motors for positioning the tractor drive on the positioner frame. The smart tractor drive includes sensors for detection of mismatch between expected and actual lance positions, sense lance insertion distance and lance removal and provide automated drive reversal operation to remove blockages within tubes being cleaned.

20 Claims, 51 Drawing Sheets

Related U.S. Application Data continuation of application No. 17/004,934, filed on Aug. 27, 2020, now Pat. No. 11,517,947, which is a continuation-in-part of application No. 16/662,762, filed on Oct. 24, 2019, now Pat. No. 11,441,856.

(60) Provisional application No. 62/751,423, filed on Oct. 26, 2018.

(51) Int. Cl.

| | |
|---|---|
| ***F28G 1/16*** | (2006.01) |
| ***F28G 15/04*** | (2006.01) |
| *B08B 9/04* | (2006.01) |
| *F28G 15/00* | (2006.01) |
| *F28G 15/08* | (2006.01) |

(52) U.S. Cl.

CPC .............. *B08B 9/04* (2013.01); *F28G 15/003* (2013.01); *F28G 15/08* (2013.01)

(56) References Cited

U.S. PATENT DOCUMENTS

| | | | | | |
|---|---|---|---|---|---|
| 5,398,560 | A * | 3/1995 | Zollingger | G21C 17/017 | 73/865.8 |
| 6,681,839 | B1 * | 1/2004 | Balzer | F28G 15/04 | 165/95 |
| 7,846,260 | B2 * | 12/2010 | Jiang | F28B 11/00 | 134/167 R |
| 8,057,607 | B2 * | 11/2011 | Gardner | F28G 15/003 | 134/167 C |
| 8,308,869 | B2 * | 11/2012 | Gardner | B08B 9/04 | 134/166 C |
| 8,524,011 | B2 * | 9/2013 | Gardner | B08B 9/0433 | 134/169 C |
| 8,526,012 | B1 * | 9/2013 | Schuster | G01B 11/245 | 356/612 |
| 9,336,585 | B2 * | 5/2016 | Zilberman | G06T 7/0004 | |
| 11,517,947 | B2 * | 12/2022 | Schneider | B08B 9/0433 | |
| 11,738,378 | B2 * | 8/2023 | Schneider | B08B 9/0433 | 134/22.12 |
| 2009/0255557 | A1 * | 10/2009 | Gardner | F28G 3/163 | 701/25 |
| 2012/0055512 | A1 * | 3/2012 | Gardner | B08B 9/0433 | 134/18 |
| 2012/0055520 | A1 * | 3/2012 | Gardner | F28G 1/163 | 134/167 C |
| 2012/0162408 | A1 * | 6/2012 | Zilberman | G06T 7/0004 | 348/125 |
| 2014/0109936 | A1 * | 4/2014 | Gromes, Sr. | F28G 15/003 | 134/18 |
| 2015/0068563 | A1 * | 3/2015 | Gzym | F28G 15/003 | 134/167 C |
| 2016/0025432 | A1 * | 1/2016 | Mathis | F16L 3/223 | 248/68.1 |
| 2016/0129552 | A1 * | 5/2016 | Gromes, Sr. | G06F 3/01 | 700/282 |
| 2016/0243597 | A1 * | 8/2016 | Shawver | F28G 15/02 | |
| 2017/0102195 | A1 * | 4/2017 | Watkins | F28G 3/163 | |
| 2017/0307312 | A1 * | 10/2017 | Wall | G01S 17/04 | |
| 2017/0321976 | A1 * | 11/2017 | Barnes | F28G 15/02 | |
| 2017/0356702 | A1 * | 12/2017 | Gromes, Sr. | B24C 7/0015 | |
| 2020/0056851 | A1 * | 2/2020 | Watkins | F28G 15/04 | |

* cited by examiner

AUTO-INDEXING LANCE POSITIONER APPARATUS AND SYSTEM

CROSS REFERENCE TO RELATED APPLICATIONS

This application is a continuation of U.S. patent application Ser. No. 18/075,186 filed Dec. 5, 2022, which is a continuation application of U.S. patent application Ser. No. 17/004,934 filed Aug. 27, 2020 now U.S. Pat. No. 11,517,947 issued on Dec. 6, 2022, which is a continuation-in-part application of U.S. patent application Ser. No. 16/662,762 filed Oct. 24, 2019 now U.S. Pat. No. 11,441,856 issued on Sep. 13, 2022, which claims the benefit of priority of U.S. Provisional Application Ser. No. 62/751,423 filed Oct. 26, 2018, all of which are incorporated herein by reference in their entirety.

BACKGROUND OF THE DISCLOSURE

The present disclosure is directed to high pressure waterblasting lance positioning systems. Embodiments of the present disclosure are directed to an apparatus and a system for aligning one or more flexible tube cleaning lances in registry with tube openings through a heat exchanger tube sheet.

One auto-indexing system is described in US Patent Publication No. 20170307312 by Wall et. al. This system includes optical scanning, cleaning and inspecting tubes of a tube bundle in a heat exchanger. It involves use of a laser or LED optical scanner for scanning the surface of the tube sheet to locate the holes or locate holes from a predetermined map. Once the hole location is determined, the cleaner is positioned over the hole and the tube cleaned.

Another apparatus for a tube sheet indexer is disclosed in US Patent Publication 20170356702. This indexer utilizes a pre-learned hole pattern to identify location of subsequent holes once a particular hole location is sensed. This is because tube sheet hole penetrations are typically spaced apart at known locations from each other in either or both an x direction or y location. However, in some circumstances a hole location may be plugged or capped. Hence not always are the hole locations accurate or precise for accurate positioning of a flexible lance drive. Furthermore, an interference sensor must be used in addition to displacement sensors in order to ascertain accurate hole locations.

In some cases a camera may be utilized to optically learn and map the tube sheet faceplate arrangement in advance. However, such optical sensors require an unobstructed view of the tube sheet face and therefore cannot be utilized while the apparatus is in use. Further, optical sensors are very sensitive to light and shadows which can significantly affect the reliability of such scanning in adverse lighting conditions. The tube sheet face may also be caked with built up carbon, bitumen or other materials and therefore must be cleansed of such substances prior to use of optical sensors. Hence the tube sheet must first be cleaned of debris and the mapping must be done prior to tube cleaning operations. What is needed, therefore, is a system that can accurately sense and position a flexible lance drive apparatus in registry with each of a plurality of unplugged tube sheet holes without need of camera or an optical sensor for hole location and without resort to referencing to a predetermined map.

Conventional high pressure waterblasting equipment and systems also require an operator to activate high pressure fluid dump valves to divert high pressure fluid safely in the event of an equipment malfunction. Such systems often include a "deadman" switch or foot operated lever that must be actuated to stop the high pressure pump and/or dump/divert high pressure fluid to atmosphere or to a suitable container. These switches typically must be continuously depressed or held in order to permit high pressure fluid to be directed through the lance hose to the object being cleaned. When an event occurs requiring diversion or dump of high pressure fluid, it may take a second or two for the operator to react and release such a switch. Furthermore, it takes a finite amount of time for high pressure fluid pressure to decrease to atmospheric pressure. During such reaction and decay time, the high pressure fluid may still cause damage in the event of an unexpected malfunction. Therefore, there is a need for a smart system that can sense such events and dump or divert high pressure fluid pressure quickly in order to reduce these delays as much as possible.

SUMMARY OF THE DISCLOSURE

The present disclosure directly addresses such needs. The embodiments described herein may be utilized with rigid (fixed) lances or flexible lances and lance hoses. One embodiment of a lance indexing drive positioning system in accordance with the present disclosure utilizes an AC (alternating current) pulse inductive coupling sensor array mounted at a distal end of a flexible lance guide tube fastened to the lance tractor drive apparatus. This type of inductive sensor is insensitive to fouling, dirt, or other debris or detritus that may be present on a heat exchanger tube sheet face, thus eliminating the need for preliminary cleaning of the heat exchanger tube sheet prior to installation of the system.

When the lance tractor drive is mounted on a lance positioner frame fastened to a heat exchanger tube sheet face, for example, the lance guide tube or tubes are aligned perpendicular to the plane of the tube sheet face. The distal end(s) of the guide tube(s) are spaced from the tube sheet face by a gap, which is preferably less than an inch, to minimize the range of unconfined water spray during cleaning operations.

The pulse induction sensor array is configured with a single transmit coil placed at the distal end of one or more of the lance guide tubes and a plurality of receive coils arranged around and within the vicinity of each transmit coil. An AC pulse through the transmit coil generates an AC magnetic field that, when it collapses, causes eddy currents to be formed in any conductive material in the volume of the produced magnetic field. These eddy currents cause a magnetic field of a reverse polarity to be generated which creates a voltage differential in the receive coils. The transmit coils are larger than the receive coils so as to create eddy currents in poorly conductive materials in a volume that is proportional to the size of the guide tube to which the transmit coil is mounted. The receive coils are much smaller in diameter and are spaced around the periphery of the transmit coil. In an exemplary embodiment of the present disclosure the transmit coil is positioned on and around the distal end of the guide tube and hence adjacent the gap between the guide tube and the face of the tube sheet. The receive coils are spaced apart and positioned to form a ring of coils around the distal end of the guide tube. The eddy currents sensed by the receive coils are amplified and processed in a comparator in order to detect the presence or absence of metallic material adjacent the receive coils hence the signal is used to determine tube location.

Embodiments of the system in accordance with the present disclosure also sense and track position of a flexible lance hose being fed through the lance tractor drive apparatus. In one exemplary embodiment, hose position encoders/sensors are located in the inlet hose stop block fastened to the hose inlet of the lance tractor drive apparatus. The position sensors may be wheels that engage the lance hose as it is fed through the tractor drive apparatus. Each wheel rotation causes a signal to be sent to a controller indicative of the distance traveled by the hose during that wheel rotation. Another set of encoders also sense hose stop clips or clamps, also known as "footballs", which are fastened to the high pressure lance hose, that signal the desired end of lance hose travel.

Such a lance tractor drive apparatus as described herein is essentially a smart tractor that, as part of the overall system, can provide a number of pieces of information to a data collection processor for subsequent analysis and utilization. For example one embodiment of a lance tractor drive apparatus described herein and its controller can provide current status, track machine operational status, as well as current status of the tubes being cleaned and can be used to predict status of each and every tube being cleaned. This data can be utilized to determine long term conditions of a heat exchanger, frequency of cleaning operations needed to optimize operation, and provide different job statistics that can be utilized to improve efficiencies, etc.

An exemplary embodiment in accordance with the present disclosure may alternatively be viewed as including a flexible high pressure fluid cleaning lance drive apparatus that includes a housing, at least one drive motor having a drive axle in the housing carrying a cylindrical spline drive roller, and a plurality of cylindrical guide rollers on fixed axles aligned parallel to the spline drive roller. A side surface of each guide roller and the at least one spline drive roller is tangent to a common plane between the rollers. An endless belt is wrapped around the at least one spline drive roller and the guide rollers. The belt has a transverse splined inner surface having splines shaped complementary to splines on the spline drive roller.

The drive apparatus further has a bias member supporting a plurality of follower rollers each aligned above one of the at least one spline drive roller and guide rollers, wherein the bias member is operable to press each follower roller toward one of the spline drive rollers and guide rollers to frictionally grip a flexible lance hose when sandwiched between the follower rollers and the endless belt. The apparatus includes a first sensor coupled to the drive roller for sensing position of the endless belt, a second sensor coupled to a first one of the follower rollers for sensing position of the first follower roller relative to a first flexible lance hose sandwiched between the first follower roller and the endless belt, and at least a first comparator coupled to the first and second sensors operable to determine a first mismatch between the first follower roller position and the endless belt position.

This embodiment of an apparatus in accordance with the present disclosure preferably further includes a third sensor coupled to a second one of the follower rollers for sensing position of the second one of the follower rollers relative to a second flexible lance hose sandwiched between the second one of the follower rollers and the endless belt. The exemplary apparatus also may include a second comparator operable to compare the second follower roller position to the endless belt position and determine a second mismatch between the second follower roller position and the endless belt position.

Preferably a controller is coupled to the first comparator and the second comparator operable to initiate an autostroke sequence of operations upon the first mismatch and second mismatch differing by a predetermined threshold. A fourth sensor may be coupled to a third one of the follower rollers for sensing position of the third one of the follower rollers relative to a third flexible lance hose sandwiched between the third one of the follower rollers and the endless belt. Also, a third comparator may be provided operable to compare the third follower roller position to the endless belt position and determine a third mismatch between the third follower roller position and the endless belt position. The controller is preferably coupled to the first comparator, the second comparator and the third comparator and is operable to initiate an autostroke sequence of operations upon any one of the first, second and third mismatches exceeding a predetermined threshold. Furthermore, the controller is preferably operable to modify clamping force if more than one of the first, second and third mismatches exceed a different predetermined threshold. The sensors utilized herein may be magnetic or Hall effect sensors and preferably include quadrature encoder sensors.

A flexible high pressure fluid cleaning lance drive apparatus in accordance with the present disclosure may comprise a housing, at least one drive motor having a drive axle in the housing carrying a cylindrical spline drive roller, a plurality of cylindrical guide rollers on fixed axles aligned parallel to the spline drive roller, and wherein a side surface of each guide roller and the at least one spline drive roller is tangent to a common plane between the rollers, an endless belt wrapped around the at least one spline drive roller and the guide rollers, the belt having a transverse splined inner surface having splines shaped complementary to splines on the spline drive roller, a bias member supporting a plurality of follower rollers each aligned above one of the at least one spline drive roller and guide rollers, wherein the bias member is operable to press each follower roller toward one of the spline drive rollers and guide rollers to frictionally grip a flexible lance hose when sandwiched between the follower rollers and the endless belt.

The apparatus includes a first sensor coupled to the drive roller for sensing endless belt position and a plurality of second sensors each coupled to one of the plurality of follower rollers each for sensing position of the one of the follower rollers relative to a flexible lance hose sandwiched between the one of the follower rollers and the endless belt. The apparatus preferably includes a first comparator coupled to the first sensor and each second sensor operable to determine a mismatch between each follower roller position and the endless belt position. The apparatus may further include a second comparator operable to compare each of the plurality of flexible lance hose positions with each other to determine another mismatch therebetween and a controller coupled to the second comparator operable to initiate an autostroke sequence of operations upon the another mismatch exceeding a predetermined threshold.

An apparatus in accordance with the present disclosure may alternatively be viewed as including a housing, at least one drive motor having a drive axle in the housing carrying a cylindrical drive roller, a plurality of cylindrical guide rollers on fixed axles aligned parallel to the drive roller, and wherein a side surface of each guide roller and the at least one drive roller is tangent to a common plane between the rollers, an endless belt wrapped around the at least one drive roller and the guide rollers, a bias member supporting a plurality of follower rollers each aligned above one of the at least one drive roller and guide rollers, wherein the bias member is operable to press each follower roller toward one of the drive rollers and guide rollers to frictionally grip a flexible lance hose when sandwiched between the follower rollers and the endless belt, a first sensor such as a magnetic quadrature encoder sensor coupled to the drive roller for sensing endless belt position, a plurality of second sensors such as magnetic quadrature encoder sensors each coupled to one of the plurality of follower rollers each for sensing position of the one of the follower rollers relative to a flexible lance hose sandwiched between the one of the follower rollers and the endless belt, a first comparator coupled to the first sensor and each second sensor operable to determine a mismatch between each follower roller position and the endless belt position, and a second comparator coupled to each of the second sensors operable to determine a mismatch between any two of the follower roller positions. The apparatus may also preferably include a controller coupled to the second comparator operable to initiate an autostroke sequence of operations upon the mismatch exceeding a predetermined threshold and may further include the controller being operable to initiate a change of clamp force or pressure if the mismatch between the follower roller positions and the belt position all or at least more than one, exceed a predetermined threshold.

An apparatus for cleaning tubes in a heat exchanger in accordance with the present disclosure may alternatively be viewed as including a lance positioner frame configured to be fastened to a heat exchanger tube sheet and a flexible lance drive fastenable to the frame configured for guiding a flexible cleaning lance from the lance drive into a tube penetrating through the tube sheet. The lance drive preferably has a follower roller riding on the flexible cleaning lance. This follower roller includes a sensor, such as a magnetic quadrature encoder that operates to provide roller position and direction of movement information for the flexible cleaning lance. The apparatus also includes a control box communicating with motors on the positioner frame and motors in the lance drive for controlling operation of the lance drive, a tumble box for converting air pressure to electrical power and for manipulating valves including a dump valve preferably contained within the tumble box for maintaining cleaning fluid pressure to the flexible cleaning lance when energized, wherein the electrical power is provided to components within the control box, the dump valve and the flexible lance drive, and a controller coupled to the follower roller sensor for sensing flexible lance position and sensing a reversal of flexible lance movement direction. This controller is operable to send a signal to the tumble box to actuate the dump valve to divert fluid pressure to atmosphere upon sensing the reversal of flexible lance hose direction.

Another embodiment of a flexible high pressure fluid cleaning lance tractor drive apparatus in accordance with the present disclosure includes a housing, at least one drive motor having a drive axle in the housing carrying a cylindrical spline drive roller, and a plurality of cylindrical guide rollers on fixed axles aligned parallel to the spline drive roller A side surface of each guide roller and the at least one spline drive roller is tangent to a common plane between the rollers and an endless belt is wrapped around the at least one spline drive roller and the guide rollers, the belt having a transverse splined inner surface having splines shaped complementary to splines on the spline drive roller. A bias member supporting a plurality of follower rollers are each aligned above one of the at least one spline drive roller and guide rollers. The bias member is operable to press each follower roller toward one of the spline drive rollers and guide rollers to frictionally grip at least one flexible lance hose when the at least one flexible lance hose is sandwiched between the follower rollers and the endless belt.

A lance position assembly is fastened to an inlet or rear wall of the housing. This lance position assembly includes a sensor roller having a roller portion adapted to engage the at least one flexible lance hose passing through the housing and a magnetic ring portion adjacent the roller portion. An idler roller is adapted to press against the flexible lance hose to maintain the lance hose engaged with the sensor roller, and a magnetic sensor module is fastened to the rear wall of the housing adjacent to the sensor roller that is operable to sense magnetic field fluctuations in the magnetic ring portion of the sensor roller as the sensor roller rolls along the flexible lance hose.

The magnetic ring portion is a multipole magnetic ring. The idler roller is pneumatically biased against the flexible lance hose. The lance position assembly preferably includes a second sensor roller for engaging a second flexible lance and a second idler roller adapted to press against the second flexible lance hose to maintain the second flexible lance hose engaged with the second sensor roller. Further, preferably the lance position assembly includes a third sensor roller for engaging a third flexible lance and a third idler roller adapted to press against the third flexible lance hose to maintain the third flexible lance hose engaged with the third sensor roller.

The magnetic sensor module is operable to separately sense magnetic field fluctuations in the first, second and third magnetic ring portions as the first, second, and third sensor rollers roll along each respective flexible lance hose. This magnetic sensor module sends sensed separate magnetic field fluctuation signals to the hand held controller for processing.

A crimp and lance stop assembly is removably fastened to the lance drive. This crimp and lance stop assembly includes an induction stop sensor having at least one bore therethrough fastened to a lance guide tube support receiving the at least one flexible lance hose therethrough. The induction stop sensor is adapted to sense presence of a flexible lance hose end crimp when the flexible lance hose end crimp enters the at least one bore. Preferably the induction stop sensor has three bores therethrough each configured to separately sense presence of a flexible lance hose end crimp entering the respective through bore.

A flexible lance hose stop element in accordance with the present disclosure is configured to be installed on a flexible lance hose being fed into and through a flexible lance drive apparatus described above. The hose stop element includes an elongated body configured to wrap around and grip a flexible lance hose. The elongated body has a first half and a second half removably fastenable together via threaded fasteners.

Each half has a cylindrical stop portion having a first outer diameter and a shoulder extension portion having a different outer diameter less than the first outer diameter to enable the shoulder extension portion to slidably extend within a stop block on a lance drive apparatus and prevent passage of the cylindrical stop portion into the stop block. The first half and the second half are identical in size and shape, and preferably the hose stop element has a shoulder portion between the cylindrical stop portion and the shoulder extension. This shoulder portion engages the stop block to prevent entry of the cylindrical stop portion into the stop block, and at least the shoulder extension portion is made of metal.

An embodiment in accordance with the present disclosure may be viewed as a flexible high pressure fluid cleaning lance tractor drive apparatus that includes a housing, at least one drive motor having a drive axle in the housing carrying a cylindrical spline drive roller, a plurality of cylindrical guide rollers on fixed axles aligned parallel to the spline drive roller. A side surface of each guide roller and the at least one spline drive roller is tangent to a common plane between the rollers, and an endless belt is wrapped around the at least one spline drive roller and the guide rollers.

The belt has a transverse splined inner surface having splines shaped complementary to splines on the spline drive roller. A bias member supports a plurality of follower rollers each aligned above one of the at least one spline drive roller and guide rollers, wherein the bias member is operable to press each follower roller toward one of the spline drive rollers and guide rollers to frictionally grip at least one flexible lance hose when the at least one flexible lance hose is sandwiched between the follower rollers and the endless belt. A crimp and lance stop assembly is removably fastened to the housing and includes an induction stop sensor having at least one bore therethrough fastened to a lance guide tube support receiving the at least one flexible lance hose therethrough, wherein the induction stop sensor is adapted to sense presence of a flexible lance hose end crimp when the flexible lance hose end crimp enters the at least one bore.

The induction stop sensor preferably has three bores therethrough each configured to separately sense presence of a flexible lance hose end crimp entering the respective through bore. The lance drive apparatus further preferably has a lance stop block fastened to an inlet wall of the housing configured to detect presence of a flexible lance hose stop element fastened to the at least one flexible lance hose. This lance stop block, fastened to the inlet wall of the housing, carries another induction sensor configured to detect the flexible lance hose stop element.

The flexible lance hose stop element comprises an elongated body configured to wrap around and grip a flexible lance hose, the elongated body having a first half and a second half removably fastenable together via threaded fasteners, each half having a cylindrical stop portion having a first outer diameter and a shoulder extension portion having a different outer diameter less than the first outer diameter to enable the shoulder extension portion to slidably extend within the stop block on the lance drive apparatus and prevent passage of the cylindrical stop portion into the stop block.

Further features, advantages and characteristics of the embodiments of this disclosure will be apparent from reading the following detailed description when taken in conjunction with the drawing figures.

DETAILED DESCRIPTION

Figure 1:
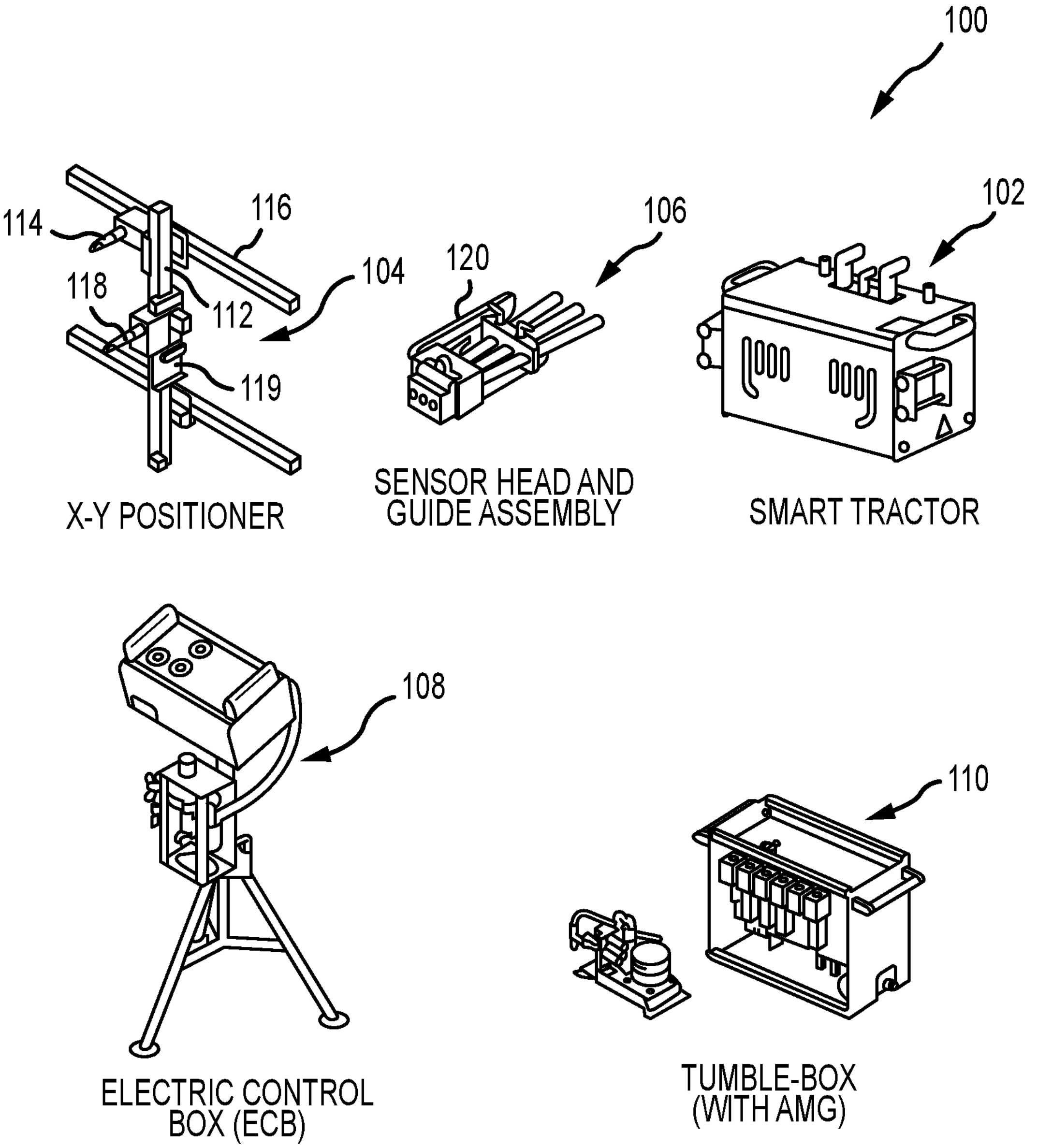
FIG. 1 is a diagram of an exemplary embodiment of the components of an auto-indexing lance positioning apparatus in accordance with the present disclosure.

FIG. 1 is a diagram of the major components of one autoindexing lance positioning apparatus in accordance with an exemplary embodiment of the present disclosure. The autoindexing lance positioning apparatus 100 includes a lance hose tractor drive 102, an x-y drive positioner frame 104, a flexible lance guide tube assembly 106, an electrical controller or control box 108 and an air-electric interface box known as a "tumble box" 110 connected together as described below. The lance hose tractor drive 102 is fastened to a vertical positioner rail 112 of the x-y positioner frame 104. This x-y positioner frame 104 has an air motor 114 that horizontally moves the vertical positioner rail 112 on a horizontal upper rail 116. The x-y positioner frame 104 also includes another air motor 118 that moves a carrier, or trolley 119 mounted on the vertical rail 112 of the x-y positioner frame 104. This trolley 119 supports the drive 102 and a guide assembly 106 for movement vertically on the rail 112.

Figure 3:
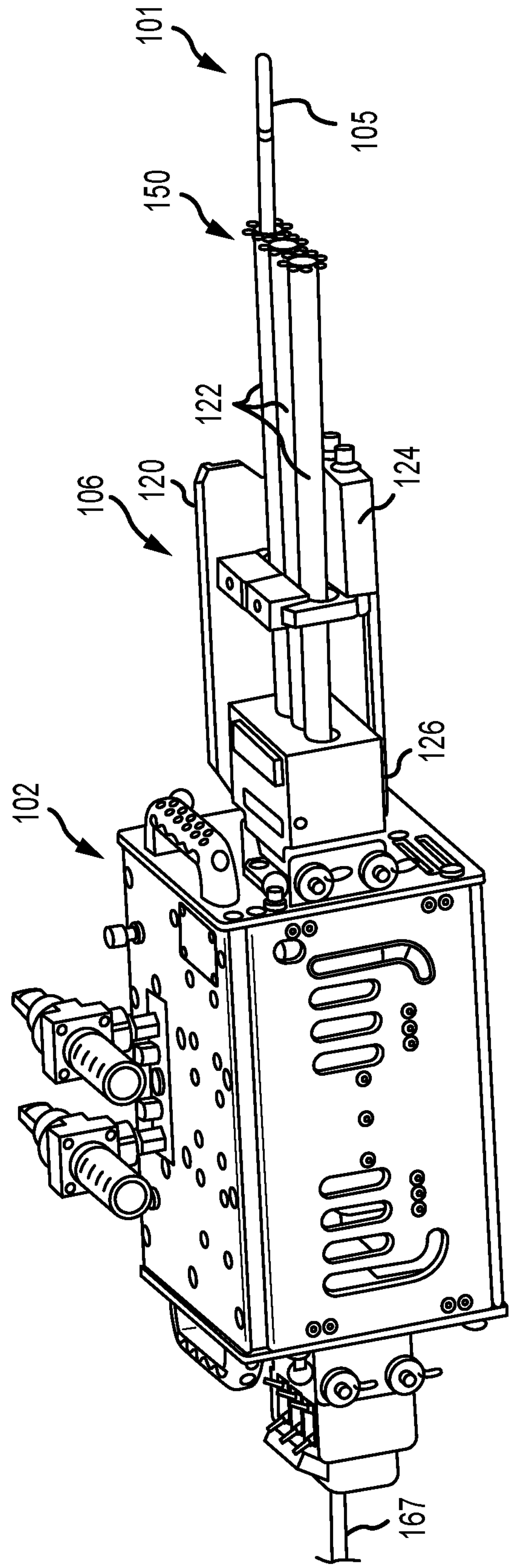
FIG. 3 is a perspective view of a flexible lance hose drive apparatus utilized in the autoindexing lance positioning apparatus in accordance with the present disclosure.

The lance hose drive 102 and the guide assembly 106 are separately shown in FIG. 3. The lance hose drive 102 may be configured to drive any number of flexible lances 101, each comprising a lance hose 167 coupled to a nozzle 105. The drive 102 may be a one, two, or three lance drive such as a ProDrive, an ABX2L or ABX3L available from StoneAge Inc. One example, an ABX3L, is described and shown here. The guide assembly 106 includes, in this exemplary embodiment 100, a set of three guide tubes 122 adjustably fastened to a bracket 120 fastened to the trolley 119 along with a sensor amplifier block 124 beneath the tubes 122 and fastened to the bracket 120. The tractor drive 102 is fastened to the bracket 120 via a hose stop collet or crimp encoder block 126 fastened to a rear end of the set of three guide tubes 122.

Figure 4:
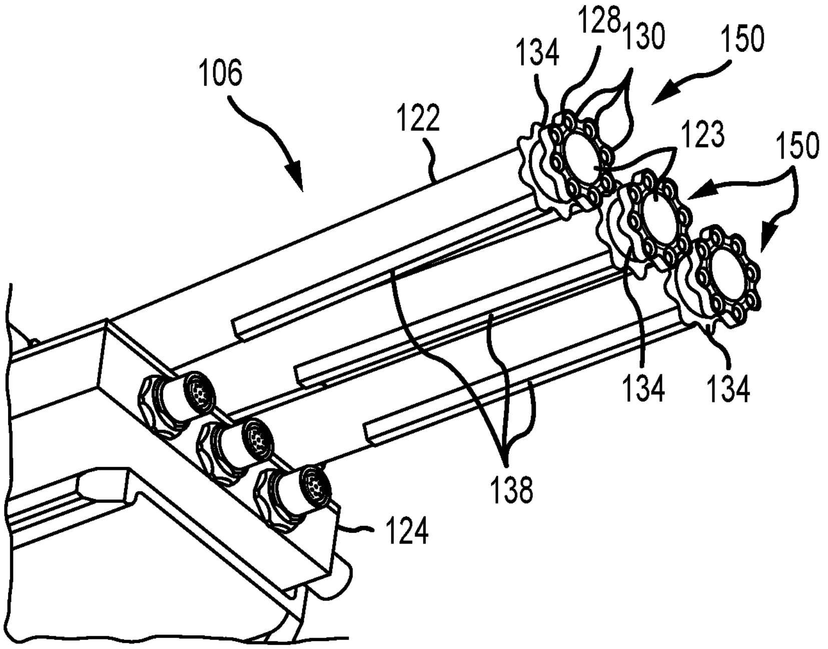
FIG. 4 is an enlarged guide tube end view of the lance hose drive apparatus shown in FIG. 3.

Each of the guide tubes 122 is an elongated cylindrical tube, preferably made of a metal, such as stainless steel, aluminum, brass, a durable plastic, or other rigid material with a high electrical resistivity. An AC pulse sensor 150 in accordance with the present disclosure is mounted at the distal end of each guide tube 122. An enlarged distal end of the tractor drive 102 and guide assembly 106 is shown in FIG. 4, showing the component arrangement of the AC pulse sensor 150. The distal end 123 of each tube 122 is fitted with a radial flange 128 having set of eight cup shaped receive coil locating cups 130 formed therein and arranged around the flange 128 with four cups 130 at cardinal positions (N, S, E, W) and four equidistantly spaced intermediate positions, thus each being 45 degrees displaced from each other around the distal end 123 of the tube 122. For a tube inside diameter of 1 inch, for example, the inside diameter of each of the cups 130 is about 0.25 inch or smaller.

Each of the cups 130 carries therein a receive coil 132. Alternatively, the receive coils 132 may each be wrapped around a locating pin on the flange 128 rather than being disposed in a cup 130 as shown. A transmit coil 134 is wound around the distal end of each tube 122 and adjacent the receive coil cups 130 such that the transmit coil 134 and receive coils 132 are closely coupled. One embodiment of each guide tube 122 may have a ceramic portion that interfaces with the metal of the guide tube 122 toward the distal end of the guide tube. This non-interfering ceramic portion distances the transmit coil 134 from the metal of the guide tube 122.

Figure 5:
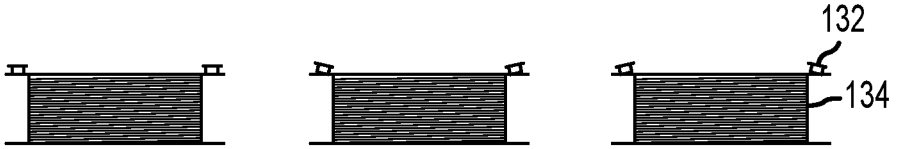
FIG. 5 is a simplified representation of the AC pulse sensor coils utilized to sense hole locations in a heat exchanger tube sheet with the apparatus in accordance with the present disclosure.

A simplified drawing of the coil arrangement is shown in FIG. 5. A 400 Hz AC pulse injected sensor array based around a single transmit coil 134 and multiple receive coils 132 is used in this exemplary embodiment. The transmit coil 134 is fed with an AC current pulse such that it generates a magnetic field 136 around it (shown in FIG. 6F). When this pulse is removed, the magnetic field 136 collapses. When field 136 collapses, eddy currents are formed in any conductive material in the volume of the produced magnetic field 136. These eddy currents cause a magnetic field of a reverse polarity to be generated in the receive coils which creates a voltage differential therein, generating a current, which is sent via wire to the sensor amplifier block 124. The transmit coils 134 are large so as to create eddy currents in poorly conductive materials in a volume that is proportional to the size of the guide tube 122. The receive coils 132 are much smaller than the transmit coil and are placed so as to detect only the eddy currents directly in front of them. The circular array of receive coils thereby creates a magnetic flux density image based on the array arrangement of receive coils 132.

The receive coils 132 are placed in specific balancing zones of the transmit coil's magnetic field. These zones are selected such that no induced voltage is generated in the receive coils 132 if no other conductive material or magnetic fields are in the proximity of the sensor head 150. The coils 132 can be tilted to increase sensitivity to eddy currents in specific locations of the sensed volume as shown in FIG. 5. In the left view, the receive coils 132 are arranged parallel to the axis of the transmit coil. In the middle view in FIG. 5, the receive coils are arranged tilted inward toward the axis through the transmit coil 134. This arrangement increases center resolution of the receive coil array. This allows the sensor array to be able to detect with resolution what is in front of the tube 122 at the end 123 of the guide tube 122 as well as baffles and obstructions perpendicular to the face of the transmit coil 134. The right view in FIG. 5 shows the receive coils tilted out away from the centerline of the transmit coil. In this arrangement, the receive coils 132 are tilted off the plane of the transmit coil. This increases resolution in areas not directly in front of the transmit coil 134.

Figure 6A:
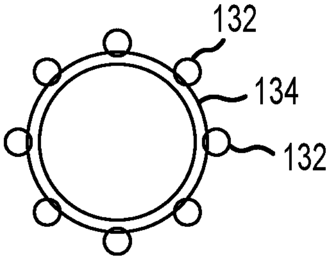
FIGS. 6A-6F are illustrations of the sensor receive coil arrangements in each of the sensors in accordance with the present disclosure.

An exemplary embodiment of one receive coil 132 arrangement is illustrated in FIG. 6A. Eight receive coils 132 are positioned around the end of the guide tube 122. As described above, the receive coils may be disposed within cups 130, as shown in FIG. 6A, or each may be wrapped around a locating pin on the flange 128.

In an alternative embodiment, the receive coils 132 may be printed on one or more printed circuit boards (PCBs) 152. The PCBs 152 containing the receive coils 132 are attached to the distal end of the guide tube 122 adjacent the transmit coil 134. The use of PCBs 152 allows for a variety of receive coil 132 shapes and lengths to be manufactured. The PCB 152 also provides mechanical stability to the potentially fragile receive coils 132.

Figure 6B:
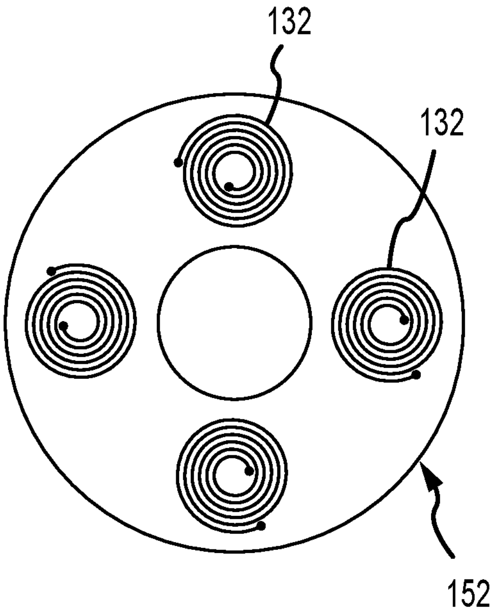
Figure 6E:
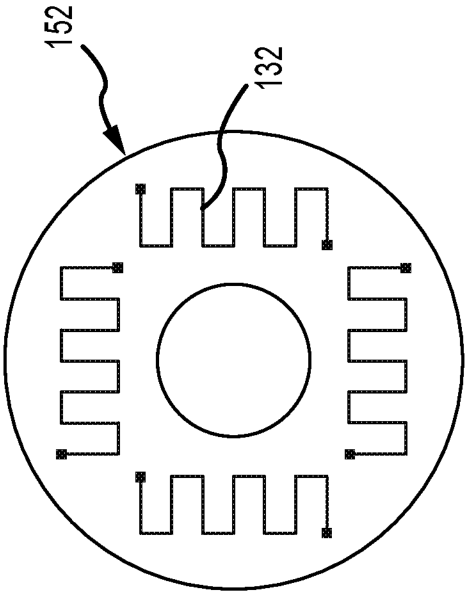
Figure 6F:
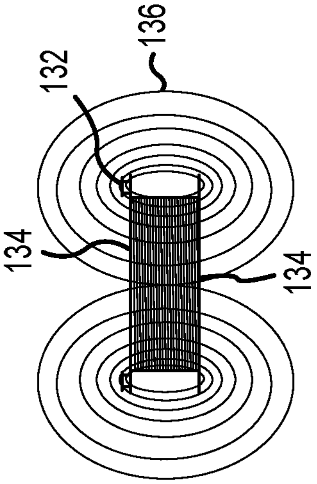
Figure 6C:
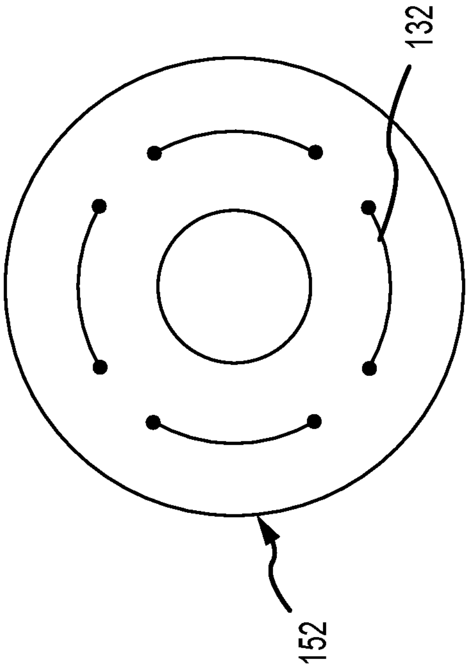
Figure 6D:
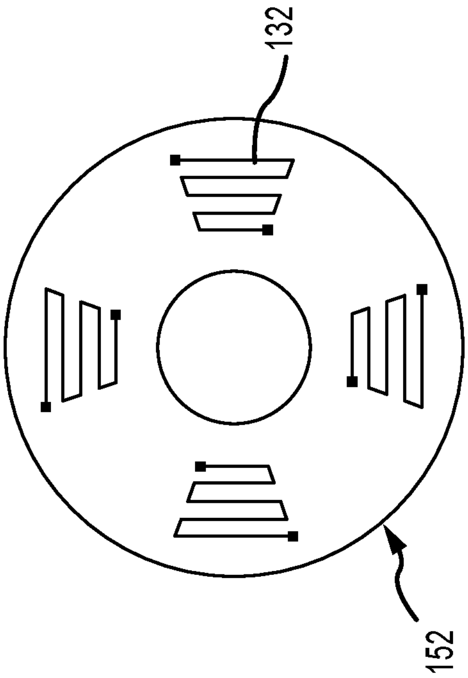

Various exemplary embodiments of receive coils 132 on PCBs 152 are shown in FIGS. 6B-6E. FIG. 6B illustrates four receive coils 132 each configured in an essentially flat spiral shape. FIG. 6C illustrates four receive coils 132 printed as curved lines. FIG. 6D illustrates four receive coils 132 each printed in a plane to form zig-zag lines with an overall trapezoidal shape. FIG. 6E illustrates four receive coils 132 each printed in a plane as zig-zag lines to form an overall rectangular shape. The receive coils 132 may also be printed in multiple layers within the PCB and can be printed in many additional shapes, and any number of receive coils 132 may be used. Preferably each receive coil 132 has a corresponding opposite receive coil 132 located across the from it on the PCB 152 (e.g. North-South and East-West positions). In preferred embodiments, four or eight receive coils 132 are used on a PCB mounted in a plane around the distal end of each guide tube 122.

The magnetic field 136 generated by the transmit coils 134 wrapped around the distal end of the tube 122 is illustrated in FIG. 6F. The eddy currents formed in the receive coils 132 by the lines of flux generated by the single transmit coil 134 are conducted by a pair of wires (not shown) through a protective channel or sleeve 138 alongside and fastened to an underside of the tube 122 to an analog signal processor circuit within the sensor amplifier block 124 mounted on the bracket 120 beneath the tubes 122. Preferably the type of object sensed by the sensor array 150 is identified and categorized by the analog signal processor circuit within the amplifier block 124, and thence sent to the electric control box 108 for subsequent signal processing and use as described more fully below with reference to FIG. 2 and the process flow diagrams of FIGS. 11-18.

Figure 7:
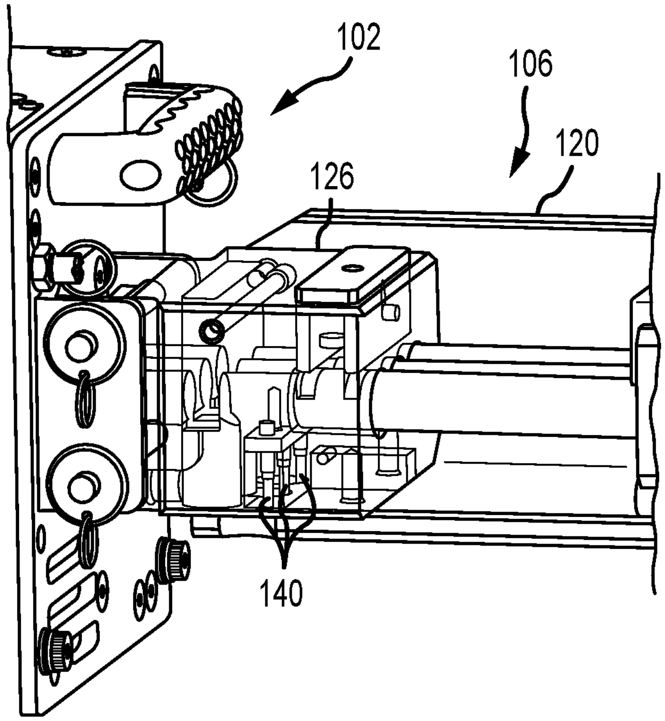
FIG. 7 is an enlarged front end view of the lance hose drive apparatus shown in FIG. 3 showing the front lance hose stop or hose crimp collet arrangement.

Referring now to FIG. 7, an enlarged view of the rear end of the guide assembly 106 and front end of the tractor drive 102 is shown with the internal components of the hose stop or crimp collet block 126 visible. The collet block 126 includes three transducers 140 that each sense the presence of a hose clamp or crimp (not shown) fastened to a lance hose (not shown) adjacent its nozzle. This hose crimp is clamped tightly to the lance hose near the distal end of the lance hose and physically interferes with hose passage through the collet opening within the collet block 126 so as to prevent withdrawal of the high pressure hose back through the drive 102. These crimps and closely sized collets in the collet block 126 act as a safety measure to prevent inadvertent withdrawal of the lance hose.

The transducers 140 preferably magnetically sense presence of a crimp and send a control signal therefore to control circuitry for the lance drive 102 to de-energize the "retract" lance drive motors when a crimp is sensed. In addition, the transducer 140 signal indicates full withdrawal of a lance hose and therefore its signal can be used to zero out hose position of the lance hose as determined by the hose travel transducers further described below. Furthermore, in these multi-lance systems, these transducers 140 may be used together to synchronize lance position. The lance tractor drive 102 may be driven until all lance footballs (indicating full lance insertion) or crimps (indicating full lance withdraw from the heat exchanger) are detected.

Figure 8:
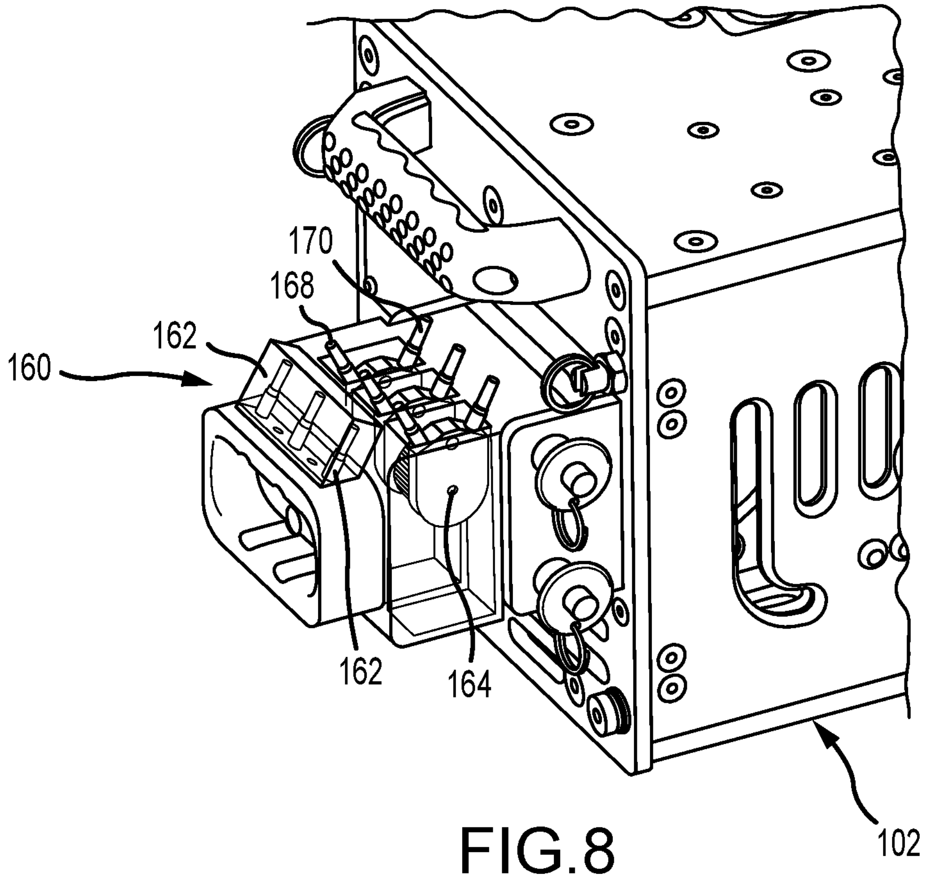
FIG. 8 is an enlarged rear end view of the lance hose drive apparatus shown in FIG. 3 showing the lance hose feed transducers and hose "football" sensors of the rear lance hose stop block.

Turning now to FIG. 8, a rear perspective view of the lance hose drive 102 is shown with the outer surface transparent and internal components of the rear collet block assembly 160 visible. In the embodiment of the hose drive 102 shown, there are three stop collet football transducers 162 located in this rear collet block assembly 160. Each of these transducers 162 sense the presence of a hose stop football, again a C shaped fitting fastened tightly to a lance hose and positioned on the hose to indicate maximum travel of the lance hose through the drive 102 when the stop football abuts against or is in close proximity to the transducer 162. Each of these transducers 162 preferably includes a magnetic switch operable to close when the football contacts the transducer 162. This switch then sends a signal to control circuitry that can be utilized to de-energize the lance drive 102 and or automatically reverse the lance drive 102 as may be needed. The rear stop collet assembly 160 also has three hose travel transducer sets. In this exemplary embodiment these transducers are friction wheel sensors 164 for indicating incremental passage of a lance hose through the collet assembly 160.

Figure 9:
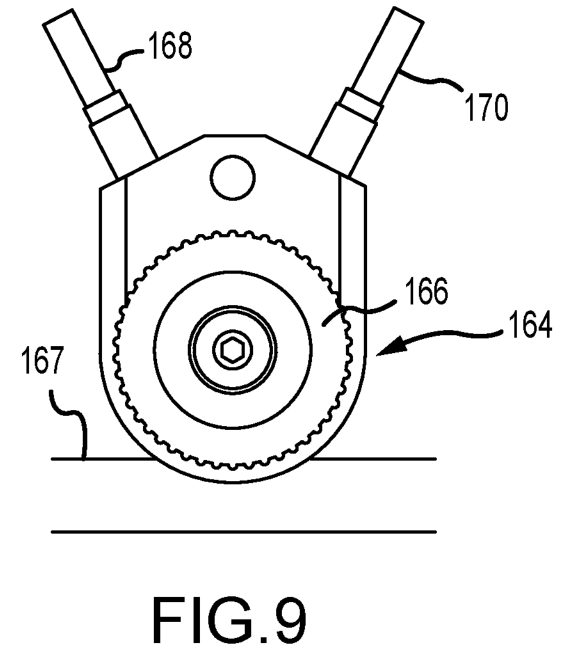
FIG. 9 is a separate illustration of one of the lance hose feed transducers removed from the rear lance hose stop block shown in FIG. 8.

FIG. 9 is a separate enlarged view of one of these friction wheel sensors 164. Each sensor 164 includes a friction wheel 166 that engages a lance hose 167 and rolls along the hose 167 as it is fed into, through and out of the lance drive 102 and through one of the guide tubes 122. This wheel 166 has a pair of transducers 168 and 170 that count angular rotation of the wheel 166 and hence are representative of the distance of hose travel into and out of the drive 102. These transducers 168 and 170 send signals proportional to hose drive distance traveled to the electrical control box 108 for further processing. The sensors 164 may be Hall effect sensors and the wheel 166 may be outfitted with a plurality of magnets such that rotation of the wheel 166 with passage of the magnets by the sensor 164 generates a current signal which is converted to a hose distance travel. The hose travel distance determined thereby is transmitted to the control box 108. In this manner, the tractor drive 102 is a smart tractor, providing distance traveled information for each lance. Furthermore, the transducers 140 in concert with the sensors 164 can be used to repetitively count and track lance insertions. This lance position information may also be utilized in conjunction with expected lance travel information determined from a sensor located on the lance drive motor to automatically apply lance reversals, called "autostroke" to "peck" away at internal tube obstructions. Such autostroke functionality is disclosed in greater detail below with reference to FIGS. 35-43.

All of the components that are mounted on the positioner frame 104 including the air motors, 114, 116, the sensor head 150 and guide assembly 106, and the lance hose drive tractor 102 may be subjected to environmental conditions which could include flammable gases as well as copious amounts of water. Hence any electrical currents present in the various sensors must be minimized and must be in an air and water tight containment.

Electrical power may not be readily available at a location where the apparatus of this disclosure is needed. Compressed air is much more available many in industrial settings and is acceptable to users. Compressed air is also intrinsically safe to use. It is therefore a part of the design of the present apparatus 100 in accordance with the present disclosure that a tumble box 110 be included, which provides a pneumatic electrical generator to supply needed electrical voltage to components typically at no more than 12V. Thus the only external power required by the apparatus 100 in accordance with the present disclosure is a supply of 100 psi air pressure. All electrical wiring and circuitry is hermetically sealed or contained in waterproof and airtight sealed housings.

The tumble box 110 takes pneumatic pressure and converts it to electrical power for all the sensors, and electrical controls of the apparatus 100. The tumble box 110 includes a sealed pneumatic to electrical power generator as well as all the operational air control valves for selectively supplying air pressure to air motors 114, 118, and to the forward and reverse air motors within the tractor drive 102, as well as emergency high pressure water dump valve control and other pneumatic functions.

The tumble box 110 also self generates electrical power for the control circuitry located in the electric control box 108 for overall operation of the apparatus 100 and automated process software. The tumble box 110 and electric control box 108 are typically located out away from the area of high pressure, such as 20-40 feet from the components 102, 104 and 106. For example, the tumble box 110 may be 5-25 feet from the X-Y positioner frame 104 and the control box 108 another 5-25 feet from the tumble box 110. Furthermore, this arrangement permits an operator to optionally utilize a remote control console such as a joystick control board or panel that communicates with the electric control box 108 via a wireless signal such as a Bluetooth signal, for example, permitting the operator to even further remove himself or herself from the vicinity of the heat exchange tube sheet area.

Referring back now to FIG. 2, a simplified electrical schematic of the apparatus 100 is shown. The lance drive tractor 102 carries front collet block 126 which includes three hose stop or crimp encoders 140. The tractor 102 also carries the rear encoder block 160 which has three hose stop encoders 162 along with lance hose position sensors 166 and 168 for tracking the distance traveled by the lances as they are driven by the tractor 102 into and out of tubes being cleaned. The tractor drive 102 also feeds the sensor head 150 position signals from the sensor amplifier block 124 through the tumble box 110 to the control box 108.

The electric control box 108 signals and controls the air valves in the tumble box 110 to provide pneumatic power to the vertical drive air motor 118 and horizontal drive motor 114. In turn, each of these pneumatic drive motors 114 and 118 has a pair of position encoders that feed through the tumble box 110 to the control circuitry in the control box 108 to provide x and y coordinate position data to the control circuitry. Each of the sensor amplifier block 124, the front hose stop collet block 126 and rear hose stop block 160, the tumble box 110 and the x-y positioner drives 114 and 118 has an internal master control unit (MCU) for processing signals needed to communicate position information to the software resident in the control box 108. Furthermore, the control box 108 contains a database and memory for a position monitor/map of the tube sheet to which the apparatus 100 is attached.

Figure 10:
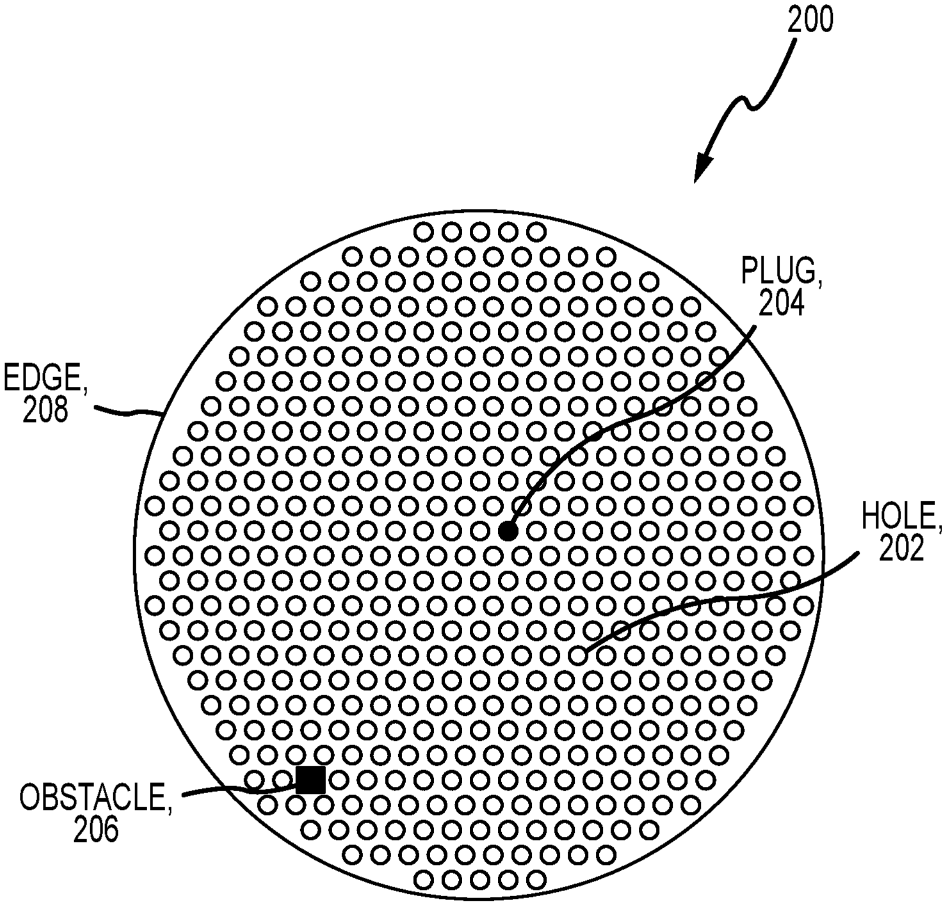
FIG. 10 is a schematic view of an exemplary tube sheet showing the spacing of holes and other objects.

FIG. 10 shows a plan view of an exemplary tube sheet 200, with an array of tube penetrations or holes 202 indicated by clear circles. Initially the apparatus 100 is positioned via the x-y positioner frame 104 over an approximately central position on the tube sheet 200 with the sensors 150 spaced from the face of the tube sheet 200 by a distance less than about 1 inch, preferably about 0.5 inch. As the apparatus 100 moves the lance drive 102 over the surface of the tube sheet 200, the sensors 150 operate to sense one of four defined types of objects. A hole 202 is defined as a gap in the measured surface corresponding to a tube which needs to be cleaned. An exemplary obstacle 206 is a protrusion from the surface that needs to be avoided. A plug 204 is an anomaly in the composition of the surface which must be passed over. An edge 208 is the point on the surface beyond which further measurement need not be taken. Typically this means the outer margin or edge of the tube sheet 200.

The detection system utilizing sensors 150 traverses the tube sheet 200 until an "event" is detected by an abrupt change in eddy current sensed by the receive coils 132. Then an algorithm determines whether the event detected is an object and categorizes it as a hole, an obstacle, a plug or an edge, or undefined. This detection system utilizes two pairs of receive coil sensors 132, each aligned on the x and y axis respectively of the tube sheet 200. Thus an Rx N and Rx S receive coils 132 are analyzed as the Rx Y axis pair. An Rx E and Rx W receive coils 132 are analyzed as the Rx X axis pair. The Rx X and Rx Y pairs send a signal to the sensor amplifier and processor. When the signal processed indicates the presence of an object event by either of the pairs, the event is categorized as one of a Hole, Plug, Edge, or Obstacle or Undefined (like an obstacle, i.e. to be avoided).

This identification and classification is similar for the intermediate sensors 132. Thus, the Rx NW and Rx SE sensor coils are analyzed as the Rx NW pair. The Rx NE and Rx SW sensor coils are analyzed as the Rx NE pair. Whenever an event is indicated, the coordinates of the event location queried to ascertain the object, and the coordinates are then stored in a digital Position Map for later use.

This analysis may include comparing the waveform of the sensor pair to identify the waveform as representative of one of the four types of objects defined above. For example, if the waveform represents a hole, the position monitor is appropriately updated. If the waveform is identified as an obstacle, a further inquiry is made whether the obstacle is of a known type and, if so, categorized accordingly. On the other hand, if the waveform is of unknown type, the user is prompted to identify, such as raised edge, raised plug, barrier, etc. and the position monitor map updated accordingly.

In FIG. 10, a plan view of an exemplary tube sheet 200 is shown. A Plug 204 is shown as a black circle. An obstacle 206 is shown as a square. An edge 208 is shown as the perimeter of the tube sheet 200. The pitch of the tube spacing is the horizontal distance between adjacent tubes. The height "h" is the vertical separation of the rows of holes 202. This information is detected, stored and built up in the Position Map database "on the fly" through the processes described below with reference to FIGS. 11 through 19.

Figure 11:
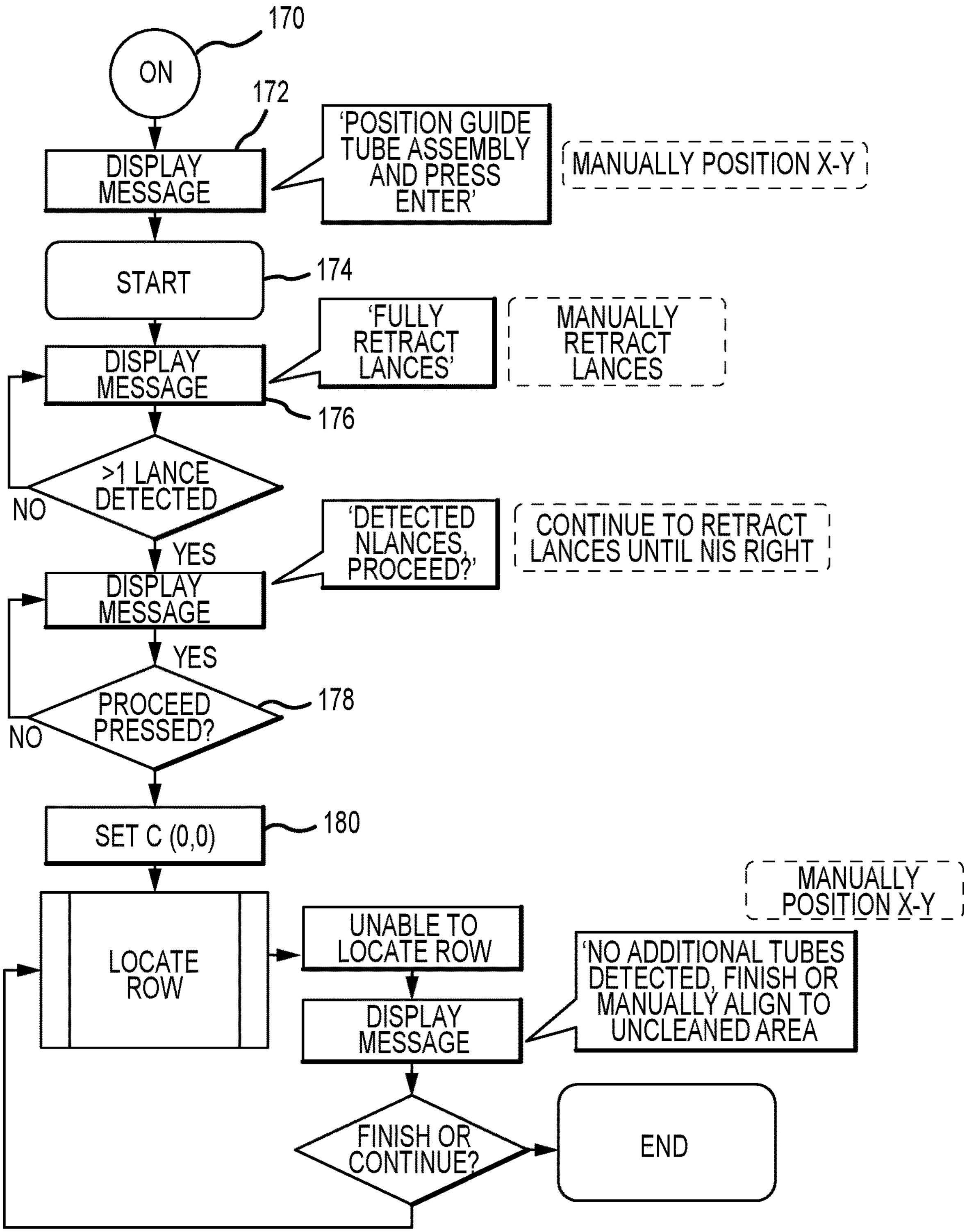
FIG. 11 is an exemplary initial operational sequence in accordance with one embodiment of the present disclosure.

FIG. 11 is a process diagram showing the user input required to begin the autoindexing process utilizing the apparatus 100.

The program begins in operation 170 where the user turns the system on. Control transfers to Display message block 172 which shows the user the instruction to position the guide tube assembly in a central location over the tube sheet 200 and centered over a hole 202 (or series of 3 holes) and press enter. Control then transfers to Start operation 174. The user is then asked to confirm the lances are fully retracted in operation 176. If the lances are fully retracted their position will be sensed by the transducers 140 sensing the footballs of all three lances indicating full retraction of the lance hoses. If so, query is then asked of the user in operation 178 whether to proceed. If so, in operation 180, the Position Map is then initialized with the apparatus 100 given or set at the present location and this location is initialized as location c (0,0). Control then passes to The Initial Hole Jog sequence 210 shown in FIG. 12. Then the overall process proceeds to the Clean Tubes sequence 300 shown in FIG. 15.

Figure 14:
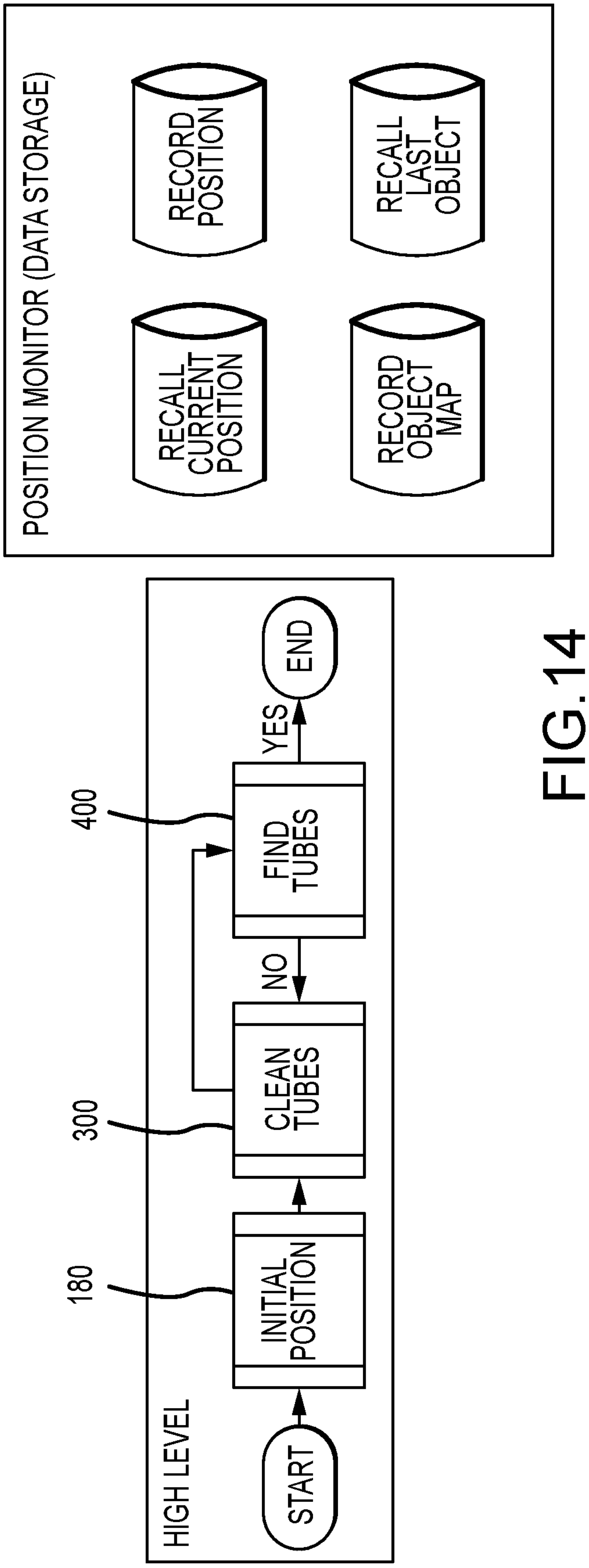
FIG. 14 is an overall high level logic flow diagram of the overall autoindexing process in accordance with the present disclosure.
Figure 15:
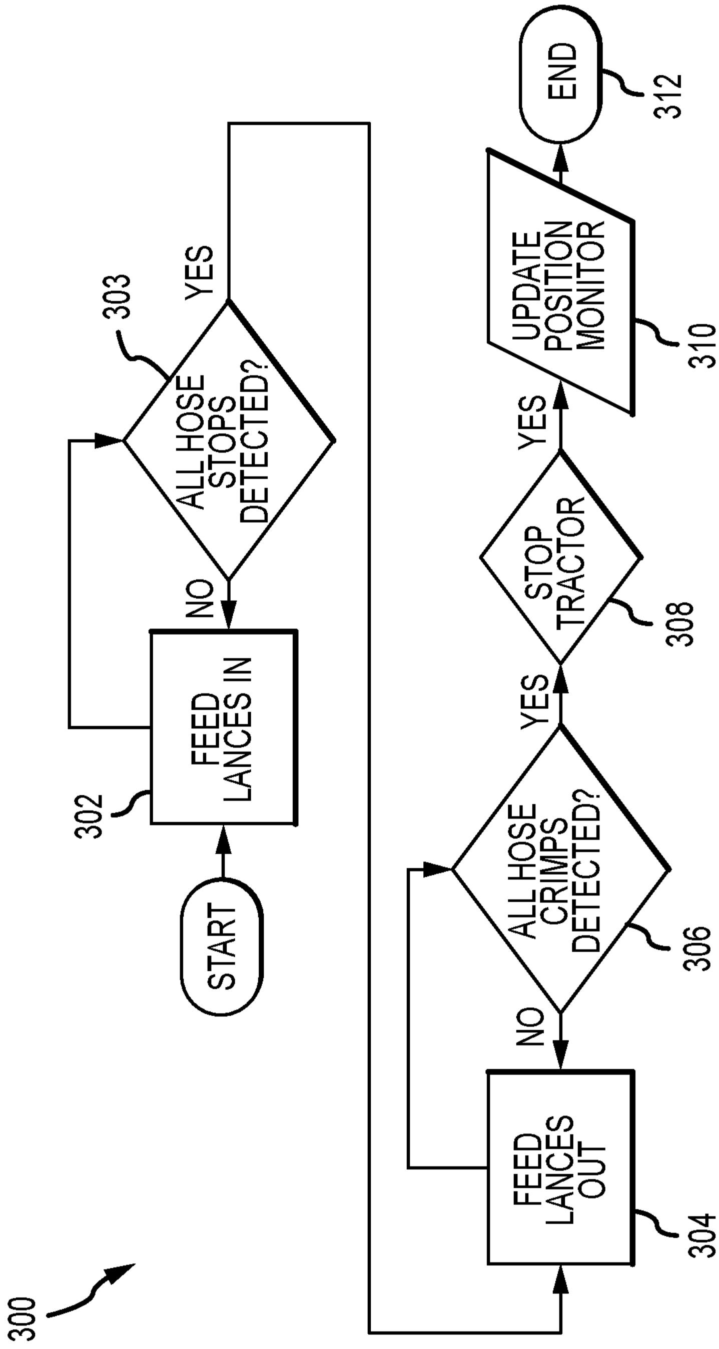
FIG. 15 is a process flow diagram of the Clean Tubes algorithm in accordance with the present disclosure.

The overall High Level operation sequence shown in FIG. 14 includes, in sequence, establishing Initial position sequence 180, Clean tubes sequence 300, and Find Tubes sequence 400. FIG. 14 also illustrates the content of the Position Monitor database.

Figure 12:
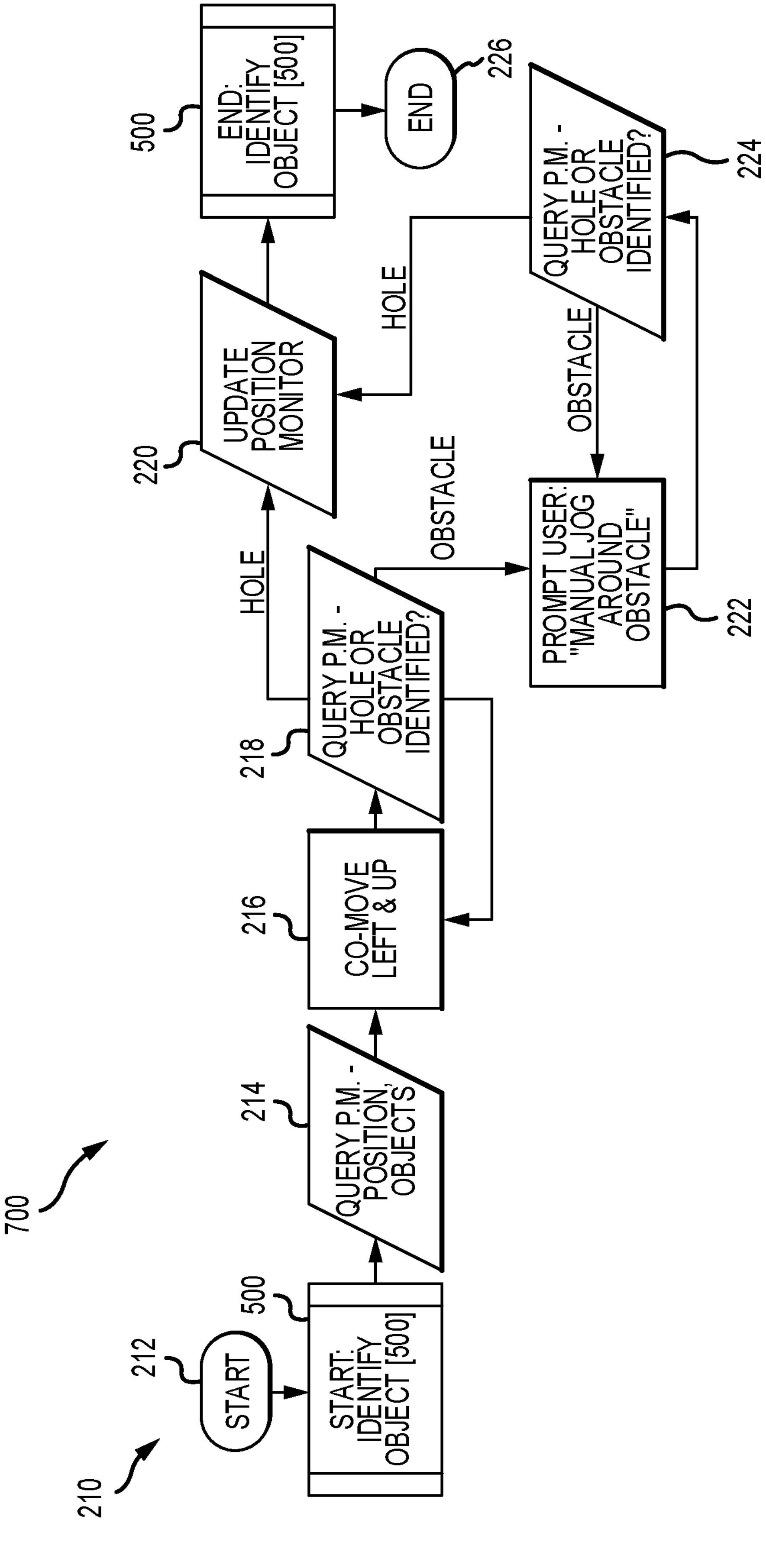
FIG. 12 is a process flow diagram of an Initial Hole Jog sequence in accordance with the present disclosure.

Referring now to FIG. 12, the initial jog sequence 210 begins in operation 212. Control then invokes the Identify Object sequence 500. This sequence is performed until control returns to operation 212. Control then passes to operation 214 which queries the position Monitor for objects. Assuming no object is found at the starting position (0,0), control then transfers to concurrent-move left and up operation 216. This operation 216 directs a jog left and up command sent to air motors 114 and 118 to incrementally move the lance drive 102 a predetermined distance in the −x and +y direction. Control then transfers to operation 218, in which the Position Monitor database is again queried for whether a Hole or an Obstacle is identified in the database based on the new position of the lance drive 102. If a hole is identified, control transfers to operation 220 where the position monitor database is updated. On the other hand, if in operation 218 the object is an obstacle, control transfers to the user via a prompt 222 to move around the obstacle. Upon completion of the move around obstacle the Position Monitor database is again queried in operation 224 whether the new position is a hole or an obstacle. If a hole, control passes to operation 220. If not, it is an obstacle and control passes back to the manual jog around obstacle operation 222. Once the position monitor database is updated in operation 220, control passes through the Identify object sequence 500 to an end operation 226. At this point an initial hole has been identified. Control then passes to the Clean Tubes sequence shown in FIG. 15.

The Clean Tubes sequence 300 begins in operation 302 where the lance drive 100 feeds three lances into the tubes to be cleaned until the hose stops are detected by the rear football transducers 162. Control then transfers to query operation 303 which asks whether all lances are through the tubes 202 such that all rear football transducers 162 indicate receipt of a football. If not, lance drive 100 continues to feed lances until all transducers 162 sense football presence. Control then transfers to operation 304. In operation 304, the lance drive 100 reverses direction and feeds the lances out. Control transfers to query operation 306 which asks whether all transducers 140 indicate the presence of a football or hose crimp. If so, control transfers to stop tractor operation 308. If not, lance drive 100 continues to feed the lances out until all hose footballs are sensed by transducers 140. Control then transfers to operation 310 where the position monitor is updated to indicate the tubes cleaned. Control then transfers to return or end operation 312. Control then returns to the high level operations shown in FIG. 14.

Figure 16:
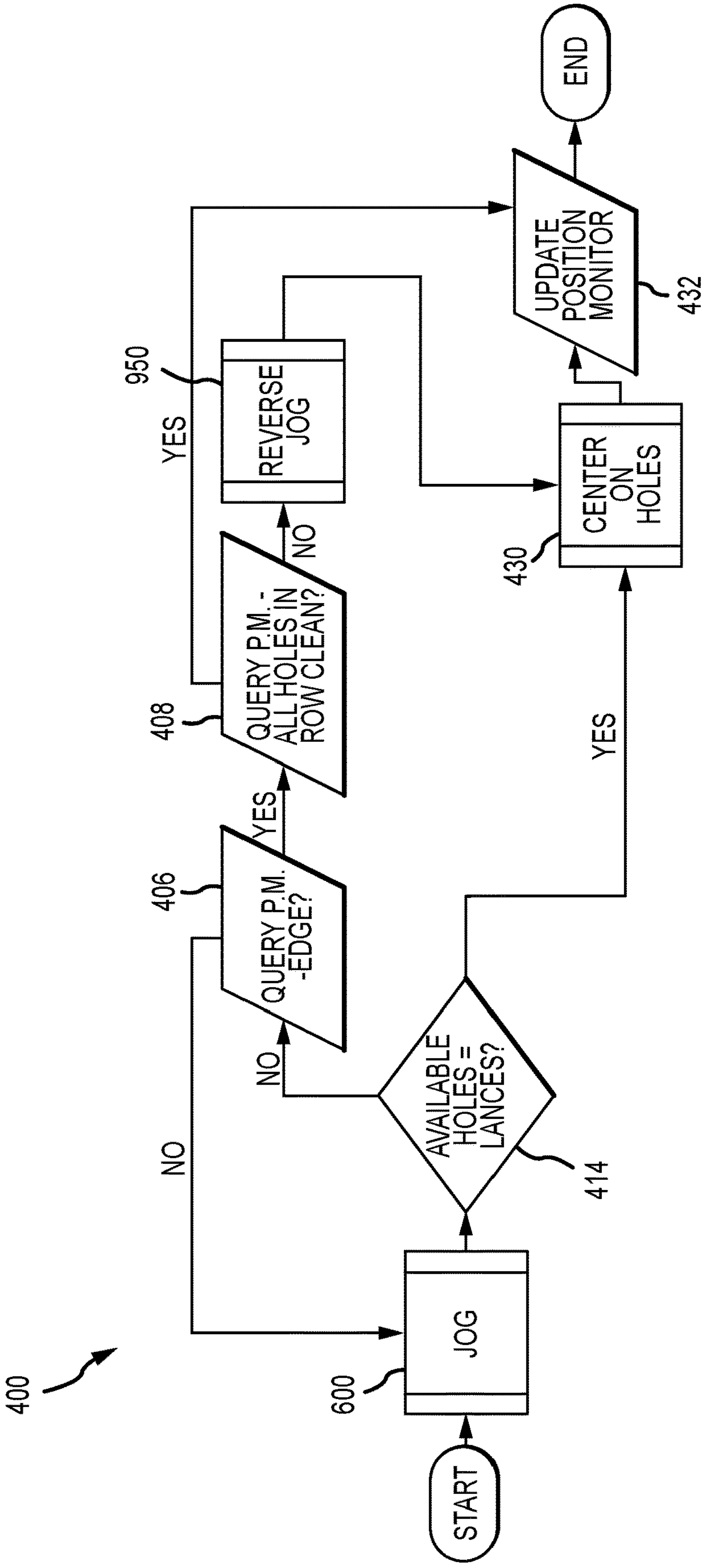
FIG. 16 is a process flow diagram of the Find Tubes algorithm in accordance with the present disclosure.

Once the first set of 3 tubes are cleaned in sequence 300, control transfers to Find Tubes sequence 400 shown in FIG. 16. Find Tubes sequence 400 begins with Jog Sequence 600 shown in FIG. 18. Jog Sequence 600 begins with an Identify Object sequence 500 shown in FIG. 13. If the Identify Object routine is not required, control moves to query operation 602 which asks the Position Monitor whether there are any unexplored directions (up, down, right, or left). Assuming the answer is yes, control transfers to query 604 which asks whether a move left is available. If yes, control transfers to operation 606 and a signal is sent to the air motor 118 to jog the drive 102 left.

If a move left operation is not available control transfers to query operation 608 which asks whether a move right is available. If yes, control transfers to operation 610 in which a signal is sent to the air motor 118 to jog the drive 102 right. If the answer in operation 608 is no, control transfers to query operation 612 which asks if a move up available. If yes, control transfers to operation 614 in which a signal is sent to the air motor 114 to jog the drive 102 up.

If the answer in query operation 612 is no, control transfers to query operation 616 which asks whether a move down is available. If the answer is yes, control transfers to operation 618 in which a signal is sent to the air motor 114 to jog the drive 102 down.

If the answer in query operation 616 is no, control transfers to operation 620 which logs that no moves are available. Control then transfers to query 622 which then asks the user whether the jog sequence operation is complete, and, if so, updates the position monitor log in process operation 624. If the query 622 answer is no, control transfers to query operation 626. The user has ultimate control such that if system cannot find tubes, and the user confirms that there are none then the auto-indexing operations stop, reverting to manual control.

Once a jog operation is complete in one of operations 606, 610, 614 or 618, control transfers to a query process operation 628, 630, 632 or 634 respectively where, in each case, the Position Monitor database is queried whether the location just jogged to is either a previously identified hole or whether the location is an obstacle. If the answer is an obstacle, control transfers to query operation 626. If the answer is a hole, control transfers to operation 624 where the position monitor database is updated. Control then transfers from operation 624 to end the Identify Object process 500.

In query operation 626, the question is asked whether the location is a new or known obstacle. If the answer is a known obstacle, control transfers to query operation 636 which asks the position monitor whether the obstacle may be automatically jogged around. If yes, control transfers to auto-jog operation 638 where either the air motor 114 or 118 is instructed to move a predetermined distance to move past the known area. Control then transfers to operation 640 where the position monitor is again queried for either a hole or obstacle identified at the new location. If the answer is a hole, control transfers to operation 624. If the answer in operation 640 is an obstacle, control transfers back to query operation 626. Once the position monitor is updated in operation 624, control passes to the end Identify Object process 500.

If the answer in query operation 626 is that the obstacle is new, control transfers to operation 642 where the user is prompted for a manual jog around the obstacle. When a manual Jog is completed, control transfers to operation 644 which queries the position monitor for that new position, whether the new position is a hole or obstacle. If the position monitor indicates a hole, control again passes to operation 624 where the position monitor is updated. If the position monitor indicates an obstacle, control passes back to query operation 636.

Figure 13:
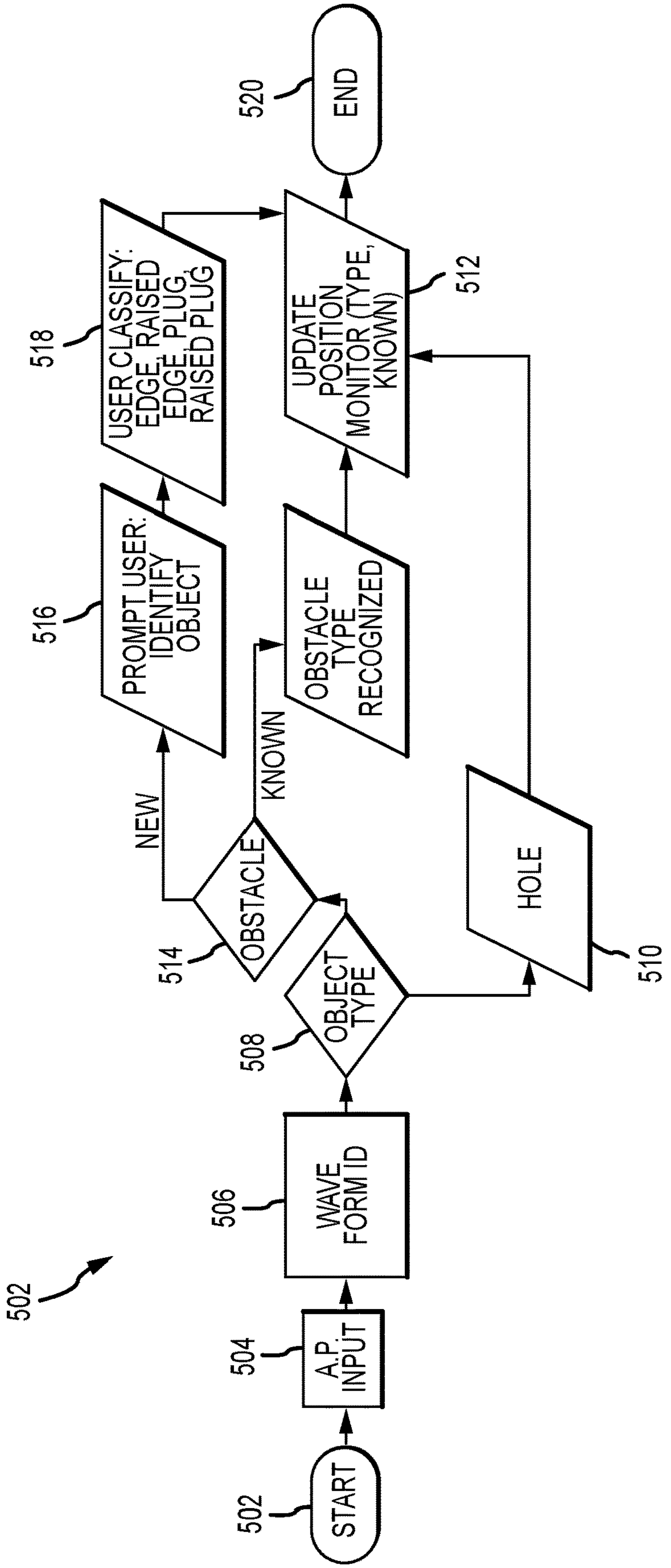
FIG. 13 is a process flow diagram for the Identify Objects algorithm for discerning objects as a result of encountering detectable events in accordance with the present disclosure.

The process 500 is shown in FIG. 13. This process 500 begins in operation 502. Control then transfers to operation 504 where the analog output of the position sensors 150 is processed. Control then transfers to a wave form ID algorithm in operation 506. This wave form ID algorithm analyzes the analog output to categorize the signal from the sensors 150 into one of two types, either a hole is indicated or an obstacle. Control then transfers to query operation 508 which asks what is the object type. If the output is determined to be a hole, control transfers to process operation 510 which in turn directs an update of the position monitor for the location coordinates in operation 512. If the output waveform is determined to be an obstacle in operation 508, control transfers to query operation 514 which asks whether the obstacle is new or known. If new, the control transfers to operation 516 where the user is prompted to identify the obstacle. Control transfers to operation 518 where the user examines the waveform signal to classify the waveform signal and selects from a predetermined list of obstacles such as either an Edge, a Raised Edge, a Plug, or a Raised Plug obstacle. In order to conform the results of the waveform processing, and aid in the learning of what signal results equate to what type of obstacle is experienced in each instance, the user then inputs the result and control passes to operation 512 where the position monitor database for the location coordinates is updated with the type of object, i.e. hole, Edge, Raised Edge, Plug or Raised Plug. Control then returns in End operation 520 to whatever process called the Identify Object process 500.

On the other hand, if the answer in query operation 514 is that the obstacle type is classified as known on query 514, control transfers to operation 522 where the obstacle type is recognized. Control then transfers to operation 512 where the position monitor database is updated with the recognized type. Control then passes to End operation 520. Control then passes back to whatever process called the Identify Object process 500.

When the initial set of three holes have been cleaned in process 300, control transfers to Find Tubes process 400, which is shown in FIG. 16. This process begins in operation 600 which invokes jog operational sequence 600 shown in FIG. 18 and described above. Upon completion of Jog sequence 600, control returns to query operation 414 which asks whether the number of available hoes located equals the number of lances. In the illustrated embodiment shown in FIGS. 1 through 10, this is three. If yes, control transfers to the Center on Holes process 430. From there, control transfers to update the position monitor in operation 432. Once the position monitor is updated, the process control returns to the calling control sequence. On the other hand, if the query operation 404 answer is no, control transfers to operation 406 to determine whether the position monitor database recognizes that a tube sheet edge 208 has been reached. If no, control returns to jog sequence 600. If the answer in operation 406 is yes, an edge has been recognized, then control transfers to operation 408 where the position monitor database is queried whether all holes in the current row have been cleaned. If the answer in operation 408 is yes, then the position monitor is updated in operation 410, and the process control ends, with control returning to whichever process called sequence 400.

Figure 19:
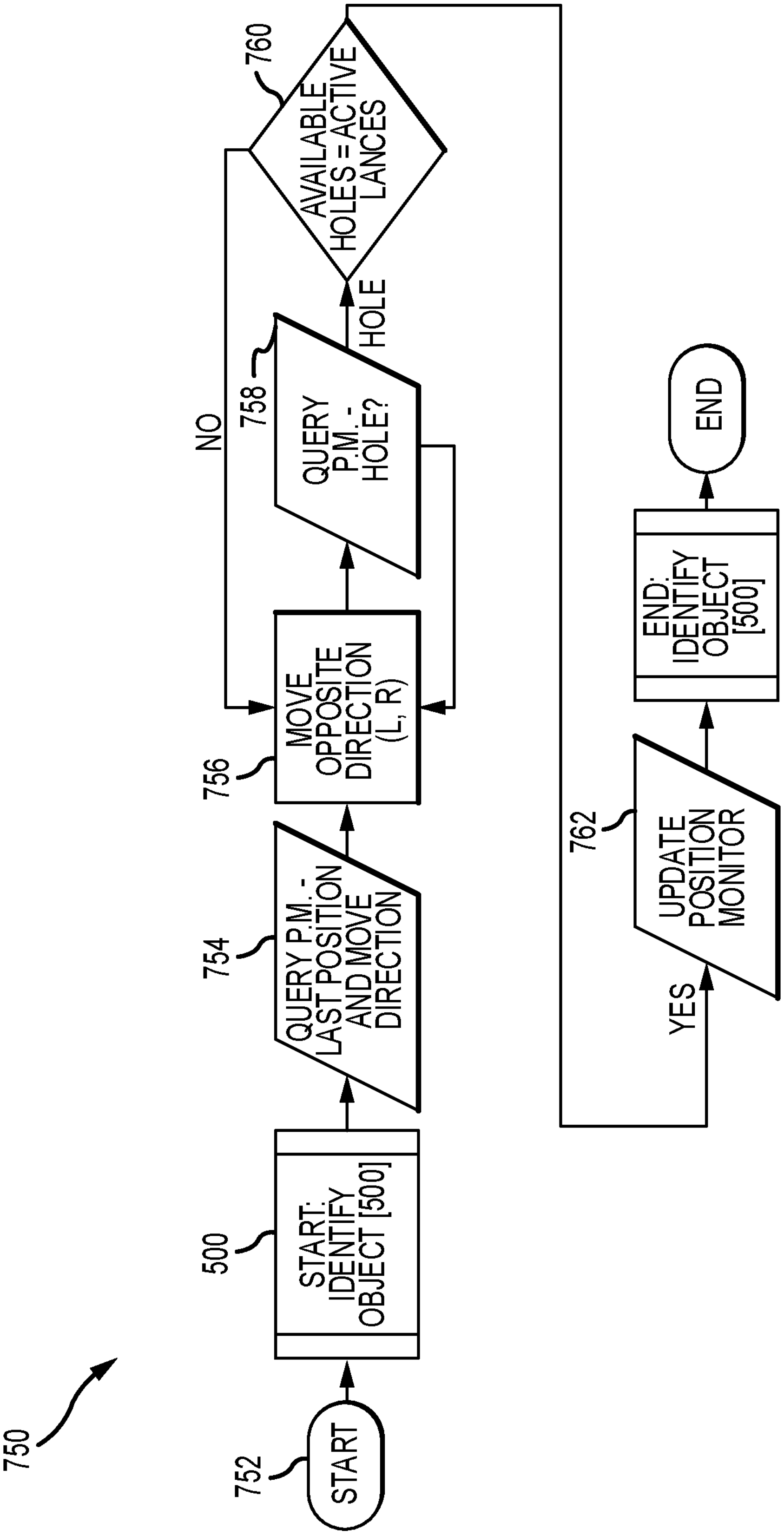
FIG. 19 is a process flow diagram of the Reverse Jog algorithm utilized to finish cleaning a row of tubes when less than a complete set of holes is available.

On the other hand, if the answer in operation 408 is no, not all the holes in the current row have been cleaned according to the position monitor database, control transfers to the Reverse Jog Row sequence 750 shown in FIG. 19. This Reverse Jog Row sequence 750 is needed to finish cleaning a row where there is an incomplete set of three holes available. The process sequence 750 begins in operation 752 which calls operation sequence Identify Object sequence 500. When the Identify Object sequence 500 is completed, control transfers to operation 754. Operation 754 queries the Position Monitor database for the coordinates of the last tube position cleaned and the direction of motion required. Control then transfers to operation 756 wherein either the air motor 114 or air motor 118, or both, is instructed to move in the opposite direction to the move direction identified in operation 754. Control then transfers to query operation 758 where the Position Monitor is asked whether that last position was or was not a Hole. If not a hole, control transfers back to operation 756 for another jog in the reverse direction to that determined in operation 754. If in query operation 756 the position Monitor database indicates that the current position is a previously identified hole, control transfers to query operation 760. Query operation 760 asks whether the now available holes equals the number of active lances. If the answer is yes, control transfers to operation 762 where the position Monitor database is updated. Control then passes back to the Identify Object process 500 and thence returns to operation sequence 300 and the set of holes available is cleaned. In this instance, one or two holes would be cleaned twice such that the entire row is now clean. Control then passes to the Find Tubes operational sequence 400.

Figure 17:
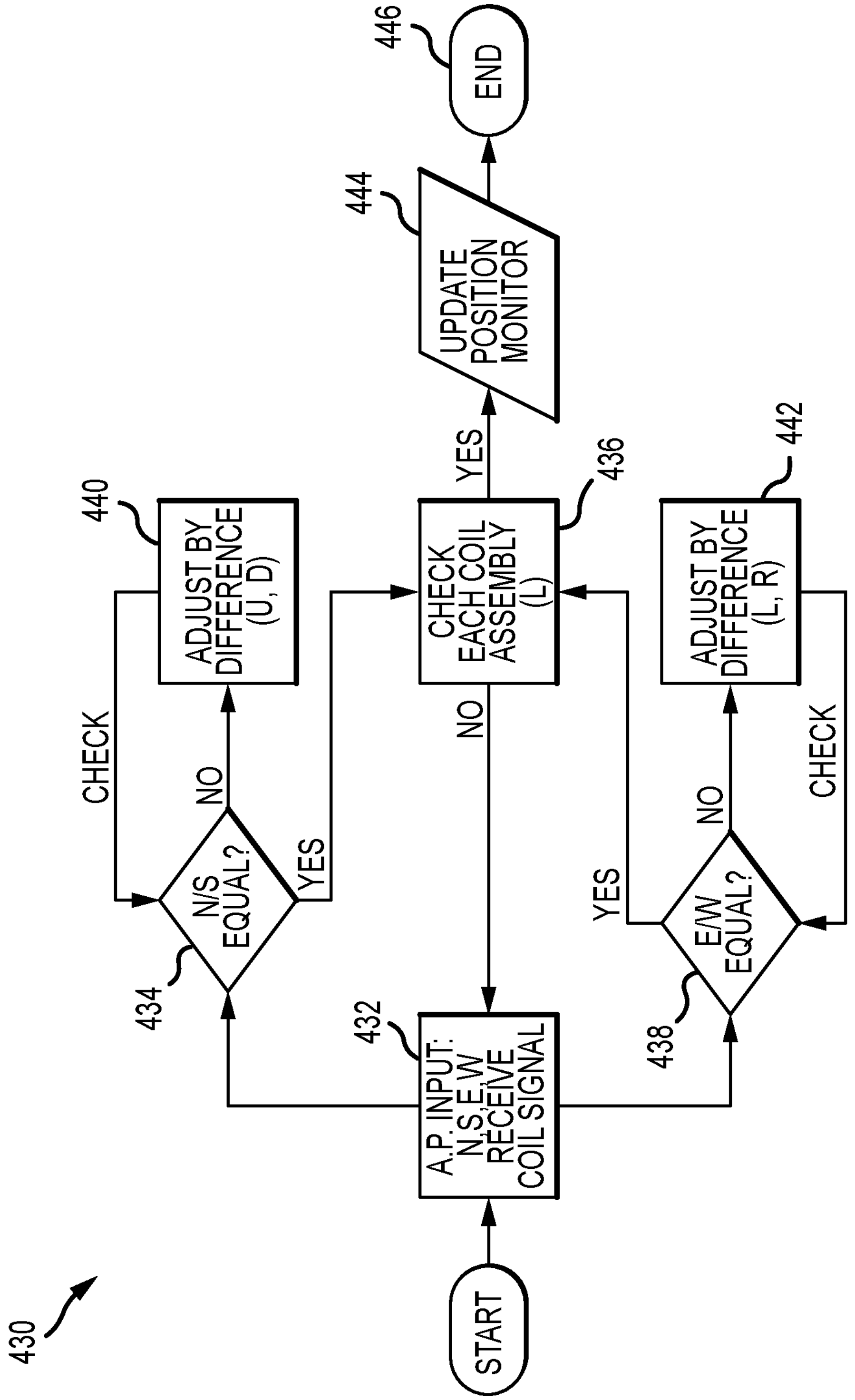
FIG. 17 is a process flow diagram of the Center on Holes algorithm to fine tune alignment of the guide tube in accordance with the present disclosure.
Figure 18A:
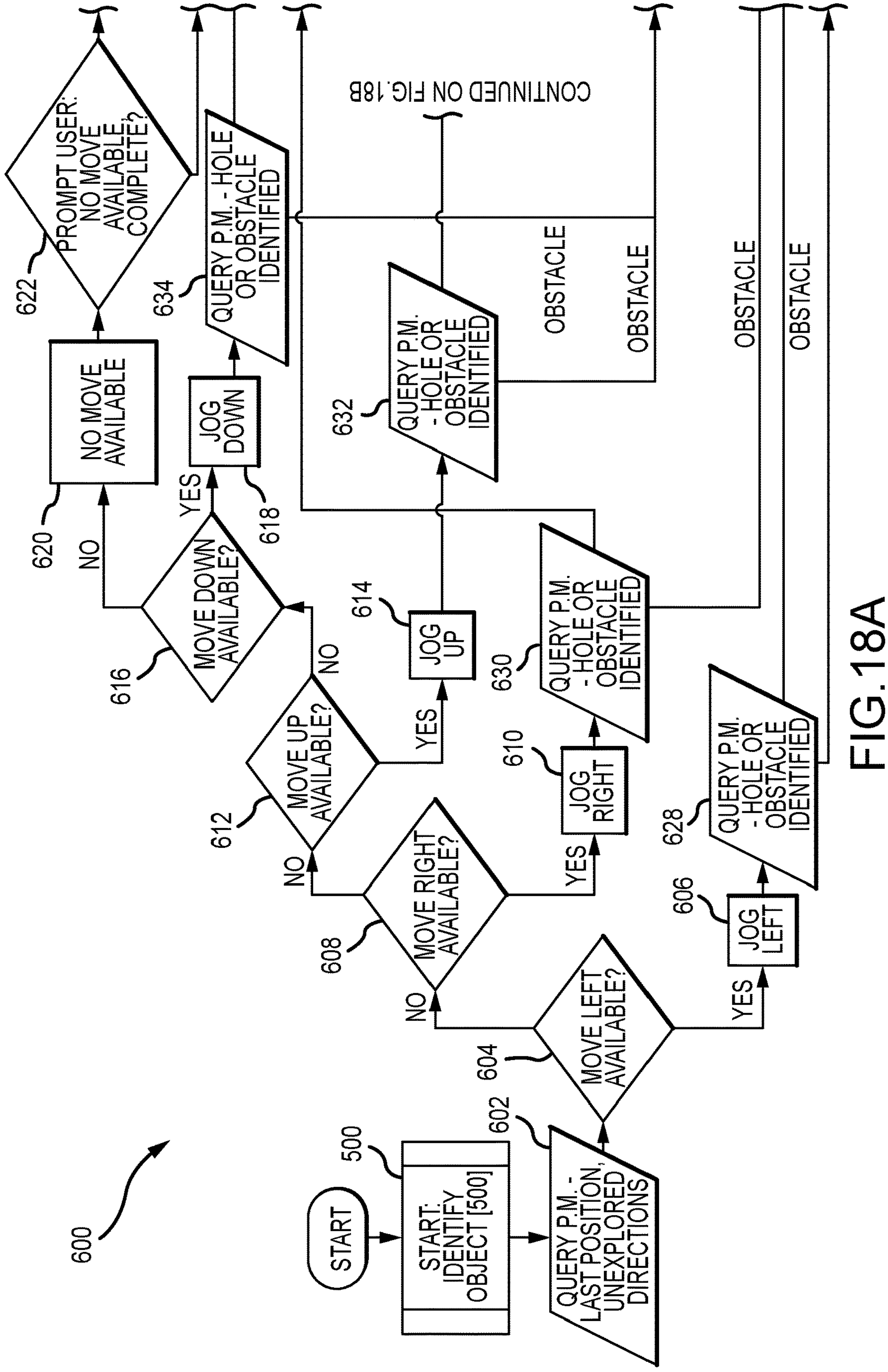
FIGS. 18A-18B are a process flow diagram of the Jog algorithm utilized to move the drive apparatus to a different position in accordance with the present disclosure.
Figure 18B:
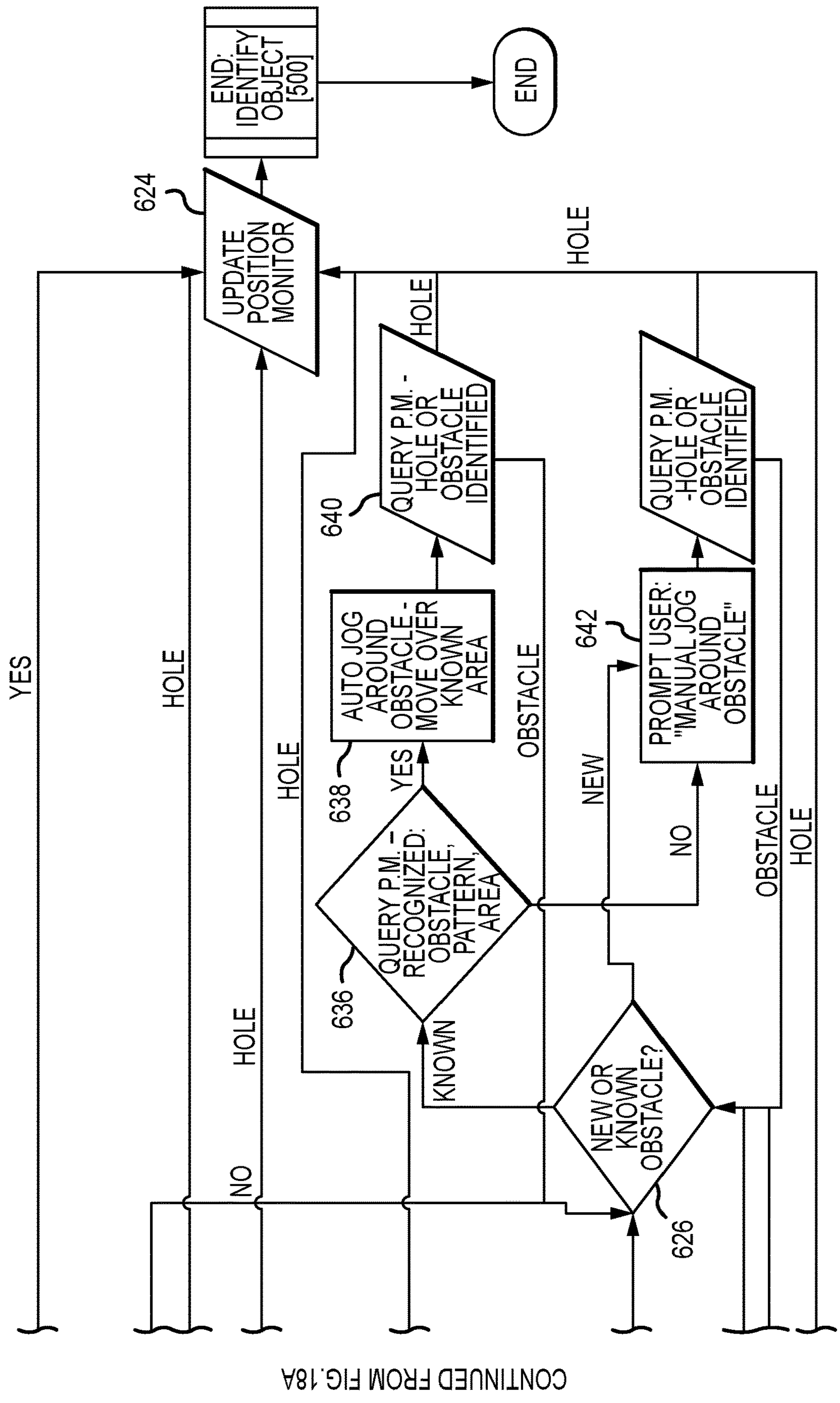

The Center on Holes sequence 430 is shown in FIG. 17. This sequence is invoked whenever a hole is initially located in the Jog Sequence 600 in order to precisely position the lance drive 102 and three hose guide tubes 122 directly over the tube set of 3. This sequence begins in operation 432 where the analog position input: N, S, E, W, receive coil signals are retrieved from the sensor amplifier block 124. The pairs of signals are separated. The NorthSouth signal pair is then compared in query operation 434. If the signals are equal, then control transfers to operation 436. The EastWest signal pair signals are compared in operation 438. If the signals from the EastWest pair are equal, control also passes to operation 436. However, if the NorthSouth pair signals differ, operation transfers to operation 440 where a difference jog signal is sent to the air motor 118 to vertically move the positioner 102 by the difference between the two NorthSouth signals. Similarly, if the EastWest pair signals differ as determined in operation 438, a difference jog signal is determined in operation 442 and is sent to the air motor 114 to adjust position by the difference between the signals. Control then reverts back to query operations 438 and 434 until the signals are equal. Control then transfers to operation 436 where each other pair of receive coil signals (NW/SE, NE/SW) are processed in a similar manner until adjustment is no longer needed, i.e. all are equal. Control then transfers to operation 444 where the position monitor database is updated with the precise coordinates for the identified hole. Control then reverts in end operation 446 to return to whatever process called the Center on Holes process 430.

In the process flow diagram descriptions described above, an error sequence is not included. However, if a non-standard event is encountered, for instance, there are timeout defaults. If a football fell off or a sensor failed, the control system would stop driving after a predetermined time and notify the user of an error state for manual intervention. In the event of a position sensor failure, for example, the drive 102 would continue to drive for 5 more seconds and then stop, informing the user by indication display to correct the situation, for example, check for stuck hose, football damaged, or sensor failure.

Figure 2:
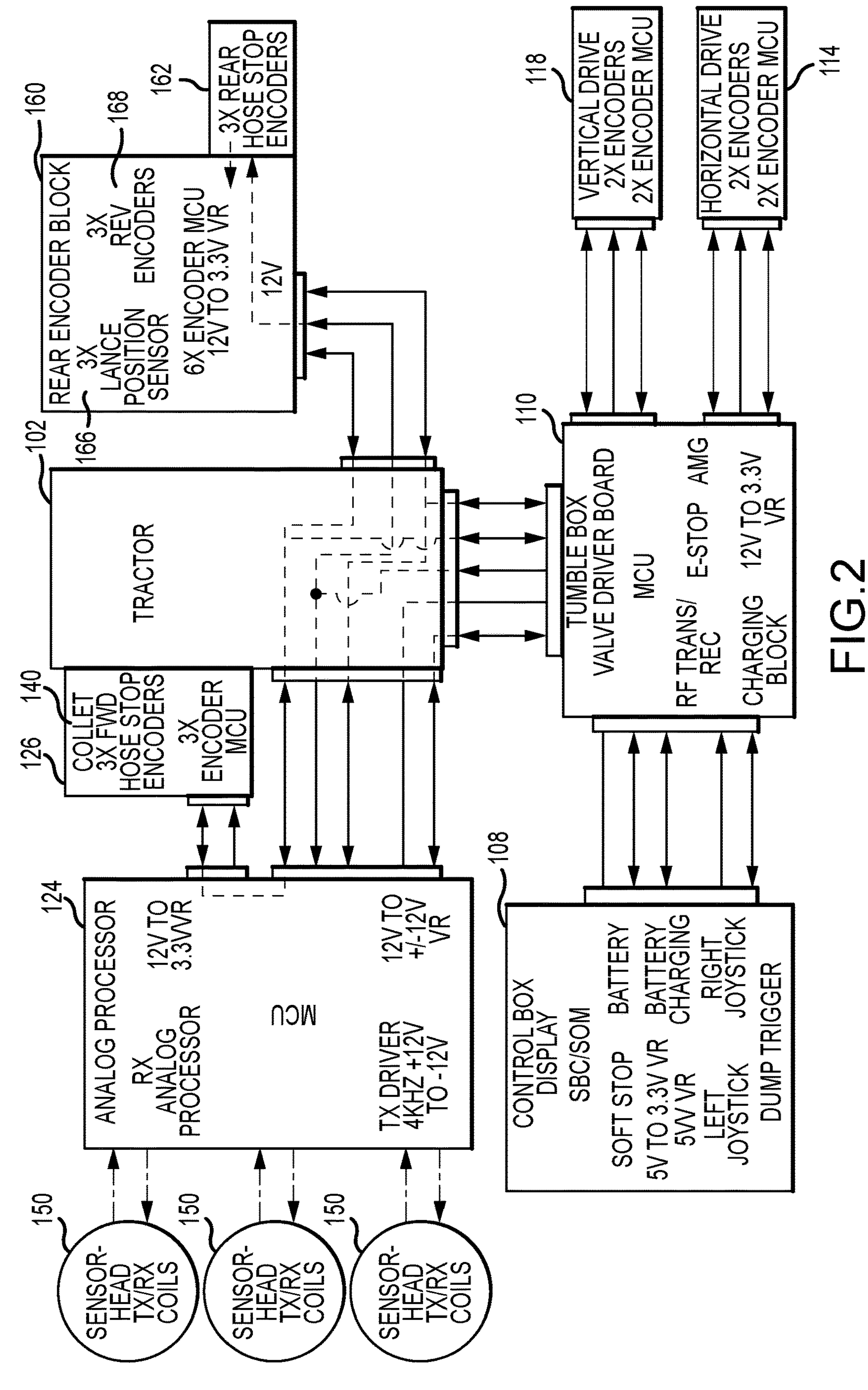
FIG. 2 is a simplified schematic of the electrical components of the apparatus shown in FIG. 1.
Figure 20:
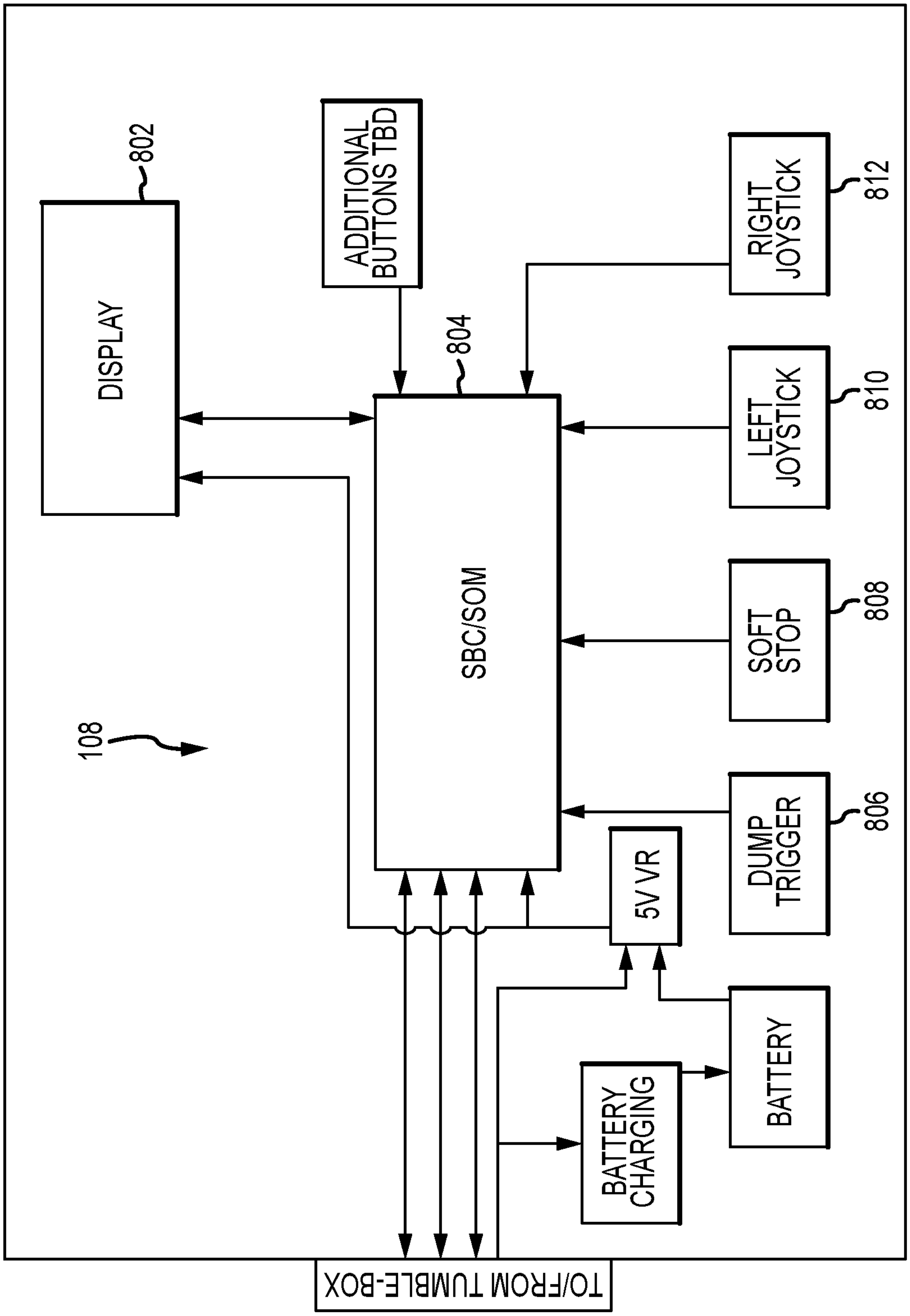
FIG. 20 is an electrical block diagram of an exemplary control box in accordance with the present disclosure.

FIGS. 20 through 27 are electrical block diagrams of each of the major blocks of the apparatus 100 shown in FIGS. 1 and 2. FIG. 20 is a block diagram of the control box 108 which includes a visual display such as an LCD 802 that is fed by a single board computer module, or SBC/SOM 804. The exemplary control box 108 includes a dump trigger switch 806, a soft stop switch 808, a left joystick 810, and a right joystick 812 for an operator to manipulate in order to provide input commands to control the apparatus 100. This control box 108 may include a battery if wirelessly connected to the apparatus 100 or may include electrical power from the tumble box 110 generated by the air motor generator contained therein. The SBC/SOM 804 may incorporate the position monitor database operably described above. The display 802 may include a circular representation of the tube sheet 200 as shown in FIG. 10, which indicates plugs, obstacles and holes as they are identified during the auto-indexing process described above.

Figure 21:
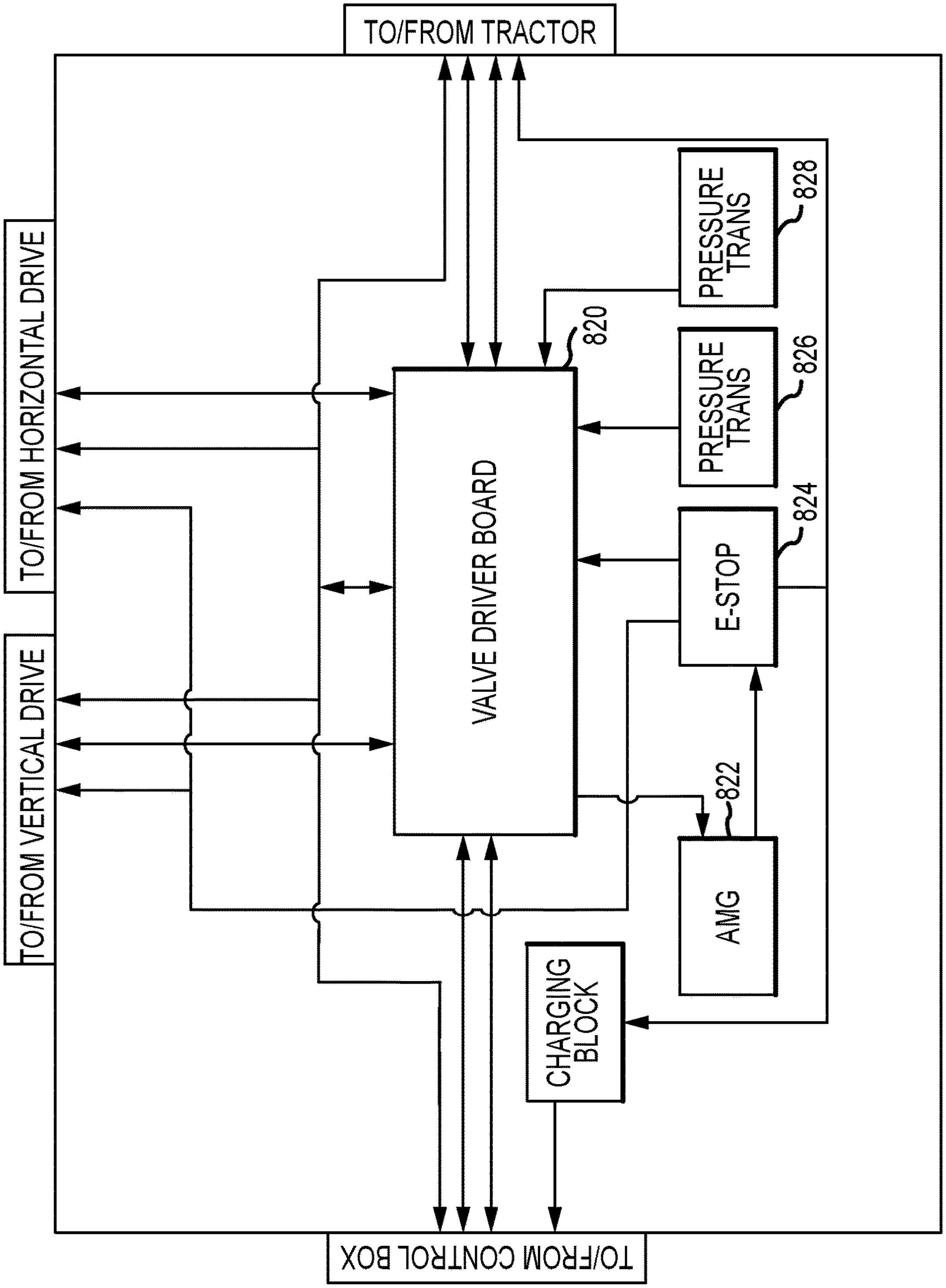
FIG. 21 is an electrical block diagram of an exemplary tumble box in accordance with the present disclosure.

FIG. 21 is an electrical block diagram of the tumble box 110. The tumble box includes an air valve driver board 820 along with an air valve manifold that directs air pressure to the vertical drive motor 114 and horizontal drive motor 118 as well as air pressure to the reversible air motor in the tractor drive 102 and the air cylinder (not shown) that provides hose clamp pressure and hence a clamping force applied to the drive and follower rollers in the tractor drive 102. The tumble box 110 also include an air motor generator (AMG) 822 that generates electrical power for use throughout the apparatus 100. This AMG 822 preferably also supplies power to the rechargeable battery in the control box 108 when wired thereto. The Tumble box 110 also includes an Emergency stop switch 824 to divert pneumatic pressure in the event of an unanticipated event. The tumble box 110 also includes two pressure transducers 826 and 828. Pressure transducer 826 monitors supply air pressure, typically 100 psi. Pressure transducer 828 monitors clamp pressure.

Figure 22:
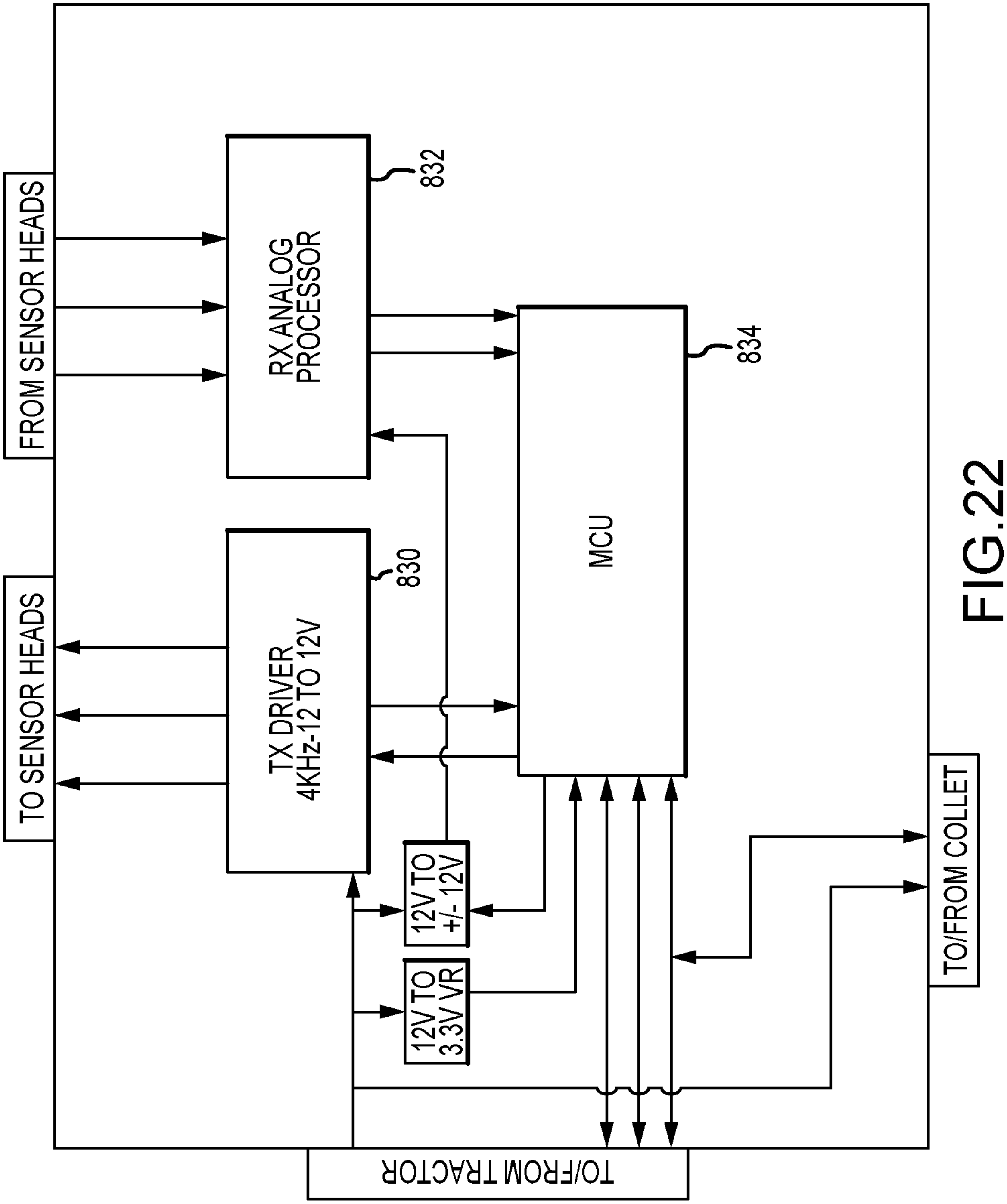
FIG. 22 is an electrical block diagram of a sensor amplifier block in accordance with an exemplary embodiment of the present disclosure.

FIG. 22 shows the electrical block diagram for the sensor head 150 and guide assembly 106 amplifier block 124. The amplifier block 124 contains a sensor transmit coil driver 830 that produces a 4 kHz signal that is fed to each of the transmit coils 134. The receive coils 132 each transmit coupled eddy current signals received from the transmit coils to a receive analog processor 832 which in turn provides input to the main computation unit module (MCU) 834. This MCU 834 sends its output to the control SBC/SOM 804 in the control box 108.

Figure 23:
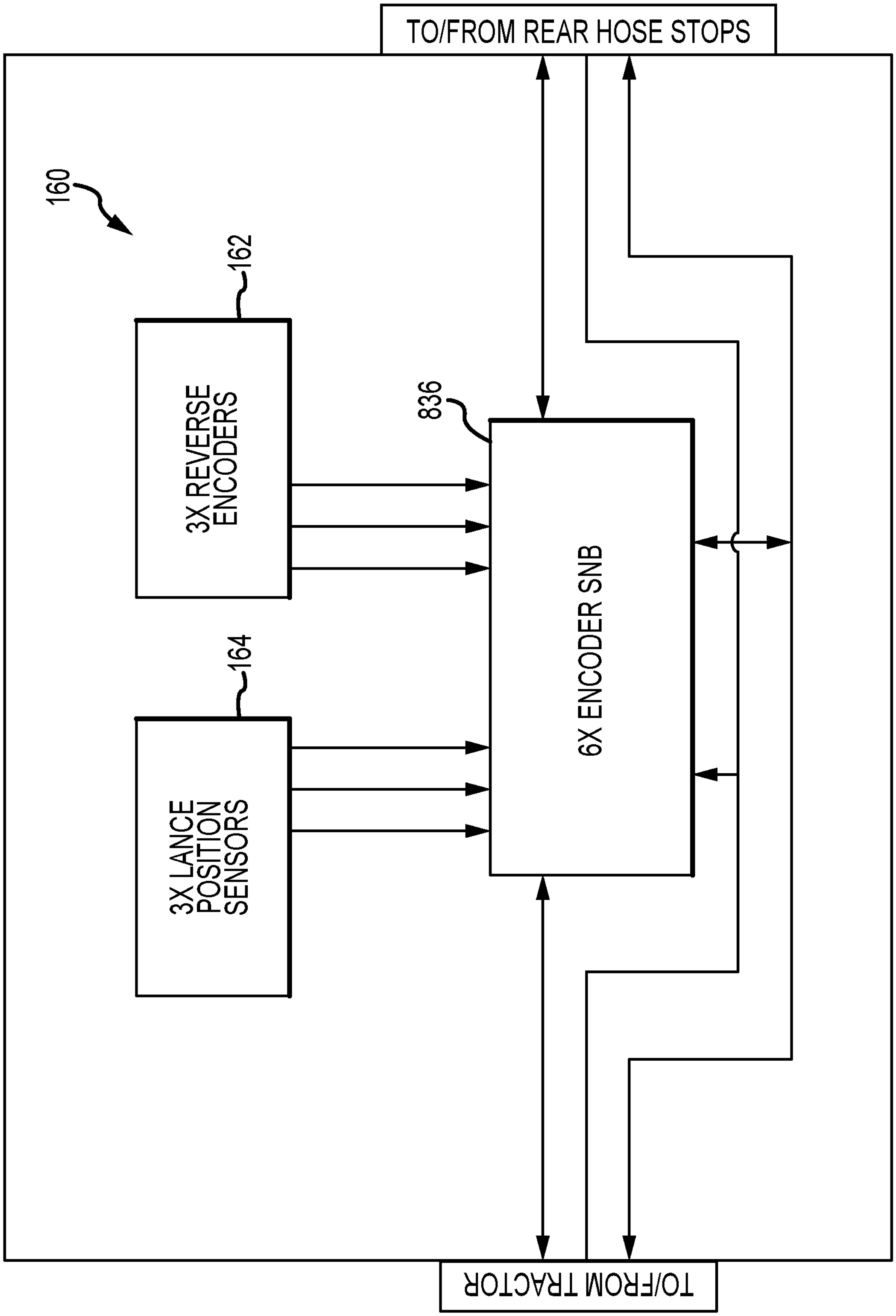
FIG. 23 is an electrical block diagram of the rear encoder block in accordance with an exemplary embodiment of the present disclosure.

FIG. 23 shows the electrical block diagram for the rear encoder block 160. The signals from the position sensors 164 and reverse encoders 162 are fed to an encoder board 836 and thence through the tractor 102 and the tumble box 110 to the control box 108.

Figure 24:
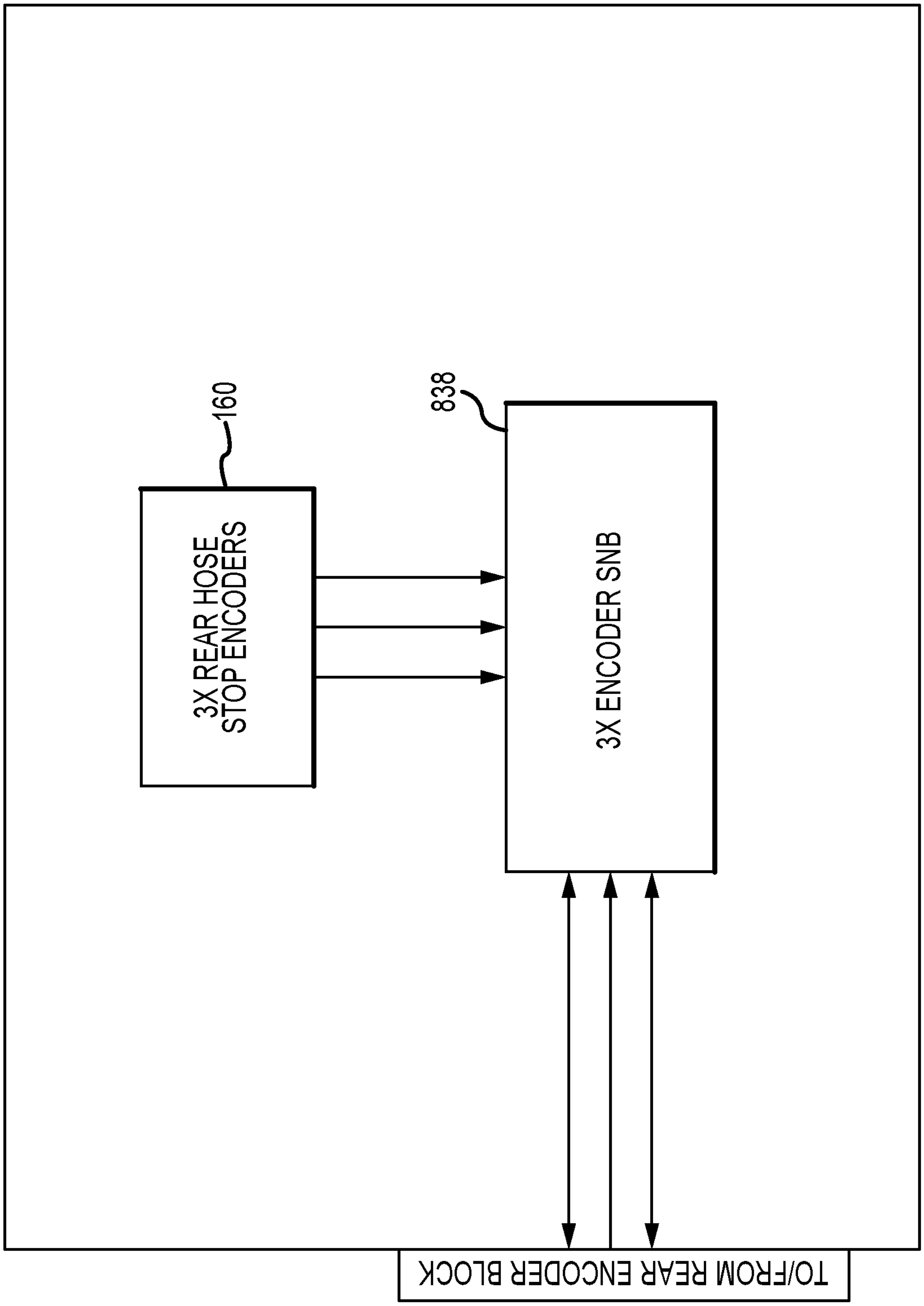
FIG. 24 is an electrical block diagram of the rear hose stop encoder block in accordance with an exemplary embodiment of the present disclosure.

FIG. 24 shows the rear hose stop encoders 160 also feed an encoder board 838 prior to being sent to the encoder block 836.

Figure 25:
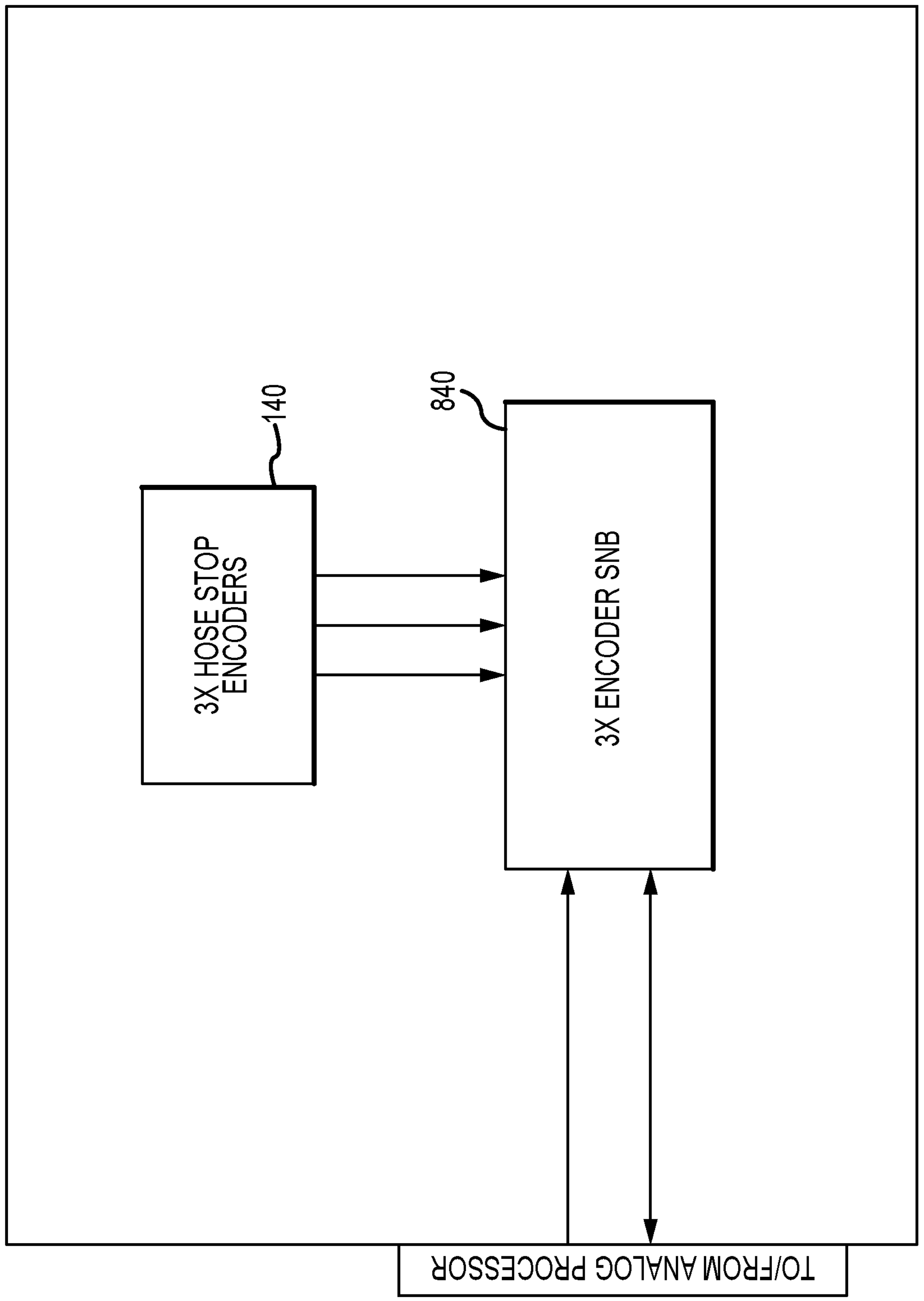
FIG. 25 is an electrical block diagram of the front hose stop encoder block in accordance with an exemplary embodiment of the present disclosure.

FIG. 25 shows the electrical block diagram for the forward encoder block 126 which sends the signals from the hose stop encoders 140 through an encoder board 840 via the analog processor 124 to the control box 108.

Figure 26:
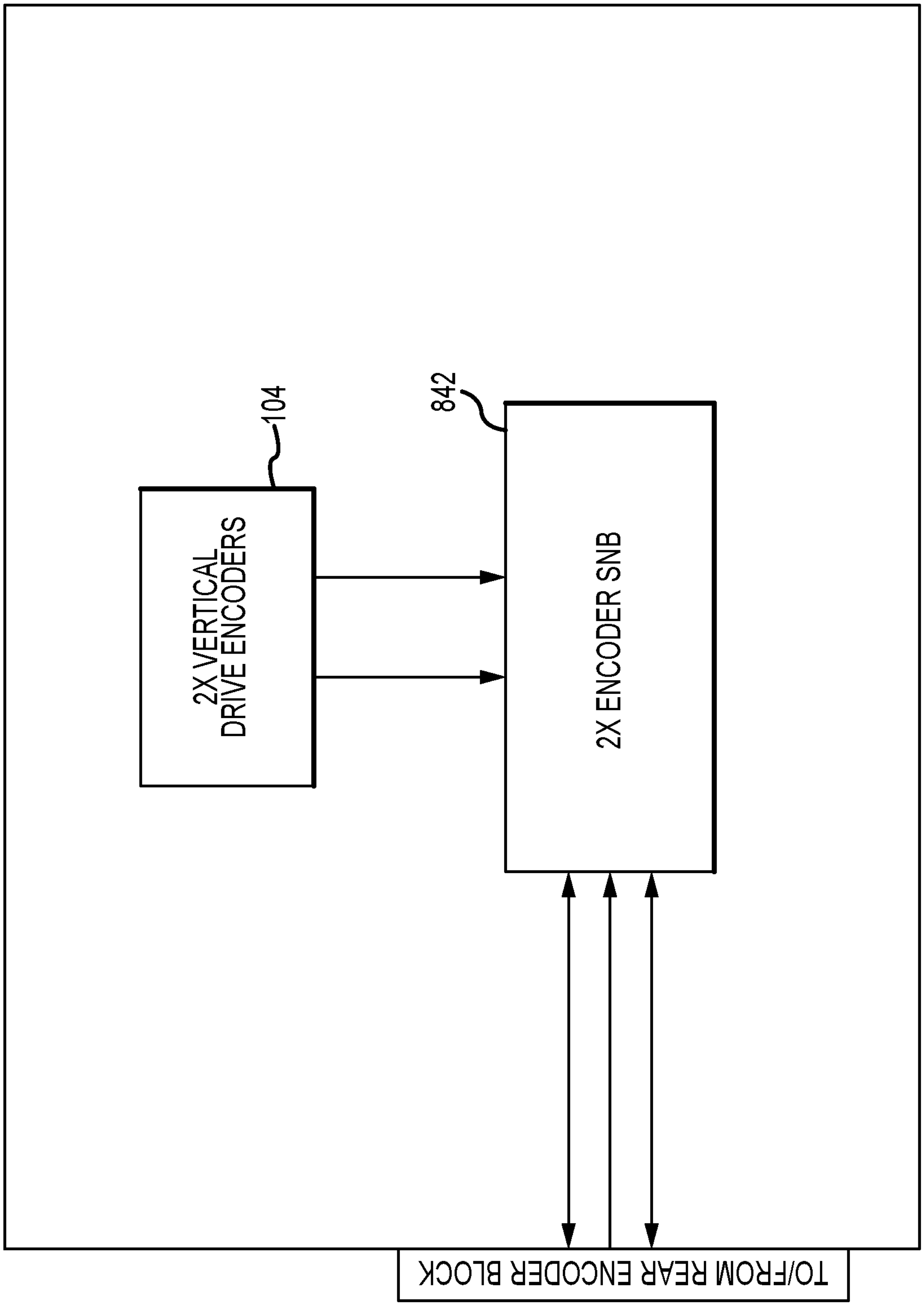
FIG. 26 is an electrical block diagram of the vertical drive position encoder block in accordance with an exemplary embodiment of the present disclosure.
Figure 27:
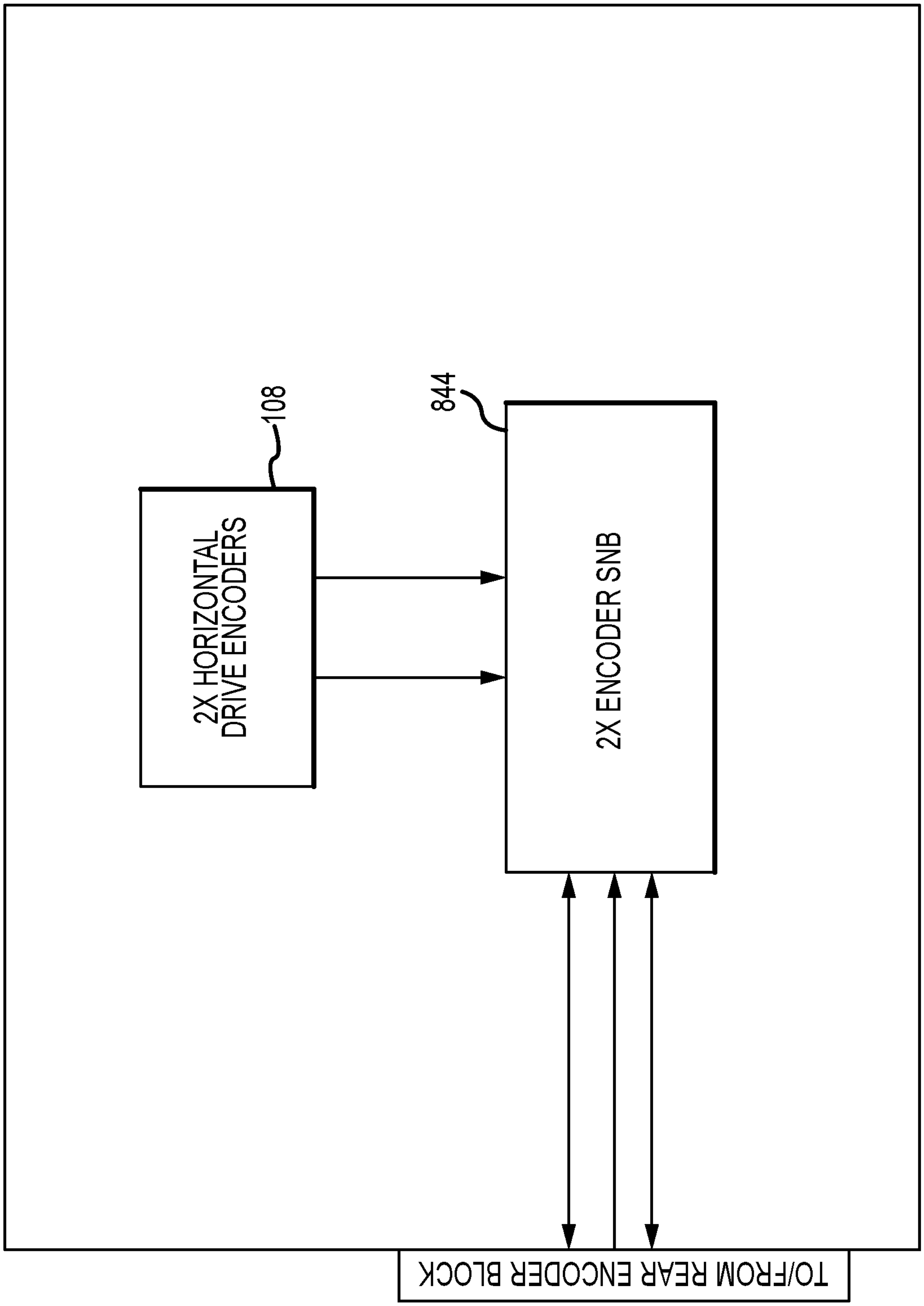
FIG. 27 is an electrical block diagram of the horizontal drive position encoder block in accordance with an exemplary embodiment of the present disclosure.

FIGS. 26 and 27 provide position indication from vertical and horizontal drives 114 and 118 through encoder boards 842 and 844 through the rear encoder block 836 and thence to the control box 108 for use in recording and tracking the positions determined via tractor 102 position and hence hole positions on the X-Y frame 104. These electrical distribution block diagrams FIGS. 20-27 reflect merely exemplary electrical routings. It is to be understood that many other configurations may also be implemented.

In addition, many changes may be made to the apparatus described above. For example, electric stepper motors may be utilized instead of the air motors 114 and 118 and the air motors in the lance tractor drive 102 in an all electrical version of the apparatus 100. The lance hoses (not shown) may be configured with coding such as RFID tags so that the position transducers or encoders 162 and friction wheel encoders 166 and 168 may be other than specifically as above described. In an all electrical design of the apparatus 100, the tumble box 110 may be eliminated and/or the sensor amplifier block 124 may be relocated, miniaturized, or incorporated into the electrical control box 108 or the hose stop collet block 126. The apparatus 100 may require less than three sensors 150, or less than eight receive coils 132 in each sensor head 150. Thus the above description is merely exemplary.

Figure 28:
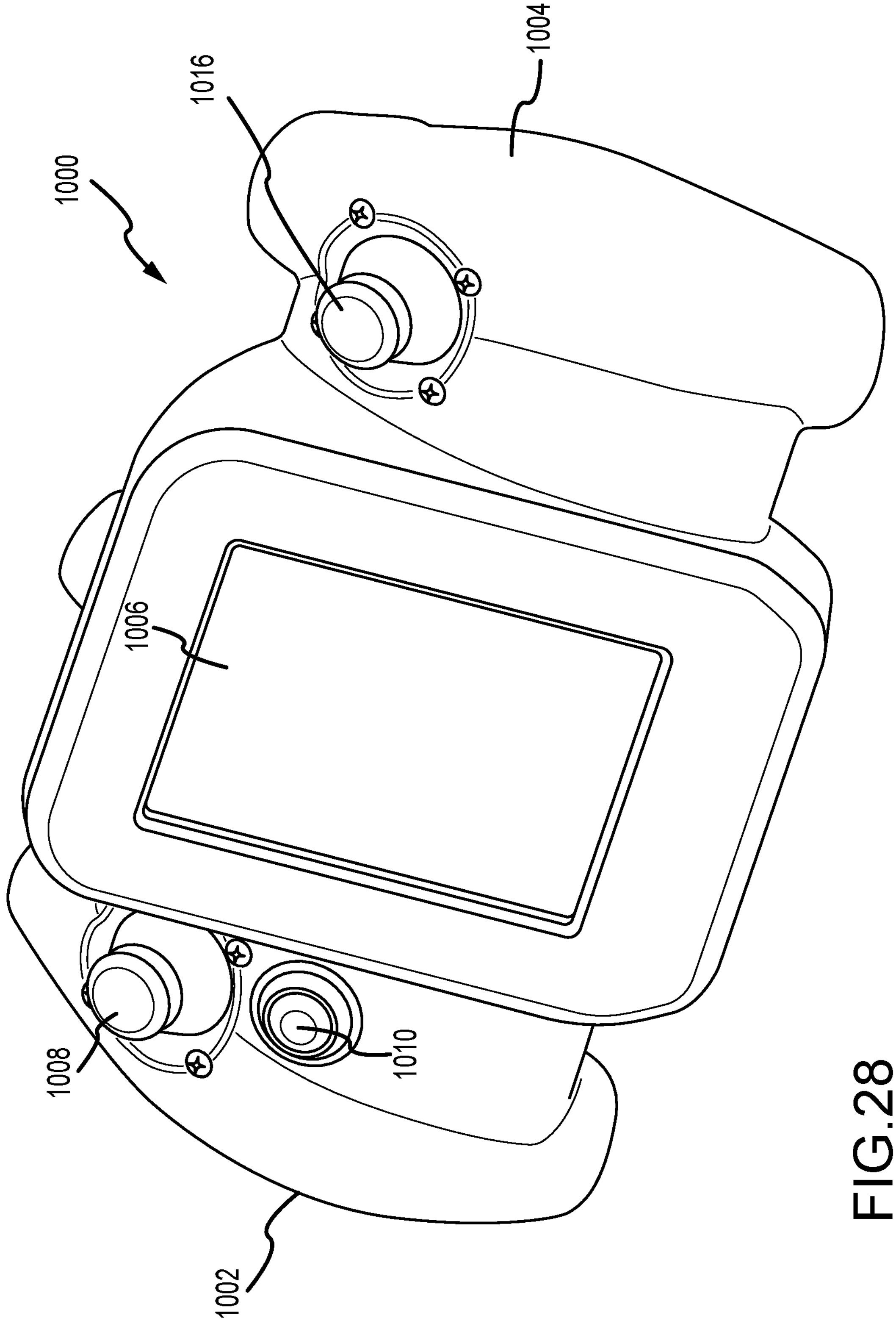
FIG. 28 is a perspective top view of an exemplary hand-held controller in accordance with one embodiment of the present disclosure.
Figure 29:
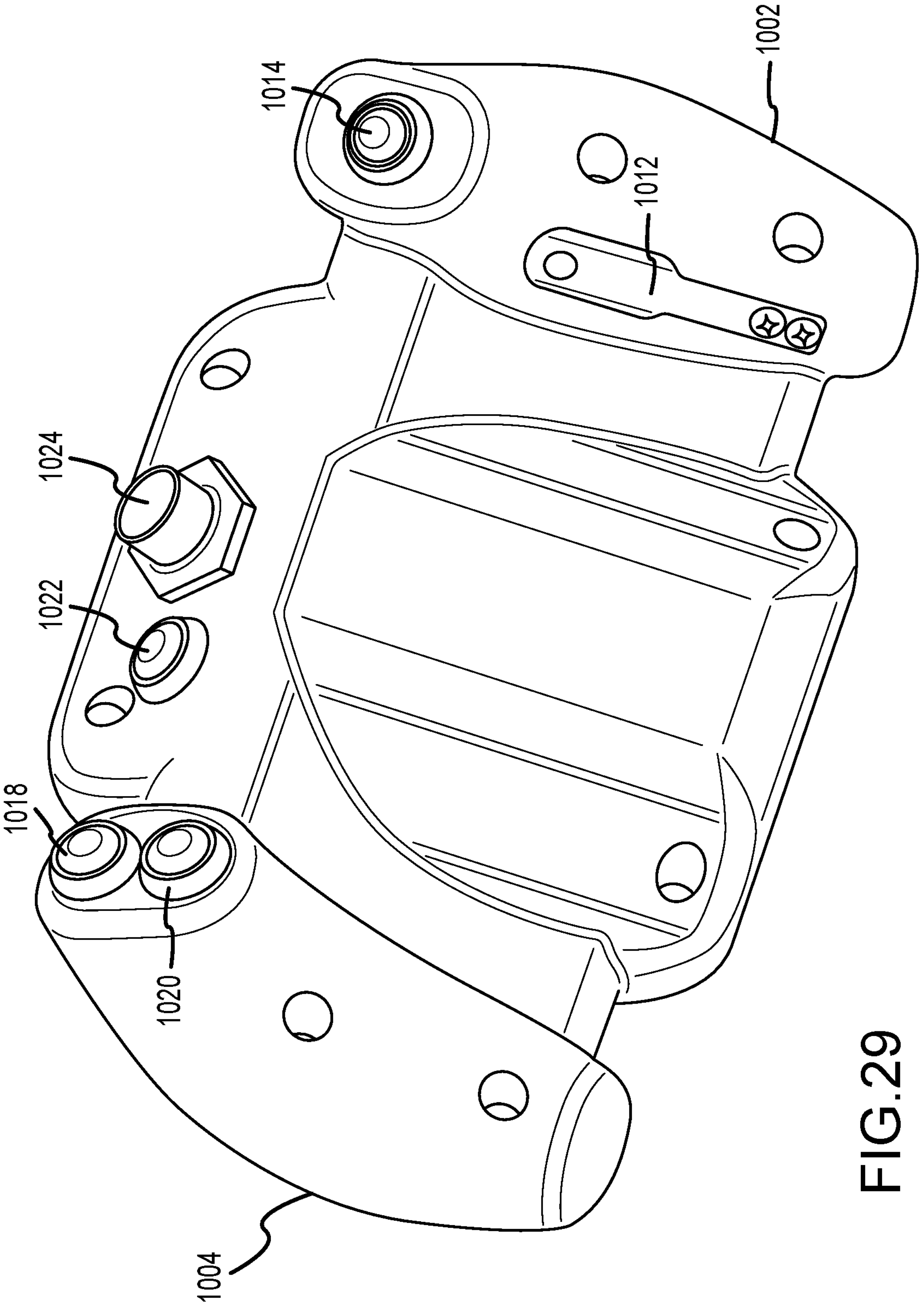
FIG. 29 is a bottom perspective view of the hand-held controller shown in FIG. 28.

One exemplary embodiment of a controller box 108 is a handheld remote controller 1000 shown in perspective top and bottom views in FIGS. 28 and 29. This controller 1000 is designed to be held in both hands by an operator standing a safe distance remotely from the apparatus 100. The controller 1000 has a left hand grip 1002 and a right hand grip 1004 sandwiching an LCD display screen 1006 therebetween. On the top of the left hand grip 1002 is a menu navigation thumb joystick 1008 for the operator to switch between various views and menus on the display screen 1006 by moving the joystick up, down, left and right. The joystick may also be momentarily pressed inward to make a particular selection on the display screen 1006. The left hand grip 1002 also has a separate kill switch button 1010 next to the joystick 1008 for normally dumping high pressure fluid pressure from the lances by operating the high pressure dump valve (not shown).

The left hand grip 1002 also has a safety dump lever 1012 mounted on its underside and visible in FIG. 29. This dump lever 1012 is spring loaded and must at all times be depressed by the operator's left hand fingertips gripping the controller 1000. This dump lever 1012 must be depressed in order to complete the electrical circuit to turn the high pressure fluid pump on via high pressure pump start/stop switch 1014 also mounted on the left handgrip 1002 in a position spaced ahead or in front of the menu navigation joystick 1008. This switch 1014 may be actuated by the operator's index finger while holding the controller 1000 in his or her left hand, and depressing the dump lever 1012. In addition, this dump lever 1012 must be continuously depressed to keep the dump valve (not shown) closed in order to supply fluid pressure to the lance nozzle. This dump lever 1012 operates as a "deadman" switch to dump high pressure fluid to atmosphere in the event that the operator were to let go of the left hand grip of the controller 1000.

The right hand grip 1004 has an X/Y positioner joystick 1016 for operating the air motors of the vertical and horizontal drive motors 114 and 118 on the X-Y frame 104. In addition, the right hand grip 1004 has two spring loaded momentary switches 1018 and 1020 located in front of the X/Y positioner joystick 1016. These are positioned for easy access by the operator's right hand index finger while the joystick 1016 is manipulated. The controller 1000, as a remote version of the control box 108 described above, also contains the SBC/SOM processor 804 and has a controller power switch 1022. The controller 1000 carries a cable connector 1024 that funnels electrical wire communication between the tumble box 110 and the other components of the system 100 such as the tractor 102, the encoders 114, 118, 162, 126 and the analog processor 124.

Figure 30:
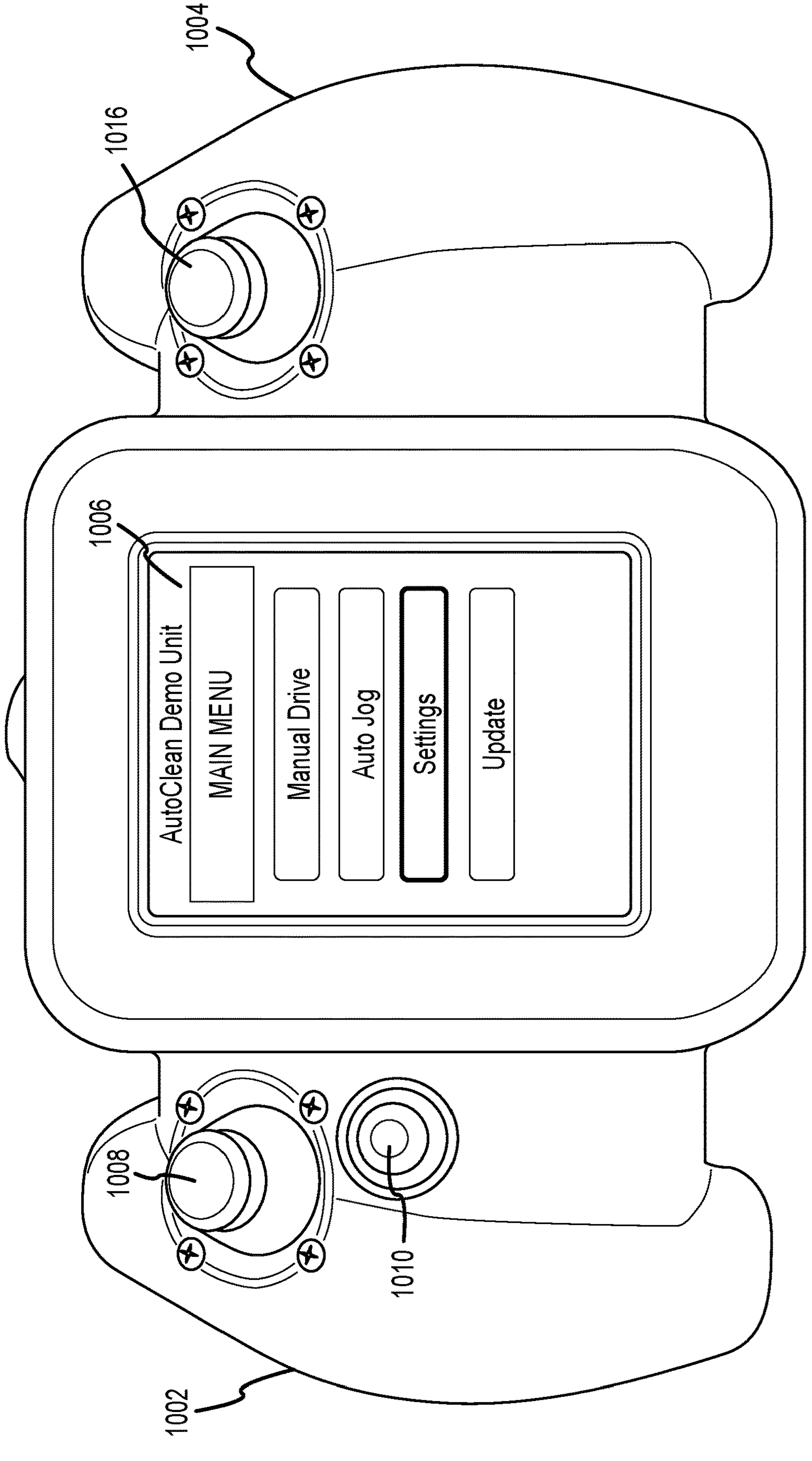
FIG. 30 is a plan view of the hand-held controller shown in FIG. 28 showing the Main Menu on the display screen.
Figure 31:
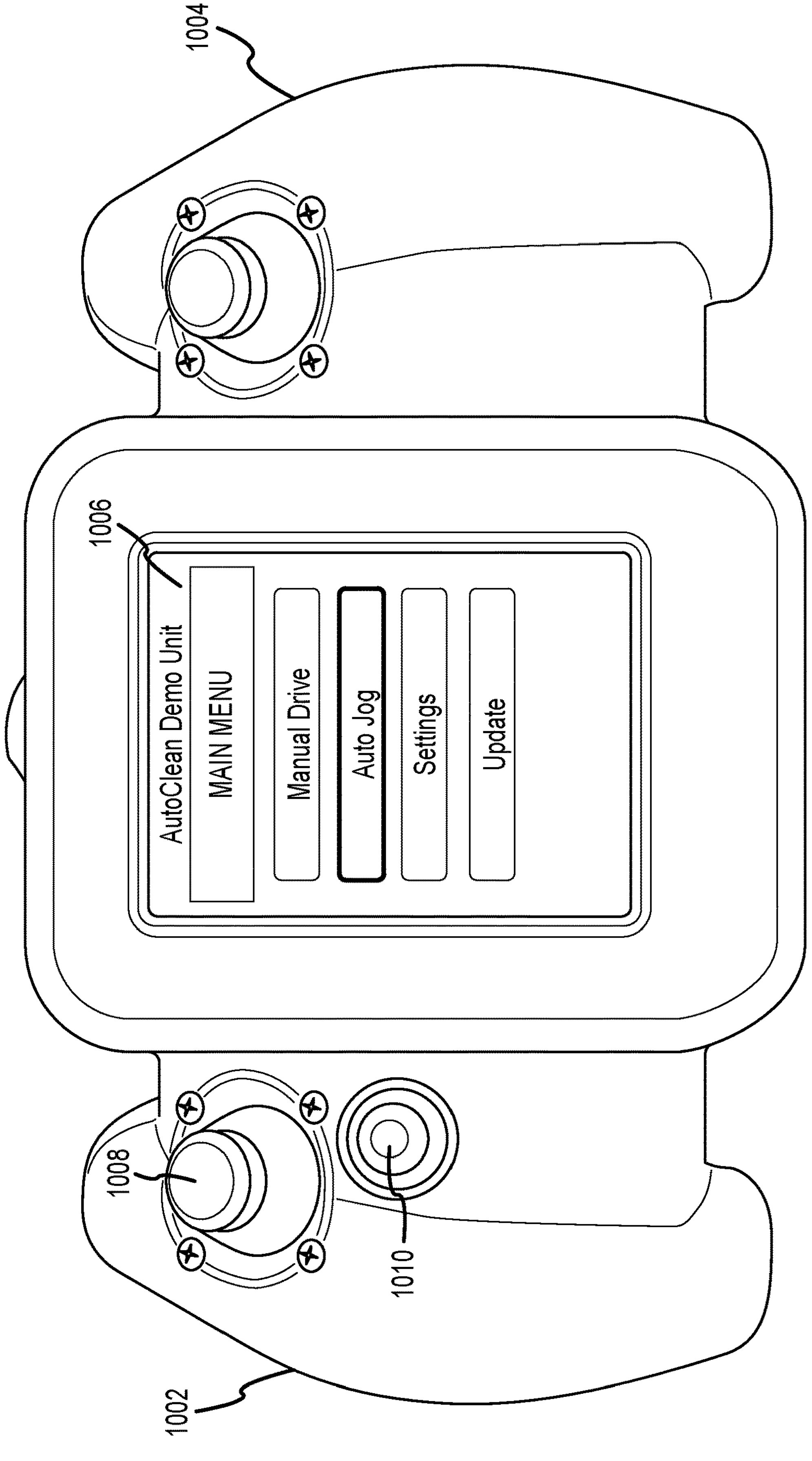
FIG. 31 is a plan view as in FIG. 30 with the Auto Jog selection highlighted.
Figure 32:
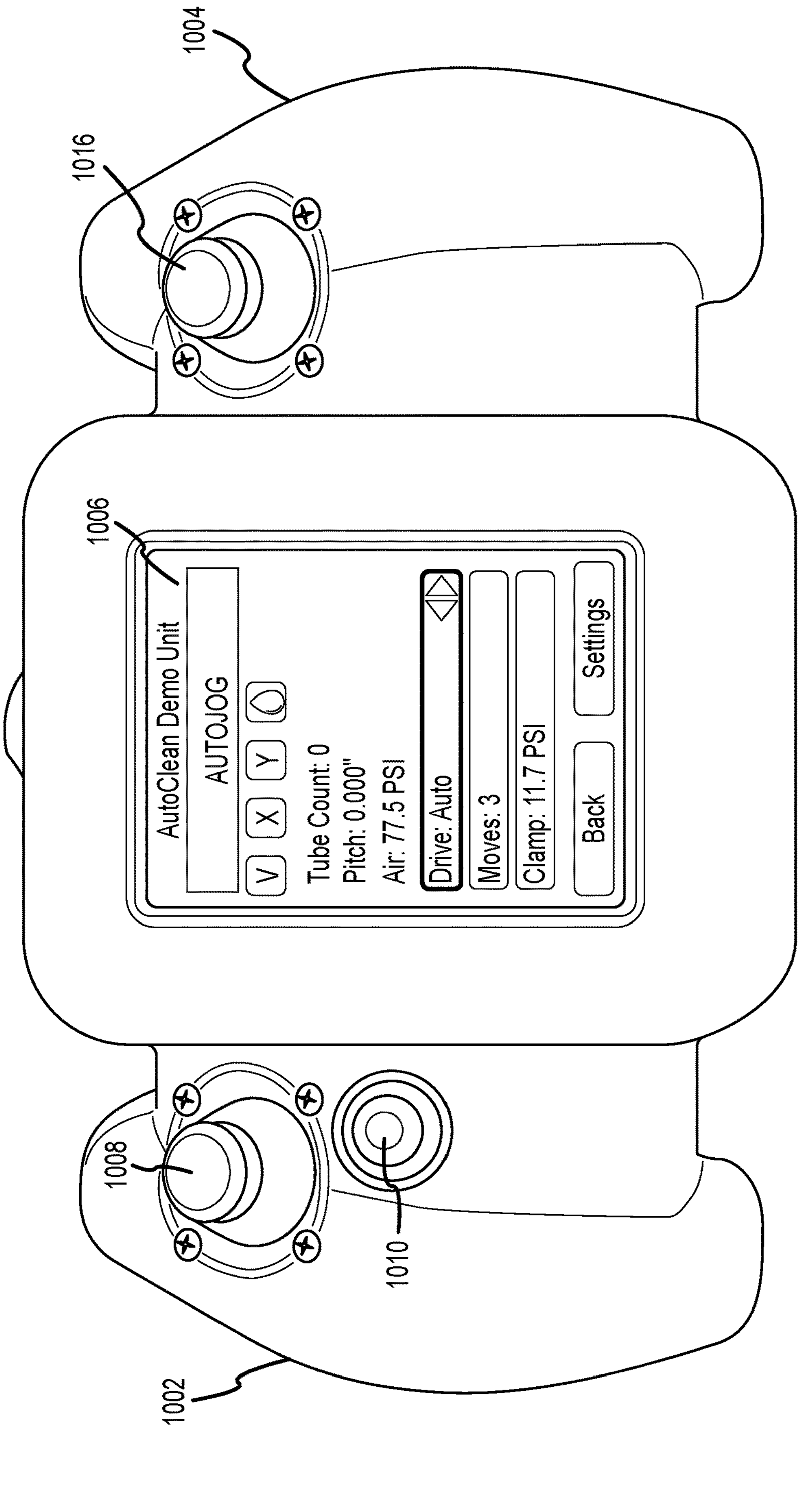
FIG. 32 is a plan view of the hand-held controller shown in FIG. 28 showing the AUTOJOG menu.

Turning now to FIGS. 30-34, operation of the system 100 via controller 1000 will now be described. Prior to operation of the system 100 via controller 1000, a measurement of the target tube sheet pitch and the pattern type is preferably made. This can be done manually, by physically determining the center to center distance between tubes, the edge to edge distance, and whether or not a triangle tube pattern or square tube pattern is used by the tube sheet. This information is entered into the controller 1000 when the settings screen is selected by maneuvering the menu selection joystick 1008 to highlight the settings menu, as shown in FIG. 30, and selecting it. The Settings menu (not shown) permits the operator to indicate screen brightness, contrast, vibration level for emergency warnings, etc. The operator then selects Auto Jog, as highlighted in FIG. 31. The screen will advance to that shown in FIG. 32. If the operator selects the highlighted Settings tab, a Job Settings screen, shown in FIG. 33 will appear. The measured pitch and hole pattern can then be selected from a dropdown menu. After the pitch and hole pattern are entered, the operator selects "Back" to return to the Auto Jog screen in FIG. 32.

Alternatively, a Pitch Learning mode may be used. In FIG. 30 a plan view of the controller 1000 showing screen 1006 after an operator turns on the system 100 by having pressed the controller power switch 1022 is shown. The operator then selects the Auto Jog option by selecting the highlighted option in FIG. 31. This brings up the AutoJog screen shown in FIG. 32. The user then selects the highlighted "Drive: Auto" selection and toggles it to show "Pitch Learn". (This Drive selection scrolls between "Auto", "Pitch Learn", and "Manual".) The operator then selects the number of tubes to be cleaned at a time, typically 3 if 3 lances are simultaneously being used, and enters this in the "Moves" selection.

Figure 33:
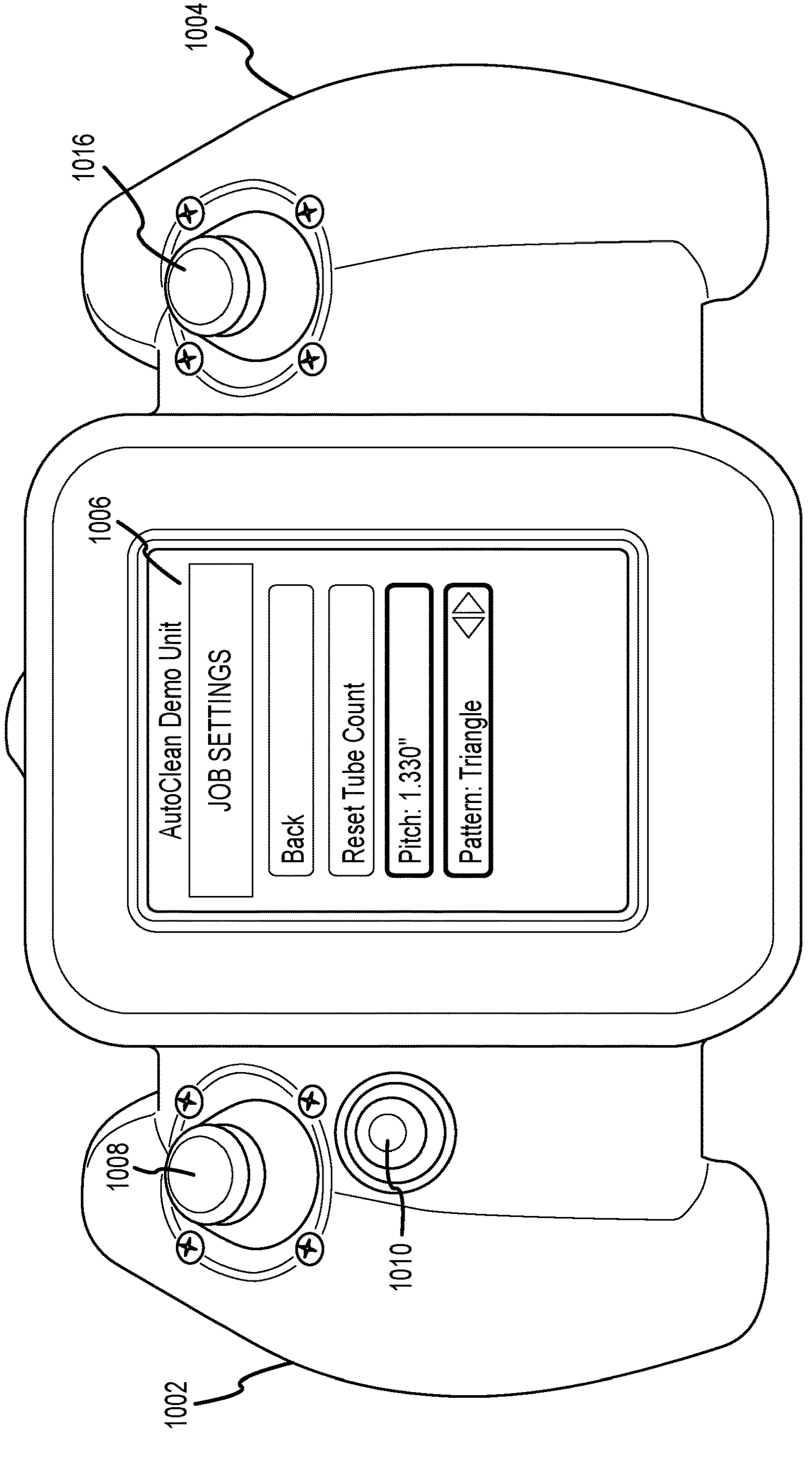
FIG. 33 is a plan view of the hand-held controller shown in FIG. 28 showing the JOB SETTINGS menu.
Figure 34:
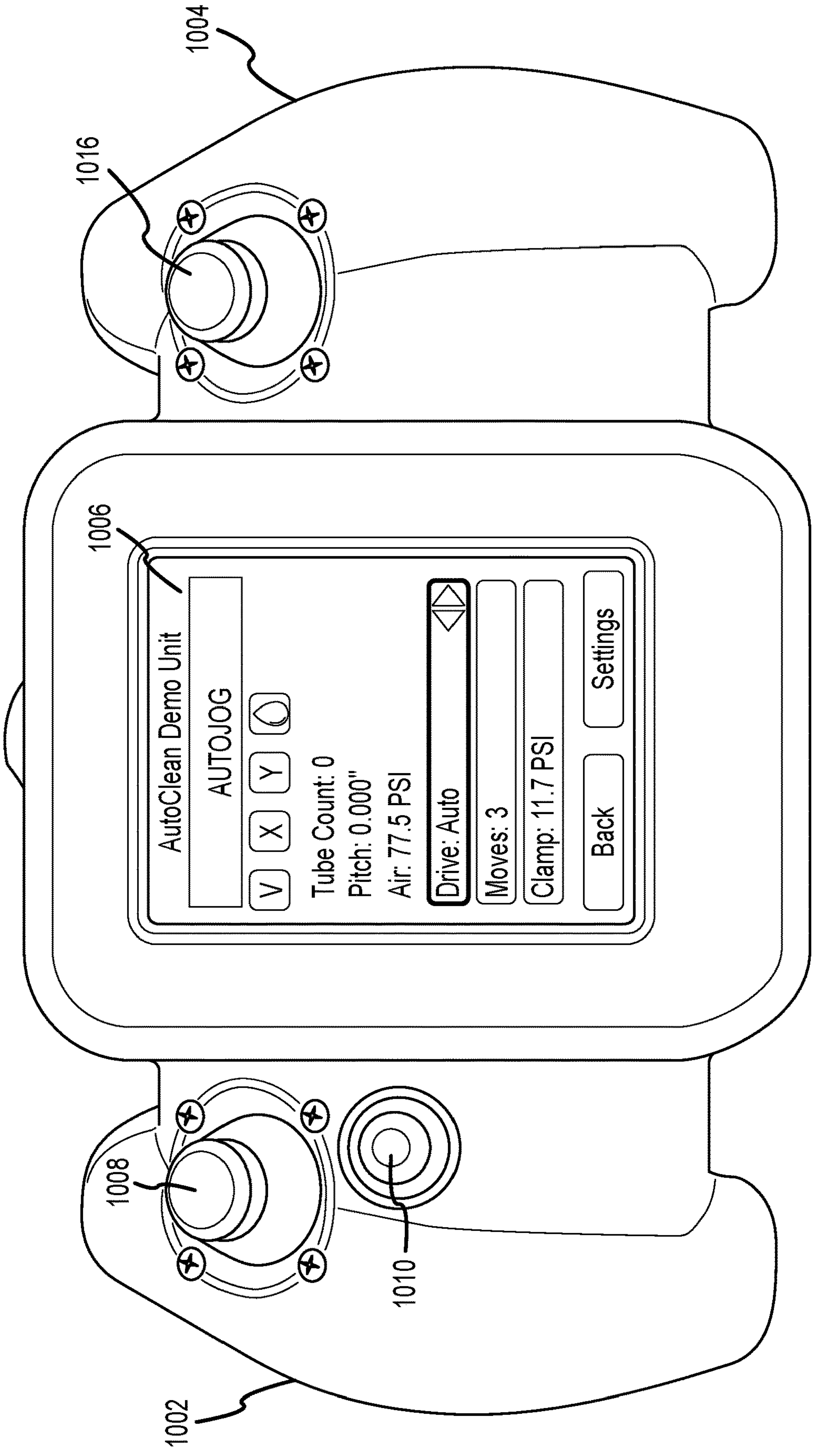
FIG. 34 is a plan view of the hand-held controller shown in FIG. 28 showing the AUTOJOG menu with the Drive: Auto option highlighted.

When in Pitch Learn mode, next the operator depresses the dump lever 1012 with his left hand and presses the high pressure water button 1014. The operator then presses the tractor forward button 1018 to feed the lances into the first 3 tubes, then withdraws them using the tractor Reverse button 1020. The controller 1000 will record 3 tubes in the "Tube Count" register. The operator then taps the X/Y positioner joystick 1016 in the direction of the next tubes to be cleaned. The system 100 will automatically senses tubes via sensors 150, described in detail above, and advance the number of "Moves" indicated on the screen. The operator then repeats pressing the tractor forward button 1018 and reverse button 1020. This process is repeated until either the last tubes are cleaned in the row or there is a different number of moves left to complete the row. In the latter case, the operator must then change the "Moves" as appropriate to complete operations on the row. The operator then taps the X/Y positioner joystick up or down to move to a new row of tubes. The positioner will automatically move up, down, or diagonally in accordance with the entered Pitch (square or triangular, and the learned pitch distance. The next row of tubes is cleaned in the same fashion. As this process is done, in the Learn mode, the detected Pitch is learned, refined and displayed on the screen as shown in FIG. 33.

After the Pitch is learned, the operator can select Auto in the AUTOJOG menu screen and proceed with automatic cleaning with the learned pitch and depth information. The operator simply taps the joystick 1016 to the right, and the controller will automatically move to the right three sensed holes. The operator then presses the tractor forward button 1018 to move the lances 101 into the aligned set of three tubes to be cleaned, followed by pressing the reverse button 1020 to withdraw the lances. The operator then taps the joystick 1016 again to the right to automatically move the lance drive again 3 holes. The process is then repeated until cleaning of the row of tubes is completed. The operator then taps joystick 1016 up or down to move to the next row and the process sequence is then repeated.

The information processed by controller 1000, including heat exchanger name, location, number of tubes, date and time cleaned, etc. number of tubes cleaned, number and location of tube blockages, obstructions encountered and removed, and the status of each tube is important information. This information may be automatically compiled, stored and tracked via external communication from the controller 1000 to external databases. The information can be utilized to track condition of the heat exchanger over time. This information may be utilized to establish replacement schedules, and identify process issues for asset owners, as well as track efficiencies from crew to crew and identify training opportunities. Finally the collection of such data can be effectively utilized as a permanent record of unbiased data to ensure regulatory compliance.

Figure 35:
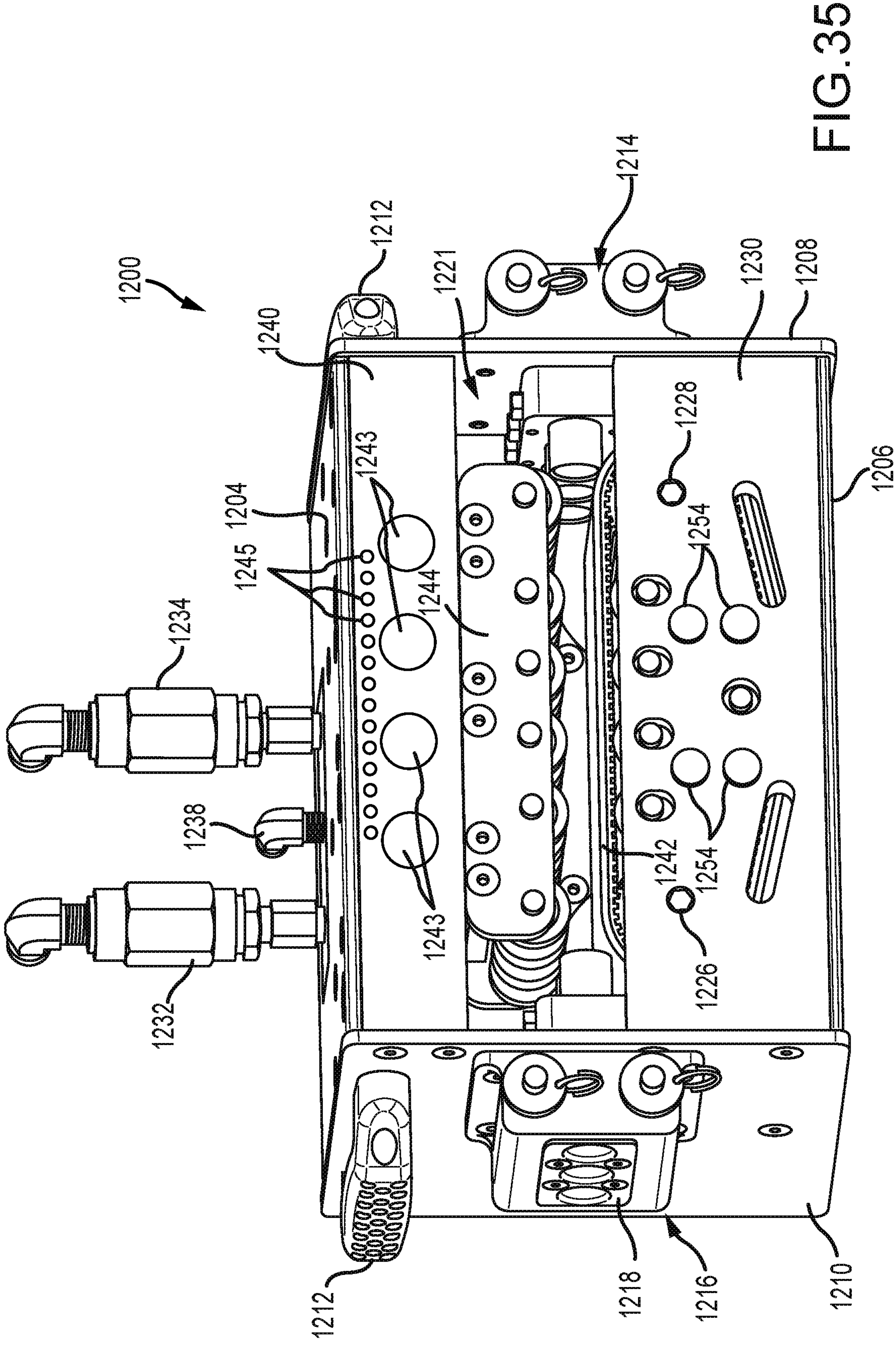
FIG. 35 is a side perspective view of another flexible lance drive apparatus incorporating an embodiment of an autostroke functionality in accordance with the present disclosure, shown with its outer side door removed.

A multiple lance drive apparatus 1200 incorporating an autostroke functionality for each lance driven by the drive apparatus is shown in FIGS. 35-43. Referring now to FIG. 35, a belt side view of the apparatus 1200 is shown with its side cover removed. The drive apparatus 1200 is a modified version of the lance drive 102 shown in FIG. 3. This drive apparatus 1200 has a rectangular box housing 1202 that includes a flat top plate 1204, a bottom plate 1206, front and rear walls 1208 and 1210, and two C shaped carry handles 1212, one on each of the front and rear walls 1208 and 1210. In FIGS. 35-38, sheet side covers (not shown) are removed so that internal components of the apparatus 1200 are visible.

Fastened to the front wall 1208 is an exit hose guide manifold 1214. Fastened to the rear wall 1210 below the carry handle 1212 is a hose entrance guide manifold 1216. Each of these manifolds 1214 and 1216 includes a set of hose guide collets 1218 for guiding one to three flexible lance hoses 167 (shown in FIGS. 3 and 9) into and out of the housing 1202. Each guide collet set 1218 is sized to accommodate a particular lance hose diameter. Hence the collet sets are changeable depending on the lance size to be driven by the apparatus 1200. Each of the manifolds 1214 and 1216 includes a sensor, typically a hall effect sensor (not shown) for detecting presence or absence of a metal hose stop element that is fastened to each flexible lance hose 167. These sensors are used to stop the apparatus 1200 when presence of a hose stop element is sensed. One hose stop element is preferably integrated into the threaded hose ferrule to which a nozzle is attached, at the end of each of the lance hoses. This particular hose stop element is configured to prevent inadvertent withdrawal of the flexible lance 101 out of the heat exchanger tube sheet 200 and into the drive apparatus 1200. The forward manifold 1214 may also include a physical collet assembly to mechanically prevent flexible lance nozzle 105 withdrawal into the drive apparatus 1200. Another hose stop element is removably fastened to each of the lance hoses 167 short of the rear manifold 1216 to prevent over insertion of a flexible lance 101 beyond the tube being cleaned. These removable hose stop elements may pairs of C shaped metal clamps that are fastened to the hose at a predetermined hose length from the nozzle end to indicate full insertion of the flexible lance through a target tube sheet and tube being cleaned.

Figure 36:
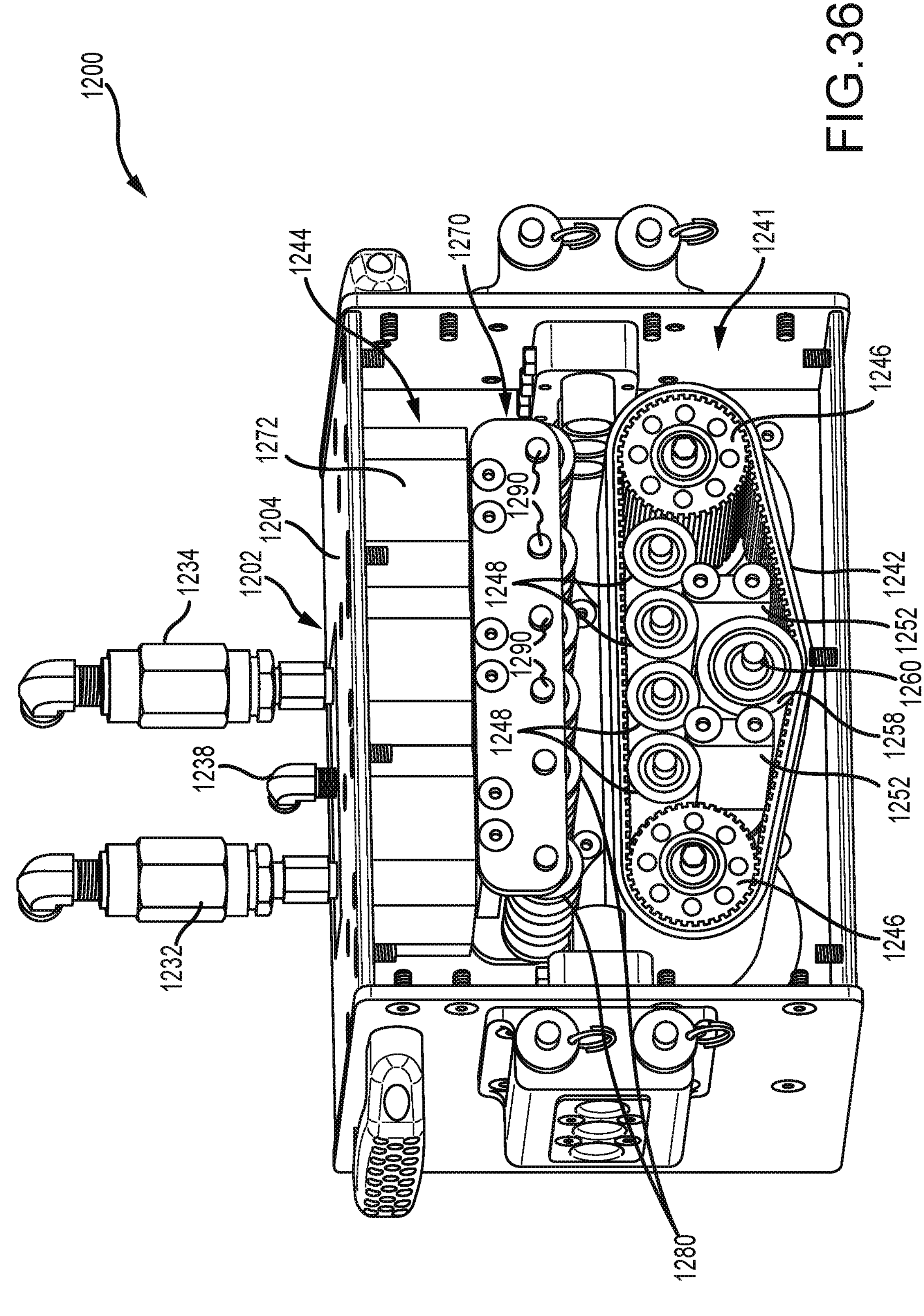
FIG. 36 is a side perspective view of the drive apparatus shown in FIG. 35 with upper and lower side plates removed to show the belt drive structure.
Figure 37:
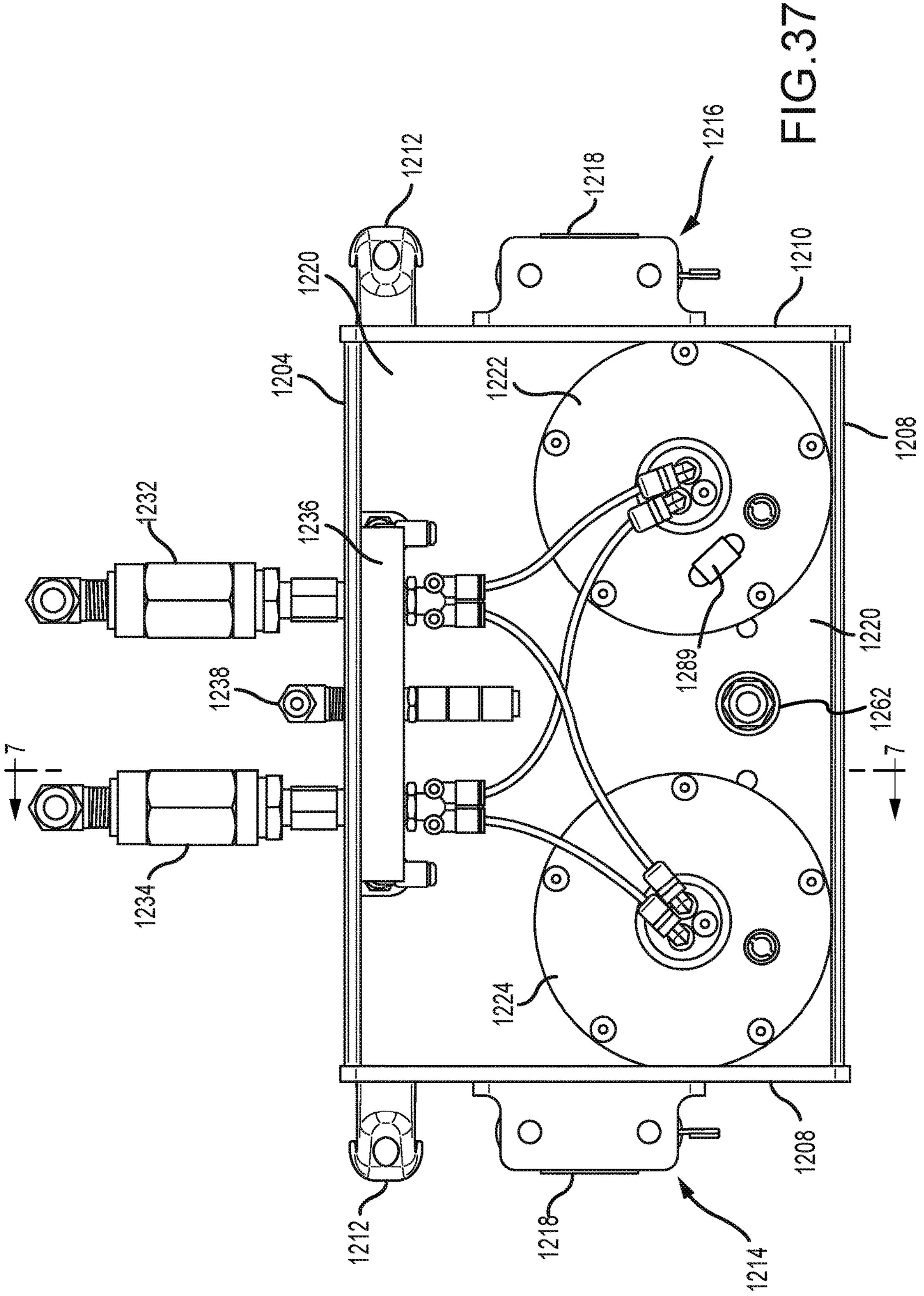
FIG. 37 is an opposite side view of the drive apparatus shown in FIG. 35, again with an outer side door removed for clarity.

A motor side view of the apparatus 1200 is shown in FIG. 37 with its outer side cover removed. The housing 1202 includes an inner vertical support partition wall 1220 fastened to the front and rear walls 1208 and 1210 and the top and bottom plates 1204 and 1206. This vertical support partition wall 1220 divides the housing into a first portion and a second portion. The first portion primarily houses hose fittings and splined belt drive motors 1222 and 1224. The second portion is a belt cavity 1221 through which flexible lance hoses (not shown in FIG. 35-37) are driven, and is shown at least in FIGS. 35, 36 and 37.

In this exemplary embodiment 1200, the inner vertical support wall 1220 carries a pair of pneumatic drive motors 1222 and 1224 mounted such that their drive shafts 1226 and 1228 protrude laterally through the support wall 1220 into the second portion, or belt cavity 1221, between the inner vertical wall 1220 and an outer vertical lower support wall 1230, shown in FIGS. 35 and 36. Each of the drive motors 1222 and 1224 is connected to pneumatic forward feed line 1232 and reverse feed line 1234 through a feed manifold 1236 fastened to the top plate 1204. A clamp pressure feed line fitting 1238 also passes through this feed manifold 1236 to a hose clamp assembly 1244 described below. Each of the drive motors 1222 and 1224, shown in FIG. 37, is preferably a compact radial piston pneumatic motor. However, hydraulic or electric motors could alternatively be used.

On the belt side view shown in FIGS. 35 and 36, the belt cavity 1221 is defined between the inner vertical wall 1220 and the outer lower support wall 1230. A separate upper outer support wall 1240 aligned with the lower outer support wall 1230 provides a rigid joint between the front and rear walls 1208 and 1210 while providing a visible space between the entrance and exit guide manifolds 1216 and 1214. This spacing helps an operator thread up to three lances laterally into and through the belt cavity 1221 between an endless drive belt 1242 and a vertically arranged hose clamp assembly 1244. Each of the support walls 1220, 1230 and 1240 is preferable a flat plate of a lightweight material such as aluminum or could be made of a structural polymer with sufficient strength and rigidity to handle the motor operational stresses involved.

The upper outer support wall 1240 carries a set of electrical connectors 1243 for communication of sensed hose position, hose stop presence and belt position via the drive motor direction and position sensors described below, and a set of 14 LED lights 1245 to indicate the status of each of these elements during drive apparatus operation.

A perspective view of the apparatus 1200 with the upper and lower outer vertical support walls 1240 and 1230 removed is shown in FIG. 36. Each of the motor drive shafts 1226 and 1228 has an axial keyway fitted with a complementary key (not shown) that engages a corresponding keyway in a cylindrical splined drive roller 1246. Thus each drive roller 1246 is slipped onto and keyed to the drive shaft so as to rotate with the drive shaft 1226 or 1228. Each splined drive roller 1246 has its outer cylindrical surface covered with equally spaced splines extending parallel to a central axis of the roller 1246. The distal ends of each of the drive shafts 1226 and 1228 extends through the lower outer support wall 1230 and are primarily laterally supported from plate 1220. Additional lateral support for the distal ends of each of the drive shafts 1226 and 1228 is provided by the lower outer support wall 1230 via cone point set screws engaging a V groove (not shown) in each of the shafts 1226 and 1228.

Each of the drive shafts 1226 and 1228 may extend fully through the splined drive rollers 1246 or the drive motors 1222 and 1224 may each be fitted with a stub drive shaft which fits into a bearing within the proximal end of each of the splined drive rollers 1246. A separate bearing supported drive shaft 1226 or 1228 extends out of the distal end of each drive roller 1246 and is fastened to the support wall 1230 via cone point set screws. In such an alternative, the drive rollers 1246 become part of the drive shafts 1226 and 1228.

Spaced between the two splined drive rollers 1246 is a set of four cylindrical guide rollers 1248 that are supported by the lower outer support wall 1230 via a vertical plate 1250 and a pair of rectangular vertical spacer blocks 1252 that are through bolted to both the lower outer support wall 1230 and inner vertical wall 1220 through the vertical plate 1250 via bolts 1254. While the bolts 1254 pass through the vertical plate 1250, their distal ends extend further through, and are threaded into holes through the inner vertical wall 1220.

Tension on the endless belt 1242 is preferably provided by a tensioner roller 1258 between the spacer blocks 1252 that is supported from the inner vertical plate 1250 on an eccentric shaft 1260, and accessed through an opening 1262 in the inner vertical wall 1220, shown in FIG. 37. Rotation of this eccentric shaft 1260 essentially moves the tensioner roller 1258 through a slight arc downward or upward to provide more or less tension on the belt 1242.

To replace the belt 1242, the four bolts 1254 are loosened and screws holding the outer lower wall 1230 to the front and rear walls 1208 and 1210 are removed. The cone point set screws engaging a V groove (not shown) in each of the shafts 1226 and 1228 are then removed. The assembled structure including the vertical plate 1250, spacer blocks 1252, belt 1242, drive rollers 1246, and guide rollers 1248 can then be removed as a unit by sliding the drive rollers 1246 off of the keyed shafts 1226 and 1228.

Each of the splined drive rollers 1246 preferably has equally spaced alternating spline ridges and grooves around its outer surface which are rounded at transition corners so as to facilitate engagement of the complementary shaped lateral spline ridges and grooves in the inner side or surface of the endless belt 1242. Elimination of sharp transitions at both ridge corners and groove corners lengthens belt life while ensuring proper grip between the rollers and the belt. The outer surface portion or cover of the endless belt 1242 is preferably flat and smooth to prevent undesirable hose abrasion and degradation and is preferably formed of a suitable friction material such as polyurethane. The inner side portion of the belt 1242 is preferably a harder durometer polyurethane material bonded to the outer side cover. For applications with significant hydrocarbons or high lubricity products, grooves machined across the cover at 90° to the direction of belt travel may be utilized for improved traction performance against the flexible lance hose.

Spaced above the belt 1242 in the belt cavity is a lance hose clamp assembly 1244 including an idler roller assembly 1270. This exemplary clamp assembly 1244 includes a multi-cylinder frame 1272 fastened to the top plate 1204 of the housing 1202. The multi-cylinder frame 1272 carries two or three single acting pneumatic cylinders with pistons 1274 (shown in FIG. 38) that are each connected to a carrier block 1276 and connected together via a pair of parallel spaced idler carrier frame rails 1278. Six idler roller sets 1280 are carried by the frame rails 1278, each vertically positioned directly above either one of the drive rollers 1246 or one of the guide rollers 1248. Each piston 1274 may be spring biased such that without pneumatic pressure, the pistons 1274 are all withdrawn or retracted fully into the multi-cylinder frame 1272 so as to provide access space between the idler roller sets 1280 and the drive belt 1242 for insertion and removal of flexible lance hoses.

Figure 38:
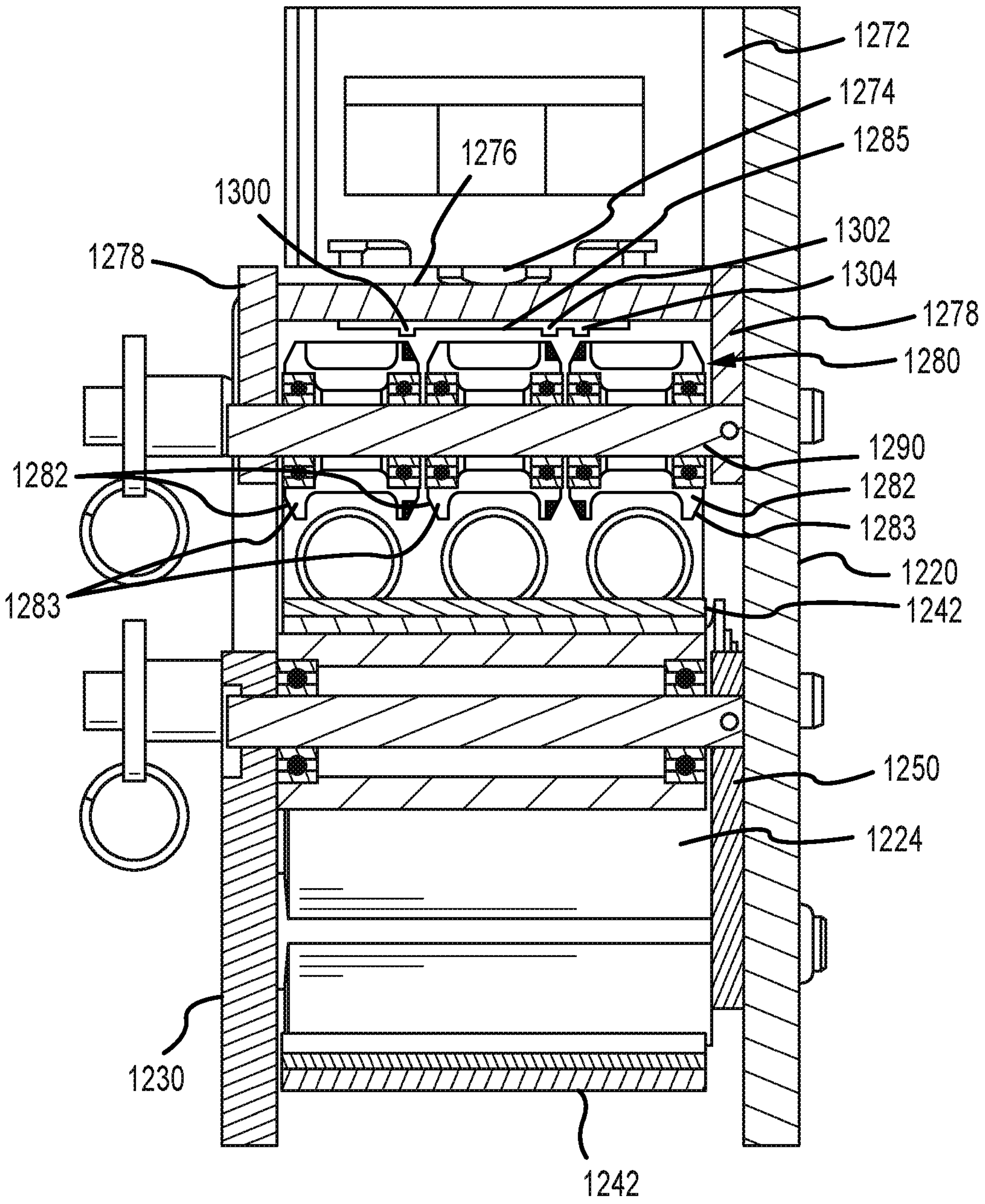
FIG. 38 is a partial vertical sectional view through belt and lance portion of the drive apparatus shown in FIG. 35 taken on the line 38-38.

One set of idler rollers 1280 is made up of three independent spool shaped bearing supported rollers 1282 shown in the sectional view through the apparatus 1200 shown in FIG. 38. This particular set 1280 of idler rollers 1282 is positioned adjacent hall effect sensors 1300, 1302, and 1304, mounted on a circuit board 1285 fastened to the underside of the carrier block 1276, to detect distance traveled by each hose being driven through the drive apparatus 1200. Each roller 1282 is a spool shaped roller having a central concave, or U shaped, groove bounded by opposite circular rims 1283. One of the rims 1283 of each roller 1282, preferably an inboard rim 1283, carries a series of 24 magnets embedded around the rim 1283, each having an opposite polarity in series facing radially outward.

The printed circuit board 1285 fastened to the underside surface of the upper support block 1276 carries 12 hall effect sensors 1300, 1302, and 1304 each arranged adjacent one of the rims 1283. As each roller 1282 rotates, for example, by 15 degrees, one of the magnets passes beneath its adjacent sensor 1300, 1302, or 1304 on the pcb 1285 and a polarity change is detected. These changes are counted and converted to precise relative lance distance traveled for that particular lance (not shown). In this way, very precise distance traveled by the lance can be determined irrespective of the distance traveled by an adjacent lance driven by the drive apparatus 1200.

Each idler roller set 1280 is carried on a stationary axle 1290 fastened between the idler frame rails 1278. Only one idler roller set 1280 needs to have separate rollers 1282. The other 5 idler roller sets 1280 each preferably is a bearing supported cylindrical body having three axially spaced annular spool shaped concave grooves each being complementary to the anticipated lance hose size range. These annular grooves may be V shaped, semicircular, partial trapezoidal, rectangular, or smooth U shaped so as to provide a guide through the apparatus 1200 and keep the flexible lances each in desired contact with the endless belt 1242 during transit. Preferably the idler rollers 1280 and the individual rollers 1282 are made of aluminum or other lightweight material capable of withstanding bending loads and each groove has a concave arcuate cross-sectional shape. Each groove may alternatively be a wide almost rectangular slot with corners having a radius profile to allow the hoses to have limited lateral movement as they are fed through the apparatus 1200. This latter configuration is preferred in order to accommodate several different lance hose diameters in the drive apparatus 1200.

In use, the drive apparatus 1200 may be utilized with one, two, or three flexible lances simultaneously. In the case of driving one lance, such a lance would be preferably fed through the center passage through the inlet manifold 1216 and beneath the center groove of the idler rollers 1280. When two lances are to be driven, the inner and outer passages through collets 1218 would be used. If three lances are to be driven, one would be fed through each collet 1218 and corresponding groove of each idler roller 1280.

In alternative embodiments, more than three lance drive paths may be provided such as 2, 4 or five. Electrical or hydraulic actuators and motors may be used in place of the pneumatic motors shown and described. Although a toothed or spline endless belt is preferred as described and shown above, alternatively a smooth belt or grooved belt with wider spline spacing could be substituted along with appropriately configured drive rollers. The guide rollers 1248 are shown as being smooth cylindrical rollers. They may alternatively be splined rollers similar to the drive rollers 1246.

Figure 39:
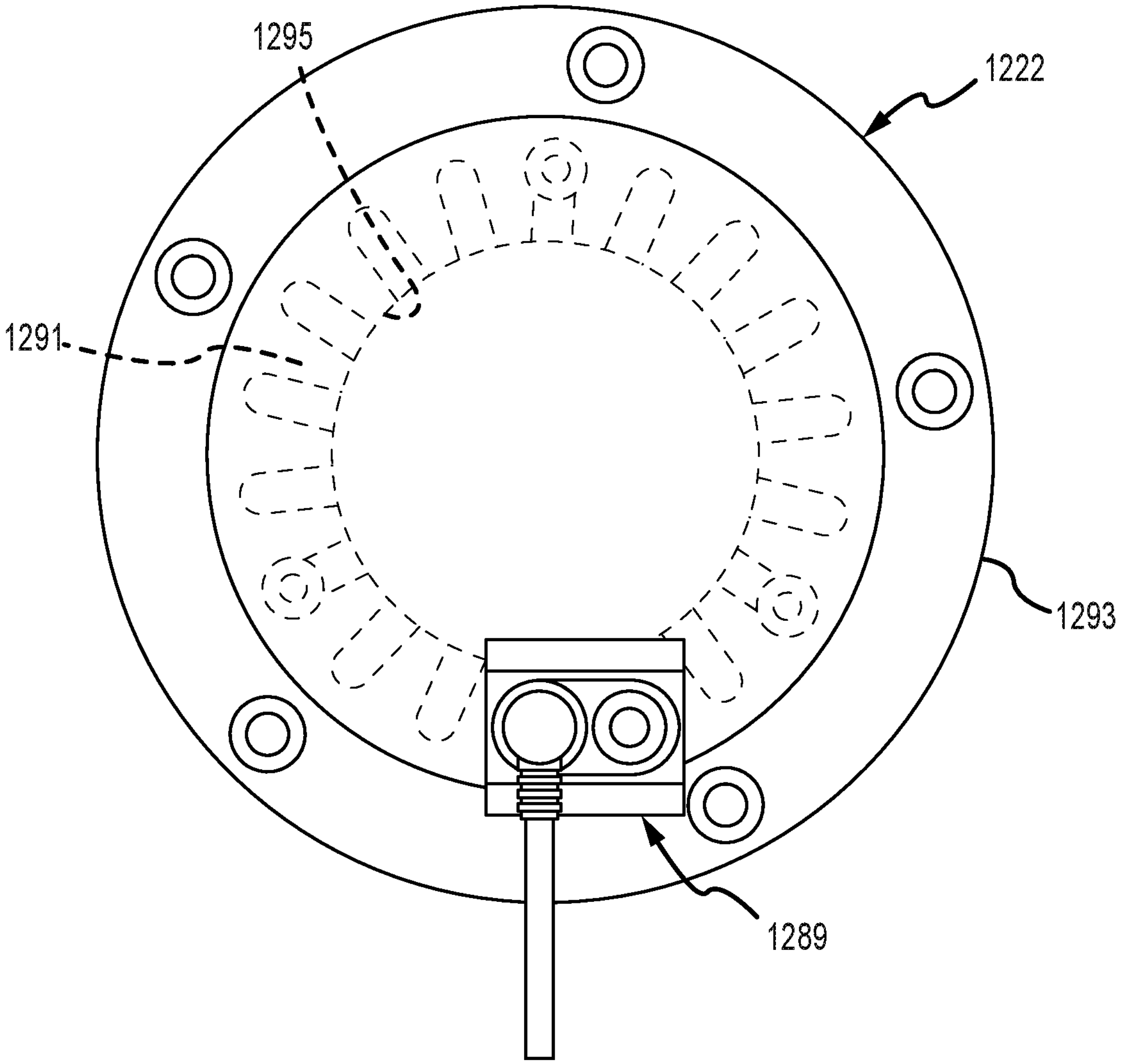
FIG. 39 is a separate side view of one of the belt drive motors with its outer cover shown transparent to reveal an internal annular disc shaped target fastened to the rotor of the motor.

One of the splined belt drive motors, motor 1222 in the illustrated embodiment 1200, is configured with a differential hall effect sensor 1289 to monitor speed and direction of rotation of the drive motor 1222, and hence lance travel along the belt 1242 through the drive apparatus 1200. A separate plan view of drive motor 1222 is shown in FIG. 39, with its outer cover shown transparent. An annular notched target disc 1291 is fastened to the motor rotor inside the motor housing 1293, having spaced notches forming, in this illustrated embodiment, 18 teeth 1295. The differential hall sensor 1289 fastened to the housing 1293 senses passage of each of these teeth 1295 and outputs a voltage change signal for each edge transition as a tooth passes beneath the sensor 1289. The signal output is indicative of direction of rotation and speed, which mathematically equates to belt position and hence lance travel distance, assuming no slip between belt and lance hose.

By comparing the position of the lance hoses, i.e. distance traveled as sensed from the follower roller set sensors 1300, 1302, and 1304, for each of the lance hoses, with the belt drive motor speed and direction sensed distance from the signal output of sensor 1289, any mismatch is correlated to lance to belt slippage. For example, when driving three lances, if a large mismatch on only one lance occurs, in a three lance drive operation, this is typical of a blockage or restriction in that particular tube being cleaned.

If all the lances, 3 in the illustrated case, have a similar mismatch with respect to the belt drive motor sensed position and/or feed distance, this will be indicative of insufficient clamp pressure. In this instance the operator can simply increase clamp pressure to compensate for the mismatch. The operator can then re-zero the lance position and look for subsequent mismatch. Alternatively an automatic control system can perform this function, as is described in more detail below. In such a case the clamp pressure may be automatically increased to minimize slippage, up to a predetermined maximum applied pressure applied to the follower rollers 1280.

In the event of a single lance hose mismatch, as first described above, this indicates a restriction, or blockage, occurring in the tube being cleaned. The sensed mismatch preferably is used to trigger an autostroke sequence of motor 1222 instigating reversals as generally described above, to move the lance hoses back and forth in the tubes being cleaned, until the blockage or restriction is reduced or eliminated, as determined by re-zeroing the position of the mismatched lances and continuing the cleaning operation as needed, until another mismatch above an operator determined threshold occurs.

The drive apparatus 1200 preferably includes the comparator circuitry to compare the signals from each of the sensors 1300, 1302, and 1304 with the signal from the drive motor sensor 1289. The drive apparatus 1200 may also include a comparator that compares the signals between each of the sensors 1300, 1302 and 1304, as the lance position of each lance should be relatively close to each other since the only drive force is from the contact with the drive belt 1242. Alternatively the comparator circuitry may be handled via microprocessor in a system controller such as hand held controller 1000, separate from the apparatus 1200. In either case, an exemplary signal processing circuit is shown, in simplified block diagram form in FIG. 40 and process flow diagrams FIGS. 41, 42 and 43.

Figure 40:
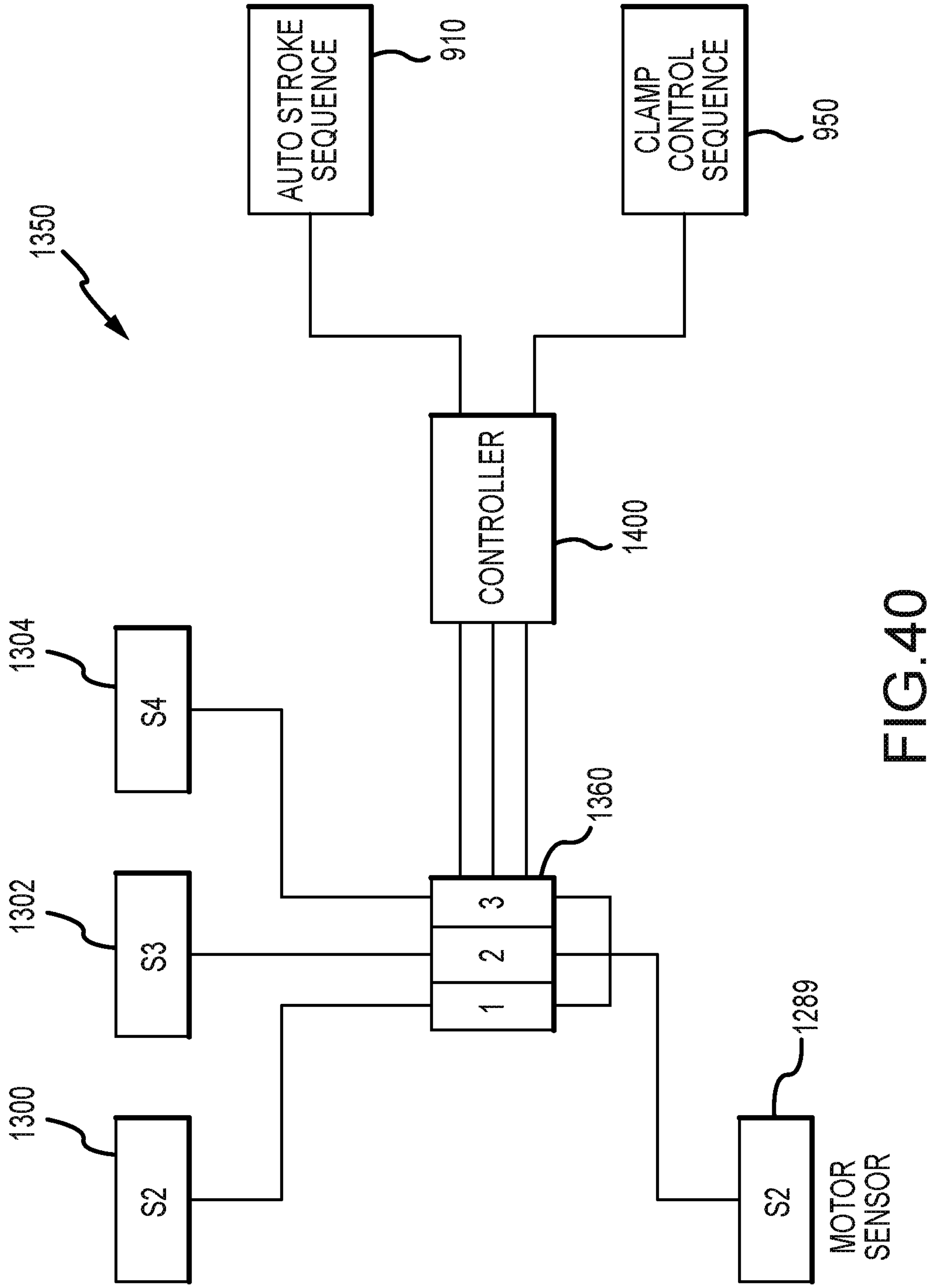
FIG. 40 is a simplified block diagram of the signal processing circuitry in the apparatus shown in FIGS. 35-39.
Figure 41:
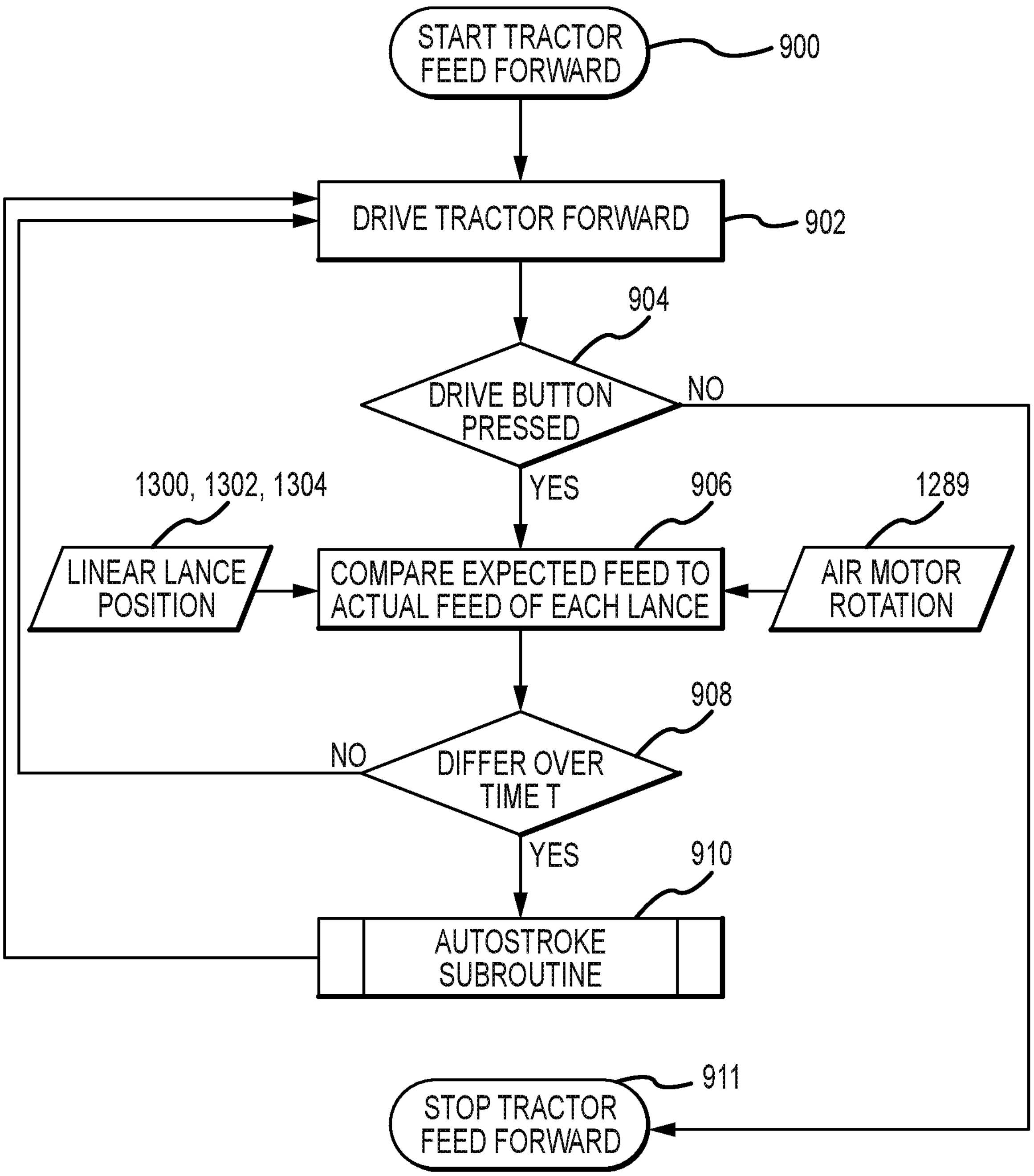
FIG. 41 is a process flow diagram for the Autostroke functionality for the embodiment shown in FIGS. 35-39.
Figure 42:
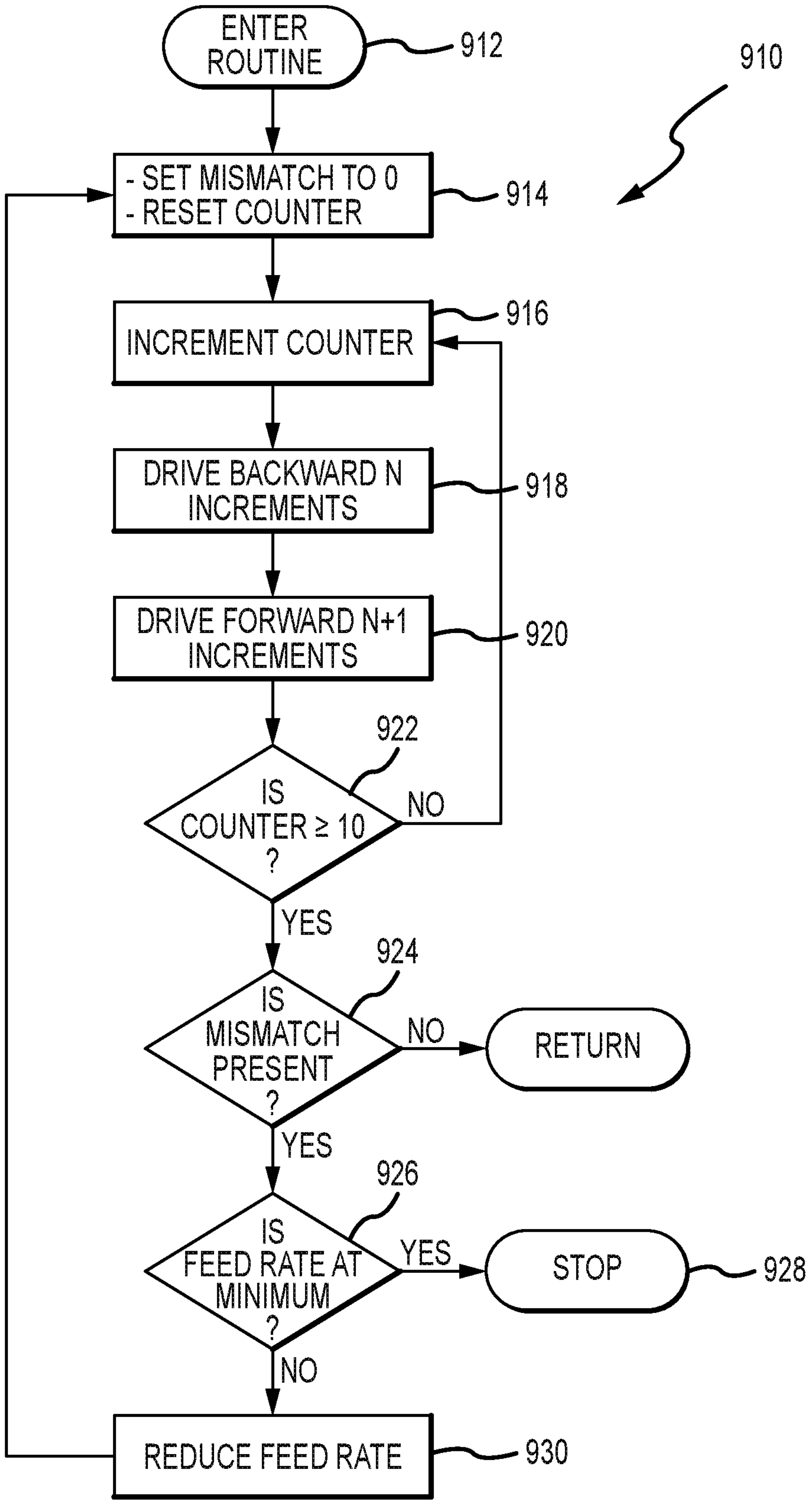
FIG. 42 is a process flow diagram for the Autostroke subroutine in accordance with the present disclosure.

A simplified functional block diagram 1350 for autostroke control for the apparatus 1200 is shown in FIG. 40. Motor sensor 1389 feeds an input into three comparators 1360 each of which in turn send an input to controller 1400. At the same time, the sensors 1300, 1302 and 1304 also send signals to the comparators 1360. The controller 1400 serves three major functions: autostroke 910 to remove tube blockages, clamp pressure control 950, and emergency dump valve actuation. The autostroke functionality is described below with reference to FIGS. 41 and 42. The clamp pressure may be adjusted manually or may be controlled automatically as described in FIG. 43.

The emergency dump signal actuation function of controller 1400 simply sends a signal to the valve driver board MCU in the tumble box 110 if the controller 1400 receives a signal through the comparators 1360 that exceeds a second threshold from any one of sensors 1300, 1302 or 1304. This second threshold is indicative of a reversal of count direction from the sensors 1300, 1302, or 1304 or an excessive rate of lance speed. If any one lance hose reverses direction while the drive motor sensor 1258 is sensing forward motion of the motor, this indicates that the lance hose is being pushed backward, which should not ever happen unless a catastrophic event such as nozzle breakage or hose rupture during system operation is occurring. If such an event is sensed, a signal is sent to the valve driver board in the tumble box 110 to immediately divert high pressure cleaning fluid pressure to atmosphere by de-energizing the dump valve. Utilizing the follower roller position sensors 1300, 1302, and 1304 for this purpose permits very fast response times, on the order of milliseconds, to initiate an automatic dump action which can greatly diminish the chances of such an unanticipated event from resulting in injury to an operator of the apparatus 100 or 1200.

Operational control of the apparatus 1200, basically called a smart tractor, begins in operation 900, when a feed forward operation is selected by the operator on a cleaning system control box 108. This control box 108 may be floor mounted or may be the hand-held controller 1000, described above with reference to FIGS. 28-34, that communicates either wired or wirelessly with the apparatus 1200. For ease of explanation here, the hand held controller 1000 is described. Once feed forward operation is selected, control transfers to tractor forward operation 902 which queries in operation 904 whether the Drive forward button 1018 has been pressed. If the answer is yes, control transfers to comparator operation 906. If, however, in query operation 904, the Drive button 1018 has not been pressed, control immediately transfers to stop operation 911 where tractor forward operation is stopped.

Assuming the Drive button 1018 has been pressed, forward operation 902 energizes the drive motors 1222 and 1224 causing the endless belt 1242 to pull 1, 2 or 3 lances along the pathway between inlet manifold 1214 and outlet manifold 1216 through the apparatus 1200. As the lances move along the endless belt 1242, their movement causes the follower rollers 1282 to rotate, sending signals, picked up by sensors 1300, 1302 and 1304, to comparators 1360. At the same time, sensor 1289 on motor 1222 sends a similar signal to each of the comparators 1360.

Operation 906 receives linear lance position information from sensors 1300, 1302, and 1304 via the circuit board 1285 for each lance. Comparator operation 906 also receives belt position information from the sensor 1289 on the drive motor 1222. In operation 906, the received signals are converted to actual lance feed distances and the expected feed distance is compared to the actual feed distance of each lance.

Control then transfers to query operation 908 where the question is asked whether expected feed to actual feed of each lance differs over time. In other words, whether there is a mismatch between expected feed distance and actual distance fed. If below a user settable difference, the answer is NO, a "continue drive" control signal is sent back to operation 902 and the tractor continues to drive the lances forward. On the other hand, if there is a substantial difference in expected to actual feed for any one of each individual lance, then the answer is Yes, control transfers to Autostroke subroutine operation 910, shown in detail in FIG. 42. On the other hand, if there is a substantial difference in expected to actual feed, i.e. a mismatch, for more than one individual lance detected in operation 908, this is indicative of insufficient clamp pressure, and the controller 1400 transfers control to clamp pressure operational sequence 950 described in FIG. 43.

An autostroke routine 910 begins in operation 912. Control then transfers to reset operation 914 where the lance to motor difference for each lance is set to zero and an incrementing counter is set to zero. Control then transfers to operation 916 where the increment counter is advanced by 1. Control then transfers to operation 918 where drive apparatus 1200 is signaled to drive backward for N increments. Control then transfers to operation 920, where the drive apparatus 1200 is signaled to drive forward N+1 increments. Control then transfers to query operation 922.

Query operation 922 asks whether the counter value is greater than or equal to 10. If the answer is no, control transfers back to operation 916 where the counter is incremented again and the process operations 918, 920 and 922 are repeated. If the answer in query operation 922 is yes, the counter is greater than or equal to 10, control transfers to query operation 924 which asks whether a mismatch between lance position and motor position counts still exists. If the answer is yes, a mismatch is still present, this indicates that there is still a blockage or restriction in the target tube or tubes. Control transfers to operation 926.

In query operation 926, the question is asked whether the apparatus 1200 feed rate is at a minimum. If the answer is yes, control transfers to stop operation 928. This indicates that an unremovable obstruction has been encountered, requiring manual operator action to mark the tube as blocked or take other appropriate action. In query operation 926, if the answer is no, feed rate is not yet at minimum, control transfers to operation 930.

In operation 930, the tractor feed rate of apparatus 1200 is reduced. Control then transfers back to operation 914 where the lance to drive position mismatch is set to zero and the incrementing counter are set to zero, and the iterative process of operations 916 through 924 is repeated.

On the other hand, if in query operation 924, there is no mismatch present, this means that either no obstacle is now sensed, i.e. the obstacle has been cleared, and control returns to operation 902, where normal tractor drive forward operation is resumed, until the drive button in operation 904 is released, which stops tractor forward feed in operation 911.

Figure 43:
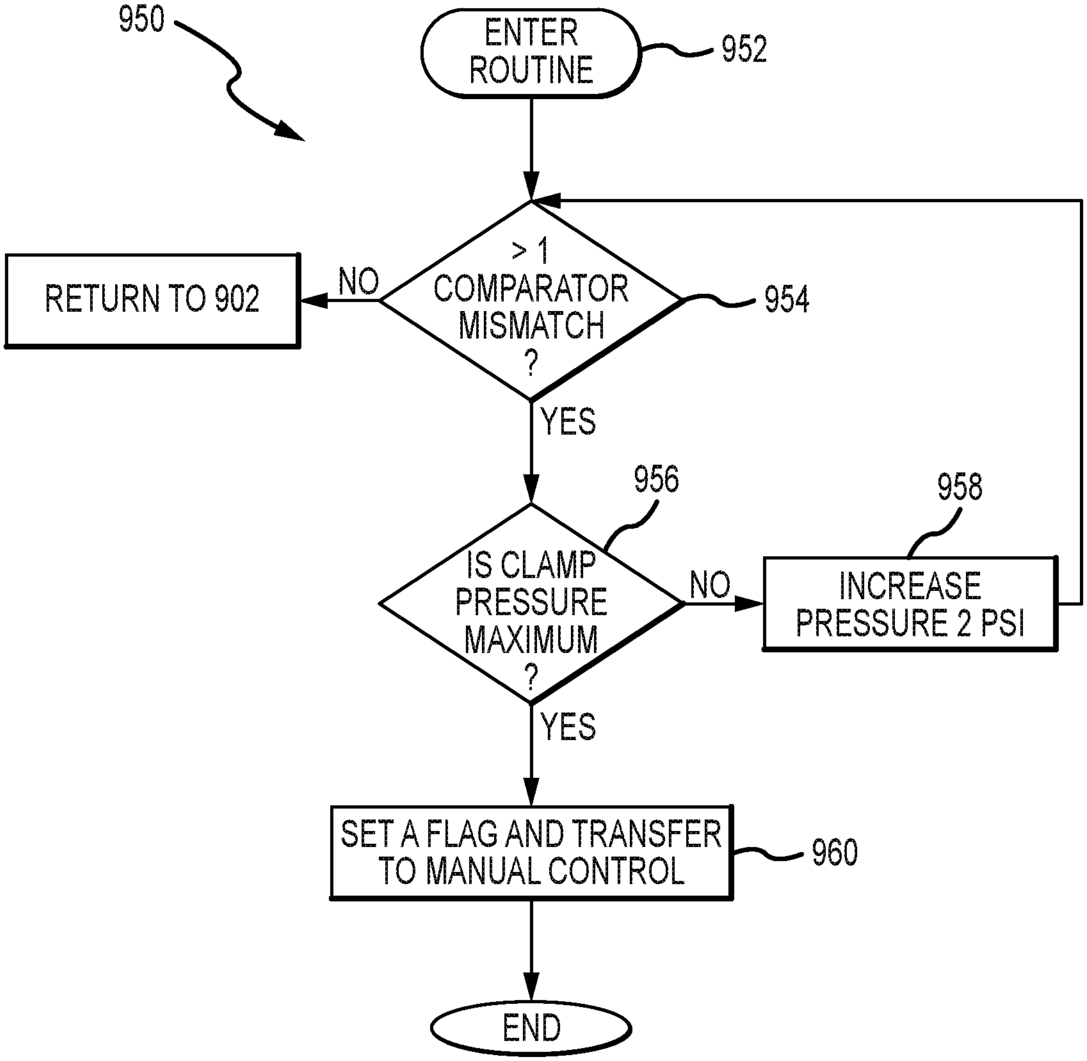
FIG. 43 is a process flow diagram for the automated clamp force and pressure control in accordance with the present disclosure.

A process flow diagram 950 of the controller 1400 is shown in FIG. 43 for adjusting the clamp pressure of pistons 1274 applying force against the follower rollers 1280 to press follower rollers 1280 against a set of one or more hoses (not shown) being driven along the endless belt 1242. Basically, if there is a mismatch as determined by comparators 1360 for more than one lance hose, this is potentially indicative of insufficient clamp pressure or force, and hence the position of lances 167 are not together. The process begins in operation 952. The controller 1400 senses if a lance hose registers a mismatch in operation 952. Control then transfers to query operation 954, which asks if there is more than one lance comparator signaling a mismatch. If so, control transfers to query operation 956. If not, control transfers back to operation 902 described above.

In query operation 956, the query is made whether clamp pressure is at or above a predetermined maximum pressure. If the answer is yes, control transfers to operation 960 where a flag is sent and clamp pressure control may be transferred to manual for the operator to assess and take appropriate action. If the answer in query operation 956 is no, pressure is not at maximum, control transfers to operation 958, where clamp pressure is increased by a predetermined amount, such as 2 psi. Control then transfers back to query operation 954 and operations 954, through 956 are repeated until the mismatch determined in operation 954 is less than or equal to 1. Control then transfers back to operation 902 described above.

Controller 1400 may also be configured via process 950 to automatically synchronize position of all lance hoses 167 being driven by the drive 1200 and maintain synchronization between these lance hoses 167. For example, during lance insertion into the heat exchanger tubes, if a mismatch between the several lance positions is less than the maximum, but exists, they will not be together. When a first lance encounters its full insertion hose stop the controller 1400 continues to drive apparatus 1200 until all three lances 167 are at full insertion as sensed by contact with the hose stops. When the operator instructs the controller to reverse direction, the lances 167 will begin withdrawal in synchronization. During reverse direction of the lance hoses 167 if a mismatch between the sensed positions of each lance hose is again sensed, less than the maximum, which would indicate an obstruction, the controller 1400 continues to withdraw the lance hoses 167 until all of the hose crimps are detected. Controller 1400 signals the drive motors to stop, with all lance hoses 167 resynchronized in the fully withdrawn position. The drive 1200 may then be repositioned to clean another set of tubes.

Figure 44A:
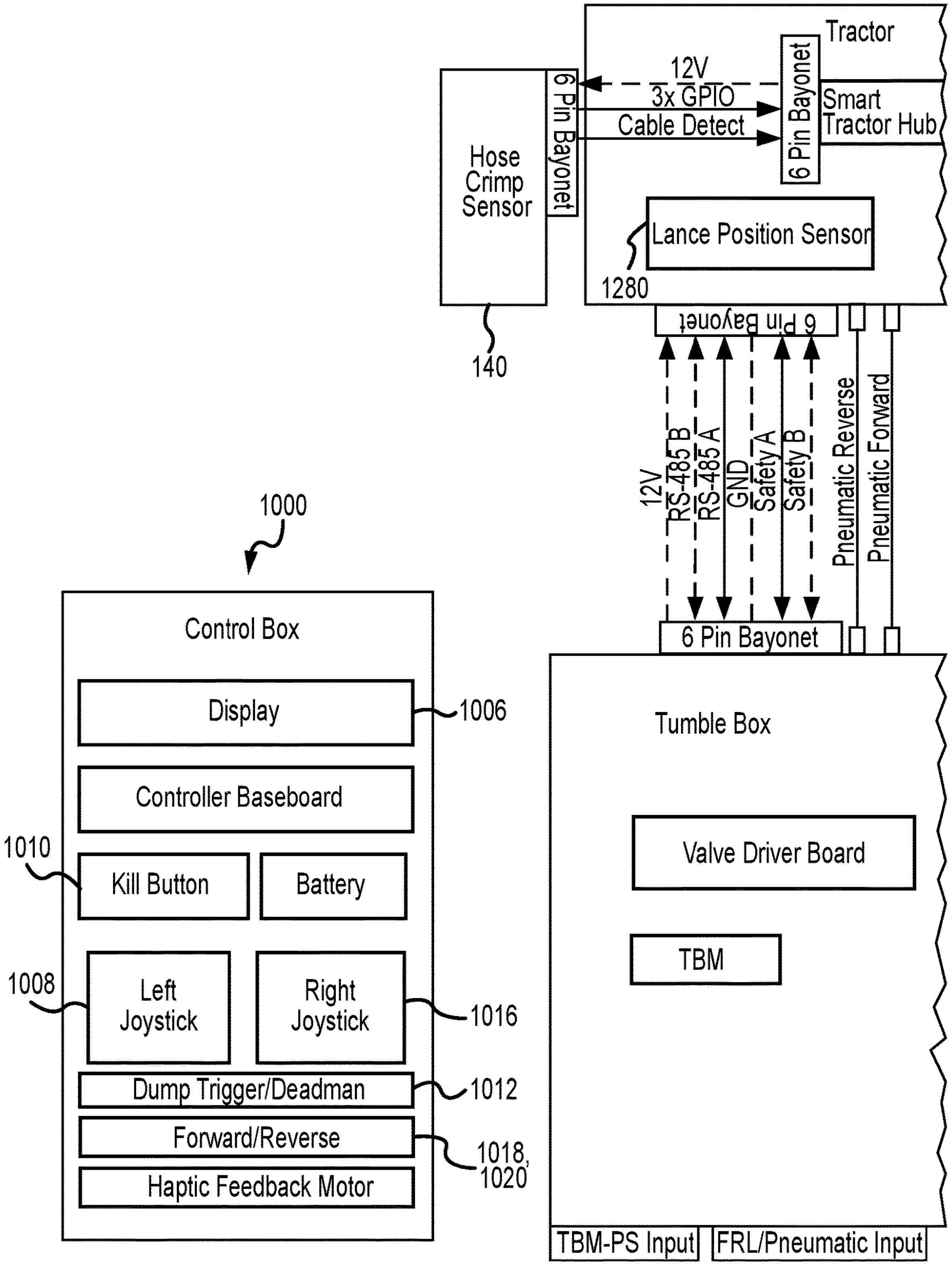
FIG. 44A-44B together is a simplified schematic of the electrical components of an alternative embodiment of the apparatus.
Figure 44B:
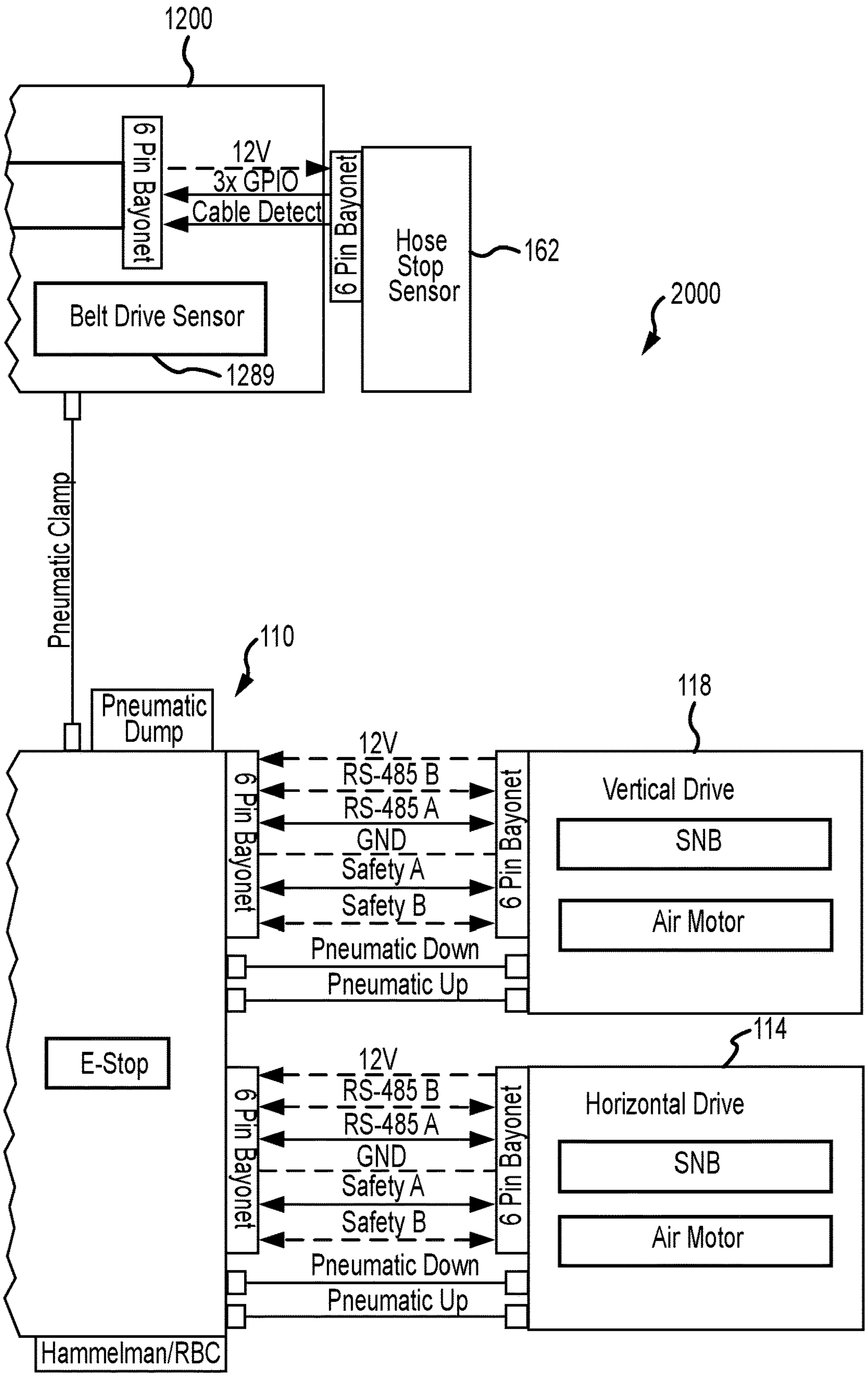

FIG. 44 is an exemplary control/power distribution diagram of an alternative embodiment of an apparatus 2000 in accordance with the present disclosure similar to apparatus 100 shown in FIGS. 1-43 and described above. Apparatus 2000 includes a smart tractor drive 1200 that is mounted on an X-Y positioner 104 that is in turn fastened to a tube sheet 200. The tractor 1200 receives pneumatic power and optionally electrical power from a tumble box 110. This tumble box 110 includes a valve driver board, connections from a high pressure pump (not shown), connections from a pneumatic pressure source such as an air compressor (not shown), and various pneumatic valves for controlling air pressure to and from the horizontal drive 114 and vertical drive 118, and optionally may house a pneumatic/electrical motor generator, e.g. an air motor generator (AMG) to provide control power and sensor power for the various elements of the apparatus 2000. Alternatively electrical power may be conventionally supplied through external connection.

The tumble box 110 communicates with a control box 108 which may be floor mounted as illustrated in FIG. 1 or preferably may be a hand held remote controller 1000 as described with reference to FIGS. 28-34 above. This control box 108, or controller 1000 includes a display 1006, a kill button 1010, left joystick 1008, right joystick 1016, dump trigger 1012, forward and reverse feed controls 1018 and 1020, a battery, and a haptic feedback motor for generating a vibrational signal to the operator holding the controller 1000.

This haptic feedback motor vibrational signal is a safety feature to alert the operator to an unexpected event and/or potential unsafe condition. These events may include a sensed obstruction in the tube being cleaned, sensed end of lance travel indicated by the lance stop sensors or a mismatch between lances as determined from the lance position sensors. These lance position sensors are described in more detail below. Operation of the haptic feedback vibrational signal may be especially helpful and important to the operator in extremely noisy conditions, when visual observation of lance drive operation is obscured, and/or as a warning when the operator is not paying sufficient attention to the operation of the system.

The tractor 1200 carries a belt drive sensor 1289 and three lance position sensors 128 as above described, and at the rear of the tractor 1200 a hose stop sensor 162 and at the front end a set of hose crimp sensors 140. These hose crimp and hose stop sensors may be as above described or each may be any suitable metal sensing device that can indicate the presence or absence of either a hose crimp (that indicates a connection to a nozzle at the end of each of the lance hoses 167), or a physical stopper such as a conventional "football" fastened to the lance hose 167 that signifies full insertion of the lance hose through the target heat exchanger tubes. Each of these sensors 140 or 162 may each optionally be a physical switch.

This alternative apparatus 2000, shown in FIG. 44, does not include the sensor heads 150 and analog processor 124 as above described. The bracket 120 attached to the X-Y positioner 104, and guide tubes 122 are, however provided, and the hole locating sensor heads 150 may optionally be added.

Many variations are envisioned as within the scope of the present disclosure. For example, all processing circuit components of the control box 108 may be physically housed therein. Alternatively, the components within the control box 108 could be integrated into the drive apparatus 102 or into the housing of the drive apparatus 1200. In the case of drive apparatus 1200, the control circuitry may be housed in the separate hand-held controller 1000 described above. The number of drive reversals in the Autostroke sequence may be any number. A value of >=10 was chosen as merely exemplary. In alternative embodiments, electrical or hydraulic actuators and motors may be used in place of the pneumatic motors shown and described herein. Different automated routines and subroutines than as described above may be utilized to control the operation of the apparatus 1200. In addition, the apparatus 1200 may be configured with physical status lights to indicate to the operator mismatches between lances and the drive motor, lance relative position, as well as such things as feed rate and other indications of proper operation. These may include lance withdrawal stop indicators and lance insertion stop indicators positioned on the inlet and outlet manifolds 1214 and 1216 or on the side of the housing 1202 as shown in FIG. 35. Alternatively, these indicators may be reflected in popup warnings displayed on the LCD screen 1006 of the handheld controller 1000. The belt drive sensor 1289 described above, may, instead of being mounted on the drive motor 1222, may instead be mounted to any one of the guide rollers 1280. These indicators, or indications, may be utilized by the operator to monitor and adjust synchronization of the lances being driven by the apparatus 1200 when they reach the fully inserted position by contact with the lance insertion stop, and vice versa, when the lances are fully withdrawn, via contact with the hose crimps. This permits the operator to adjust the lance positions such that they all start from an aligned position together, and the operator can adjust for and reposition one of the lances that gets out of alignment with the other lances during either an insertion or retraction operation.

The hose clamping pressure, or force may be created and managed as above described. Alternatively, the hose position sensing may be accomplished using a separate assembly in the tractor housing using a spring biased set of follower rollers and position sensors rather than the set specifically as above described.

The handheld controller 1000 may be shaped differently than as is shown in FIGS. 28-34. The embodiment illustrated is merely one exemplary configuration. The controller 1000 may be configured with a memory to store and recall a plurality of maps of various tube sheet configurations and layouts such that operation of the sensor head(s) 150 can be utilized more as an assist to help generate a map. The control box 108 may not be or may not include a hand held controller 1000. The connections between the control box 108 or hand held controller 1000 and the tumble Box 104 may be via wireless communication such as via Bluetooth. The present disclosure describes a guide assembly 106 with three guide tubes. However, a set of five guide tubes or one single guide tube may be used instead of three guide tubes. Regarding the arrangement of receive coils 132 on PCBs 152, in addition to the options shown above, the annular PCB 152 containing the receive coils 132 may be divided in to two symmetrical C-shaped portions. Each C-shaped portion may be mounted to one end of the three guide tubes 122. This configuration of PCBs 152 can accommodate smaller pitches in the tube sheets 200. Furthermore, while three AC pulse sensors 150 are described herein, other embodiments may be configured to utilize only one, on only one guide tube 122, or may be configured to utilize one on each of the outer guide tubes 122.

The apparatus 100 described above includes an X/Y positioner frame 104. However, other configurations of such a smart drive positioner are also within the scope of the present disclosure. For example, a positioner that essentially utilizes a rotator fastened to one side or edge of the tube sheet 102 and having an extensible arm that radially extends from the rotator, and carries the smart tractor drive apparatus 102 along the arm could also be utilized in accordance with the present disclosure. In such an alternative, the controller 1000 would be essentially the same, except that the joystick 1016 right tilt would simply rotate the rotator clockwise, the left tilt would simply rotate the rotator counterclockwise, and the forward and rearward tilt would move the smart tractor drive apparatus 102 along the arm. The conversion between X/Y coordinates and essentially polar coordinates is a simple mathematical calculation and easily accomplished in software for use in such an arrangement.

Figure 45:
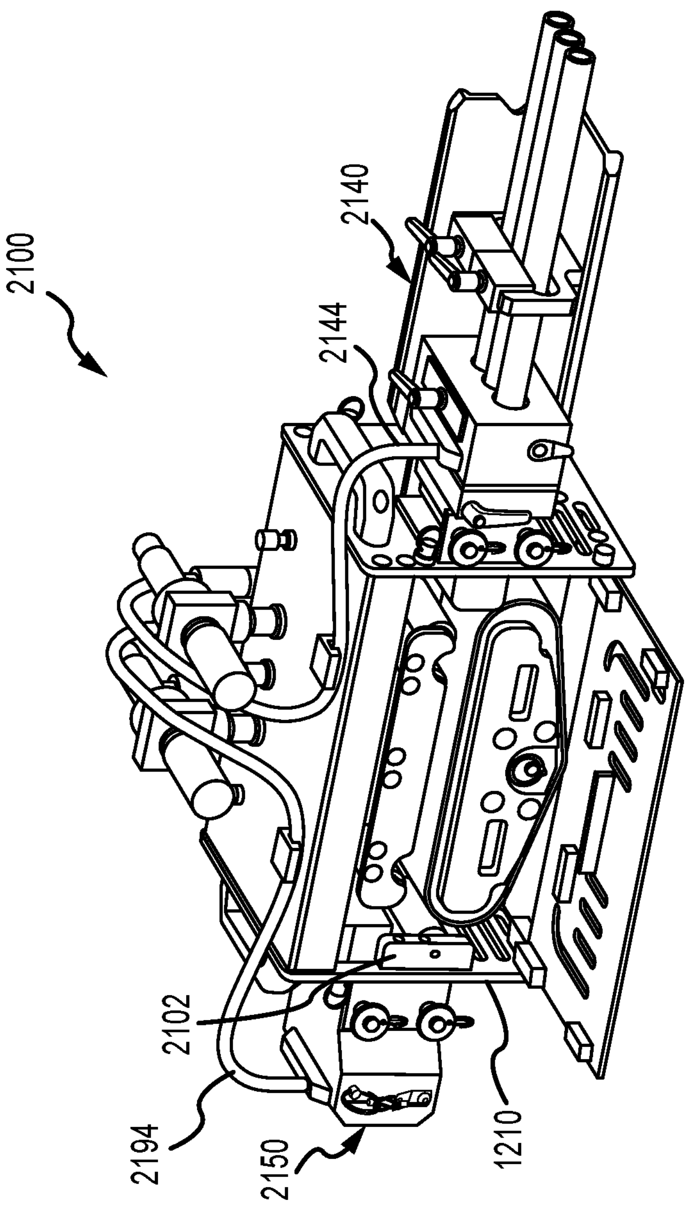
FIG. 45 is a side perspective view of an alternative embodiment of a smart tractor apparatus in accordance with the present disclosure.

FIGS. 45-51 illustrate another embodiment of a smart tractor drive apparatus 2100 similar to the smart tractor drive apparatus 1200 described above. FIG. 45 shows a side perspective view of the tractor drive apparatus 2100. The smart tractor drive apparatus 2100 is the same as the apparatus 1200 except that apparatus 2100 has a separate lance position assembly 2102 that is fastened to the inlet, i.e. rear wall, end plate 1210 instead of utilizing one of the follower roller sets 1280 described above and shown in FIG. 38. The apparatus 2100 also has a lance guide tube and collet and hose stop assembly 2140 similar to assembly 106, except that in assembly 2140, the collet and stop assembly includes a removable stop assembly detector 2144. The drive apparatus 2100 also has a rear hose stop block assembly 2150 that utilizes another removable stop detector 2144 in the hose stop block 2150 described further below.

Figure 46:
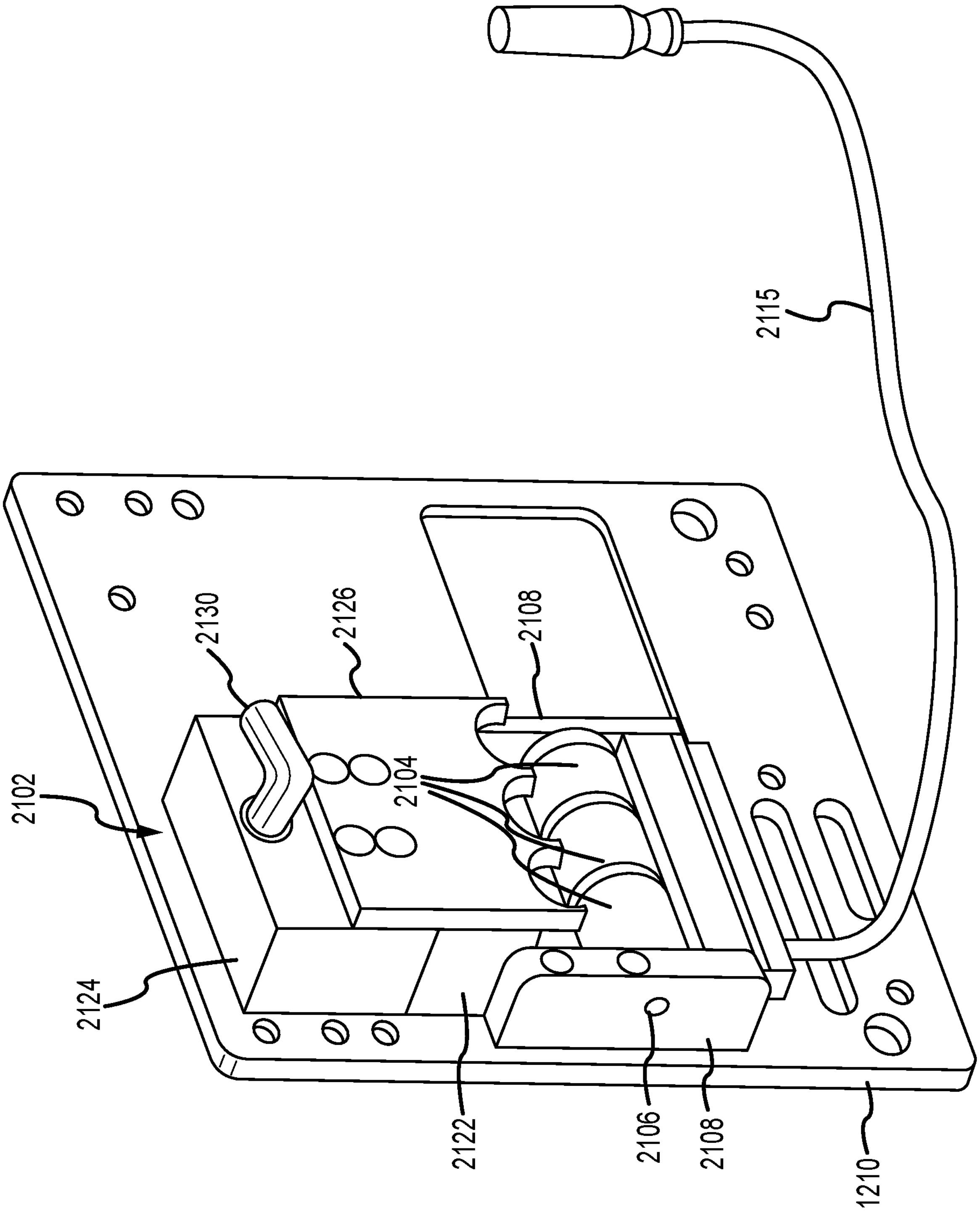
FIG. 46 is a separate perspective view of the lance position assembly fastened to the inlet wall of the smart tractor apparatus shown in FIG. 45.
Figure 47:
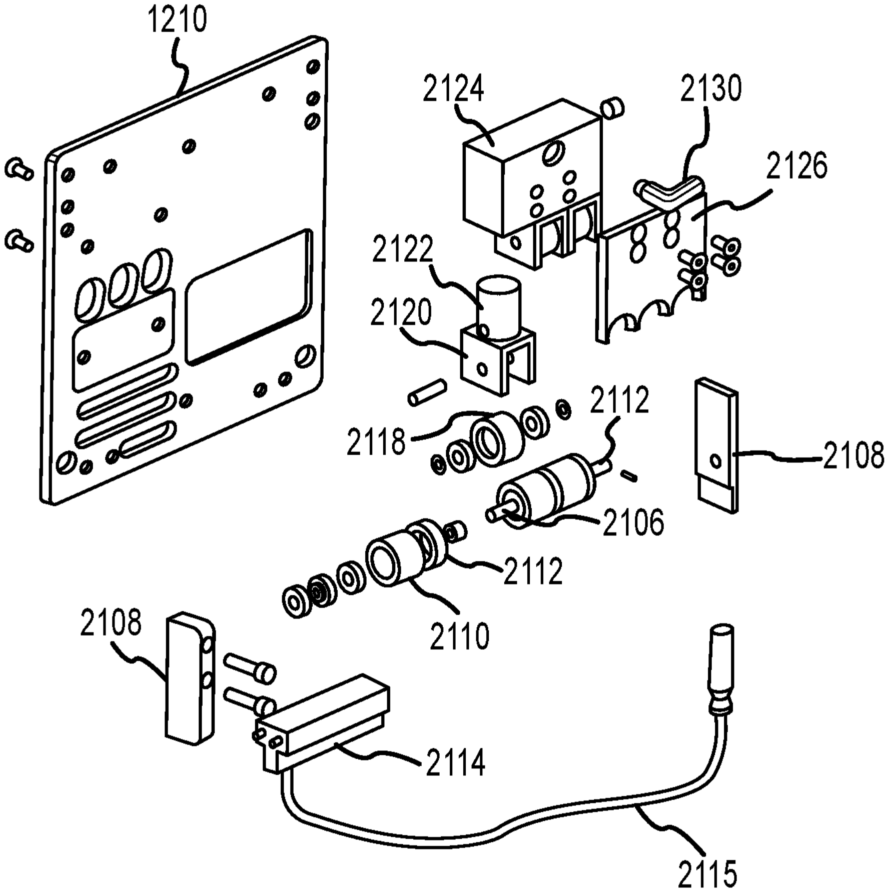
FIG. 47 is a partially exploded perspective view of the lance position assembly shown in FIG. 46.

A separate perspective view of the lance position assembly 2102 mounted on the rear wall 1210 of the tractor drive 2100 is shown in FIG. 46 and an exploded view is shown in FIG. 47. Lance position assembly 2102 includes a set of three sensor rollers 2104 ganged together on a common axle 2106 supported between two side plates 2108 that are fastened to the inlet end plate 1210 so as be in line with the three openings through the end plate 1210 through which the lances 101 pass. Each sensor roller 2104 includes a knurled polymeric roller portion 2110 and a magnetic multipole ring portion 2112 fastened together on bearings for rotation about the common axle 2106 fixed between the side plates 2108. An elongated encapsulated and environmentally sealed lance position sensor module 2114 is fastened between the side plates 2108 beneath the roller sensors 2104.

Each multipole ring portion 2112 has a radially arranged series of alternating polarity magnetic poles arranged such that the outer periphery of the multipole ring has alternating north and south poles therearound. Thus, as the ring portion rotates with the knurled polymeric roller portion 2110, a magnetic sensor placed adjacent the ring portion will sense the transitions between the alternating polarities. In one exemplary embodiment there are 24 magnets within the ring portion. This translates to 0.0654 inches of lance travel per count/transition.

Each of the transitions is sensed by a detector coil in the magnetic sensor module 2114 and the sensed transitions are sent via cable 2115 through the drive 2100 ultimately to the controller 1000 for processing in the same manner as previously described above. The magnetic sensor module 2114 is an environmentally sealed and encapsulated unit that is replaceable as needed by separation of one of the side plates 2108 bolted to the rear wall 1210 of the tractor drive 2100.

Mounted directly above the sensor rollers 2104 is an array of independently suspended pneumatically loaded idler rollers 2118. Each idler roller 2118 is carried in a pneumatically pressurized yoke 2120. Each yoke 2120 has a piston stem 2122 carried within piston cap 2124 fastened to the end plate 1210. The piston cap 2124 is essentially a solid block body with a common cavity communicating with three parallel bores each supporting one of the piston stems 2122 therein. A clamp pressure system fitting 2130 supplies pneumatic pressure from the idler clamp system circuit through the common cavity and each of the piston stems 2122 to the idler rollers 2118 to maintain each of the idler rollers 2118 firmly in contact with each lance hose 167 passing into and through the tractor drive 2100 such that each hose 167 is in constant engagement with its sensor roller 2104. In this way, the actual lance travel position for each lance 101 is monitored and tracked for comparison to each other lance. The individual lance positions are then compared to each other to determine various parameters such as lance to lance position mismatch, total lance travel through the heat exchanger tube, occurrence of any blockage or slippage, etc. or excessive resistance to nozzle/hose travel during operation. A rapid reversal event is also sensed which would indicate an unsafe condition. The individual lance positions are also used for feed rate determination, controlling the autostroke function and tube blockage detection.

Each idler roller portion 2118 is preferably knurled or roughened to ensure precise contact with the lance hose 167. During drive operation, the lance hoses 167 may become slippery. The knurling helps ensure that the lance position sensing remains accurate during other than optimal operational conditions.

An idler roller yoke guide plate 2126 fastened to the piston cap 2124 guides vertical extension and retraction of the idler rollers 2118 and has three guide notches or cutouts for guiding the flexible lances 101 as they are inserted into and through the tractor drive 2100. This guide plate 2126 also ensures that the flexible lances remain aligned with their respective idler rollers 2118 when less that 3 lances are driven by the tractor drive 2100.

Figure 48:
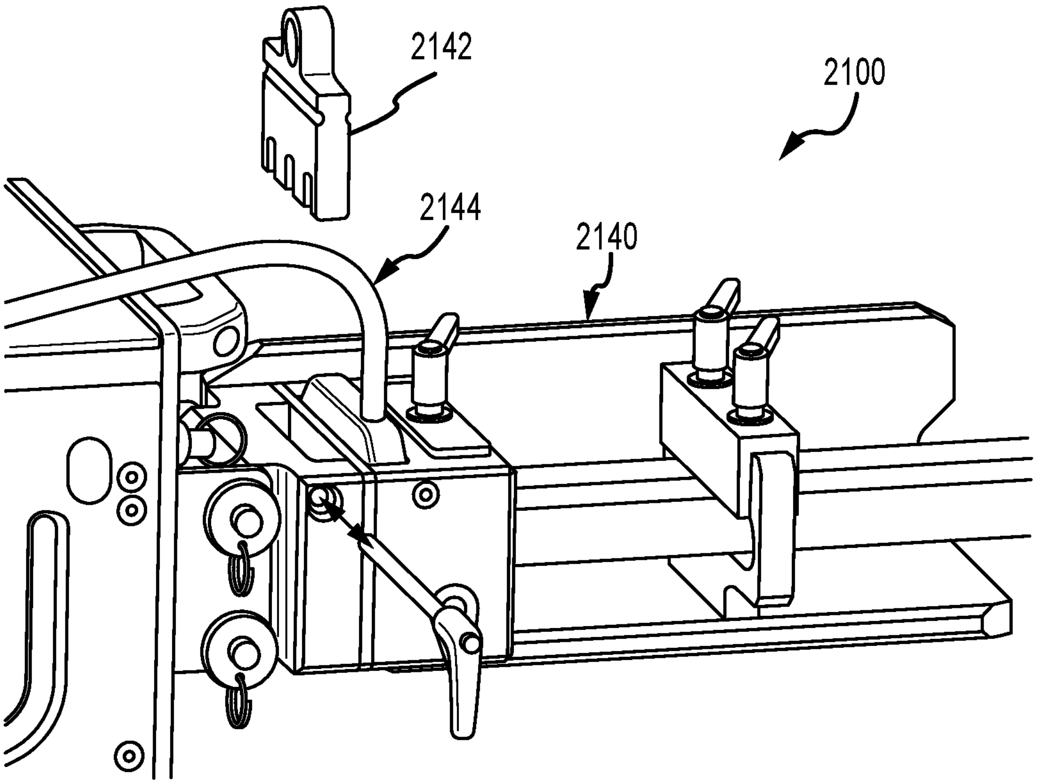
FIG. 48 is a partial front perspective view of the smart tractor apparatus shown in FIG. 45 showing the front hose stop and stop collet assembly.
Figure 49:
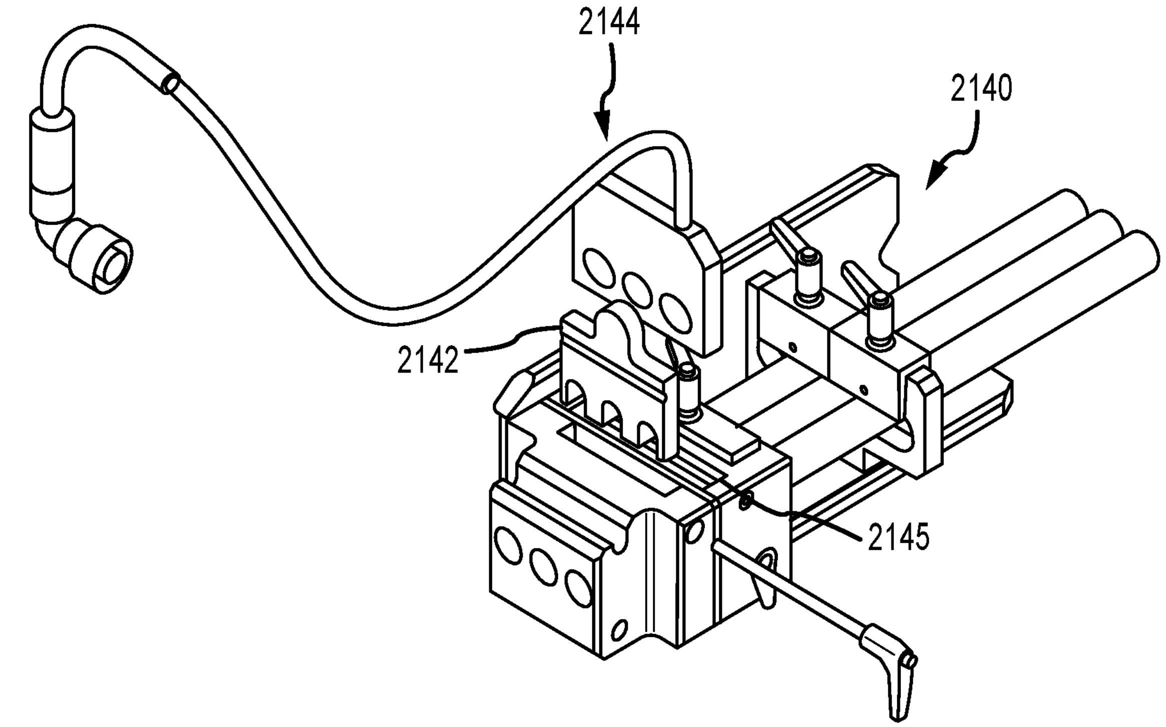
FIG. 49 is a separate rear perspective view of the hose guide assembly shown in FIG. 48 with the hose stop sensor and stop collet separated from the hose guide assembly.

FIG. 48 is a partial perspective view of the front end of the tractor drive apparatus 2100 which is fastened to a flexible lance guide tube assembly 2140. This guide tube assembly 2140 is similar to assembly 106 shown in FIG. 7 which is fastened to the X-Y positioner frame 104 adjacent, for example, a tube sheet 200 as above described and shown in FIG. 10. Guide tube assembly 2140, shown separately in FIG. 49, includes a removable collet 2142 and a removable hose crimp and stop sensor module 2144.

The crimp and stop sensor module 2144 senses the presence or absence of metal present within any one of the three bores therethrough. The distal end of the flexible lance hose 167 is fitted with a threaded fitting to which a nozzle 105 is attached before the flexible lance 101 is inserted into the tractor drive apparatus 2100. The rear half inch or so of this threaded fitting is a metal crimp to retain the end of the flexible lance hose 167 to the threaded fitting.

When one, two or three flexible lances 101 are threaded into and through the tractor drive assembly 2100, the removable hose crimp and stop sensor module 2144 must already be installed in its complementary slot 2145. However, the collet 2142 must be temporarily removed to permit passage of the end of the flexible lance carrying a nozzle (not shown). Once the lance hoses are inserted through the assembly 2100 the collet 2142 is installed to prevent inadvertent rearward passage of the crimp and nozzle 105 of a lance 101 back through the guide tubes in the event of a catastrophic lance failure.

Figure 50:
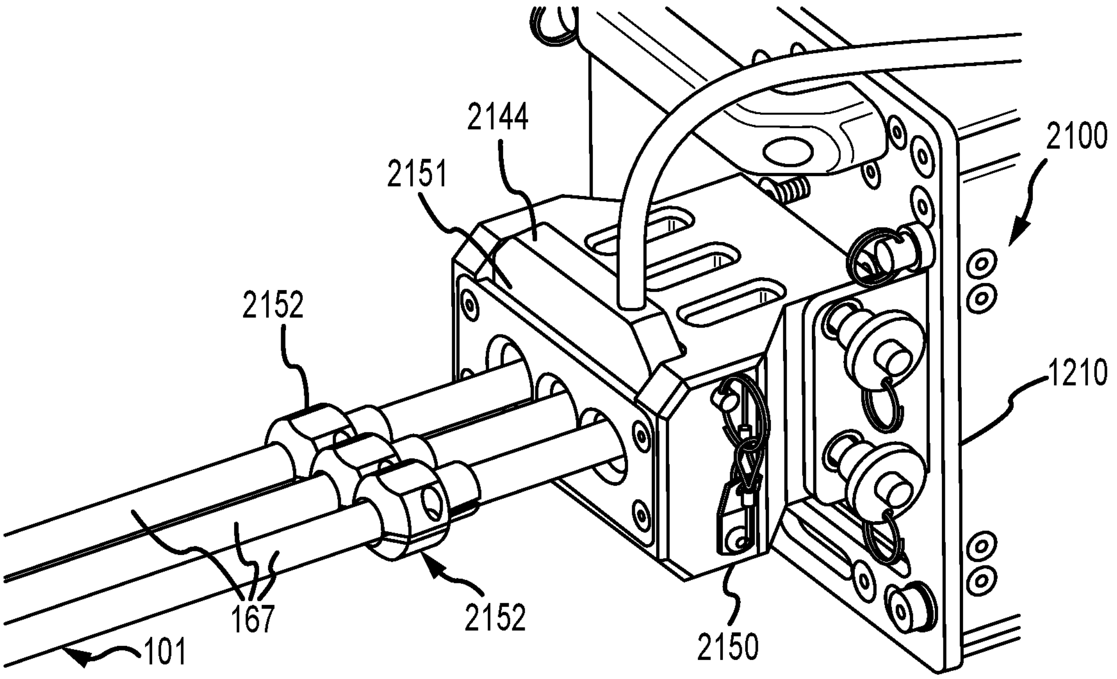
FIG. 50 is a rear perspective view of the smart tractor apparatus shown in FIG. 45 with the flexible lances in the tractor apparatus showing the hose stops in accordance with the present disclosure.

FIG. 50 is an enlarged partial rear view of the tractor drive apparatus 2100 showing three lances 101 installed through the rear stop block 2150 of the drive apparatus 2100. This rear stop block 2150 is similar to the rear encoder block 160 shown in FIG. 8 except that the lance position assembly 2102 replaces the lance position system previously described with reference to FIGS. 8 and 9. The rear stop block 2150 receives and holds a replaceable stop sensor module 2144 in a complementary slot 2151. This stop sensor module 2144 has three bores each through which one of the flexible lances 101 is fed.

Figure 51:
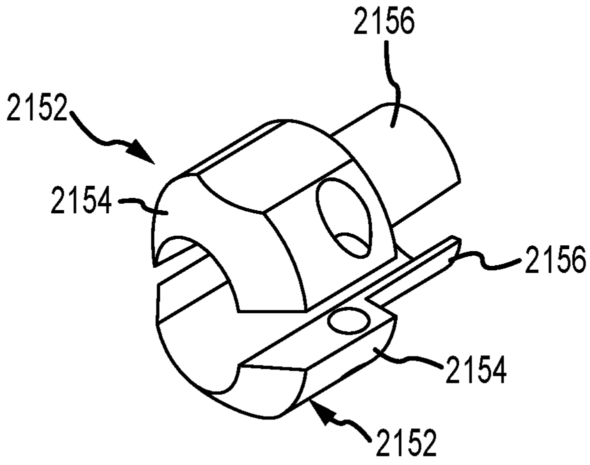
FIG. 51 is a longitudinal cross-sectional view of one of the unique hose stops in accordance with the present disclosure.

Each flexible lance 101 is fitted with a unique stop element 2152 in accordance with this disclosure to indicate full travel of the lance 101 through the target tube, e.g. tube 202. A separate perspective view of one stop element 2152 is shown in FIG. 51. Each stop element 2152 has an enlarged external diameter cylindrical stop portion 2154 shaped similar to a football such that it cannot pass into the tractor drive 2100, and a narrow shoulder extension portion 2156 that extends axially from a shoulder of the cylindrical stop portion of the stop element. This unique stop element 2152 is preferably made of a magnetically permeable metal and is fastened to each lance hose 167 at a user determined hose position to signal full passage of the lance 101 through the target such as a heat exchanger tube 202.

Each of the stop elements 2152 is made in two clamshell identical halves that are fastened together via two threaded fasteners through the cylindrical stop portion 2154, and grips the lance hose 167 therebetween. The narrow shoulder extension portion 2156 has an outer diameter sized to fit into the rear stop block 2150 and through one of the bores though stop sensor module 2144. The narrow shoulder portion 2156 also preferably has an outer diameter matching that of the crimp on the flexible lance hose end fitting 105 and is made of metal.

A hose crimp and stop sensor module 2144 may be interchanged between installation in the stop block 2150 or the front guide tube assembly 2140 as these sensor modules are identical. Each module 2144 is preferably sized to accommodate all anticipated lance hoses, e.g., from 3/2 to 8/4 lance hoses. This is limited by the through hole diameter for the largest size and smallest practical lance size for which the tractor drive is rated.

Many changes may be made to any one of the components of system 100 and/or the tractor drive apparatus 1200 and 2100 described above which will become apparent to one reading the above disclosure. All such changes, alternatives and equivalents in accordance with the features and benefits described herein, are within the scope of the present disclosure. Such changes and alternatives may be introduced without departing from the spirit and broad scope of our disclosure as defined by the claims below and their equivalents.

What is claimed is:

1. A flexible lance tractor drive apparatus comprising:
- a housing;
- a drive motor sensor coupled with at least one drive motor in the housing, wherein the drive motor sensor is configured to determine a first position of at least one flexible hose based on rotation of the at least one drive motor as it provides a driving force to convey the at least one flexible hose; and
- a lance position assembly fastened to an end wall of the housing, the lance position assembly comprising:
  - a sensor roller having a roller portion adapted to engage at least one flexible lance hose passing through the housing and a magnetic ring portion; and
  - a magnetic sensor module operable to determine a second position of the at least one flexible hose based on magnetic field fluctuations in the sensor roller as the sensor roller moves along the at least one flexible lance hose, wherein conveyance of the at least one flexible hose is controlled based on the first position and the second position.

2. The flexible lance tractor drive apparatus according to claim 1 wherein the magnetic ring portion is a multipole magnetic ring.

3. The flexible lance tractor drive apparatus according to claim 2 wherein the lance position assembly includes an idler roller adapted to press against the at least one flexible lance hose to maintain the at least one flexible lance hose engaged with the sensor roller, and wherein the idler roller is pneumatically biased against the at least one flexible lance hose.

4. The flexible lance tractor drive apparatus according to claim 1 further comprising the lance position assembly including a second sensor roller for engaging a second flexible lance hose, the second sensor roller having a second magnetic ring portion, and a second idler roller adapted to press against the second flexible lance hose to maintain the second flexible lance hose engaged with the second sensor roller.

5. The flexible lance tractor drive apparatus according to claim 4 further comprising the lance position assembly including a third sensor roller for engaging a third flexible lance hose, the third sensor roller having a third magnetic ring portion, and a third idler roller adapted to press against the third flexible lance hose to maintain the third flexible lance hose engaged with the third sensor roller.

6. The flexible lance tractor drive apparatus according to claim 5 wherein the magnetic sensor module is operable to separately sense magnetic field fluctuations in the magnetic ring portion, the second magnetic ring portion and the third magnetic ring portion as the sensor roller, the second sensor roller, and the third sensor roller each roll along each respective flexible lance hose.

7. The flexible lance tractor drive apparatus according to claim 4 wherein the magnetic sensor module sends sensed separate magnetic field fluctuation signals to a hand held controller for processing.

8. The flexible lance tractor drive apparatus according to claim 7, further comprising:

at least one drive motor having a drive axle in the housing carrying a cylindrical drive roller;

a plurality of cylindrical guide rollers on fixed axles aligned parallel to the cylindrical drive roller;

an endless belt wrapped around the cylindrical drive roller and the plurality of cylindrical guide rollers; and a bias member supporting a plurality of follower rollers each aligned above one of the cylindrical drive roller or one of the plurality of cylindrical guide rollers, wherein the bias member is operable to press each follower roller toward one of the cylindrical drive roller or one of the plurality of cylindrical guide rollers to frictionally grip at least one flexible lance hose when the at least one flexible lance hose is sandwiched between the plurality of follower rollers and the endless belt.

9. The flexible lance tractor drive apparatus according to claim 8 wherein the first position is determined based on direction and speed of the at least one drive motor, and wherein the drive motor sensor is configured to send a motor direction and speed signal to the hand held controller.

10. The flexible lance tractor drive apparatus according to claim 9 further comprising the hand held controller having a comparator for comparing the motor direction and speed signal with the separate magnetic field fluctuation signals from the magnetic sensor module to determine whether there is a mismatch between motor speed and lance position to identify belt slippage.

11. The flexible lance tractor drive apparatus according to claim 10 further comprising the comparator in the hand held controller being configured to send a signal to increase clamp pressure if the mismatch exceeds a predetermined amount.

12. The flexible lance tractor drive apparatus according to claim 10 wherein the comparator in the hand held controller sets a flag if clamp pressure cannot be increased.

13. The flexible lance tractor drive apparatus according to claim 11 wherein the comparator is configured to send a signal to increase clamp pressure by a predetermined increment if the mismatch exceeds the predetermined amount.

14. The flexible lance tractor drive apparatus according to claim 13 wherein the predetermined increment is 2 psi.

15. A controller for controlling a flexible lance tractor drive apparatus, the controller comprising:

memory storing instructions;

a processor communicatively coupled to the memory, wherein the processor executes the instructions to cause the controller to:

control conveyance of at least one flexible hose based on a first position of at least one flexible hose and a second position of the at least one flexible hose, wherein the first position is determined from rotation of at least one drive motor of the flexible lance tractor drive apparatus, and wherein the second position of the at least one flexible lance hose is determined from magnetic field fluctuations of a sensor roller of the flexible lance tractor drive apparatus as the sensor roller moves along the at least one flexible lance hose.

16. The controller according to claim 15, wherein the processor is communicatively coupled with at least one comparator providing an input based on the first position and the second position, and wherein the processor controls conveyance of the at least one flexible hose based on the input.

17. The controller according to claim 15, wherein the processor is communicatively coupled with a motor sensor of the flexible lance tractor drive and a magnetic sensor module, and wherein the processor executes the instructions to:

determine a first position of at least one flexible hose based on rotation of at least one drive motor of the flexible lance tractor drive apparatus;

determine a second position of the at least one flexible lance hose based on magnetic field fluctuations of a sensor roller of the flexible lance tractor drive apparatus as the sensor roller moves along the at least one flexible lance hose; and determine whether there is a mismatch between the first position and the second position to identify belt slippage.

18. The controller according to claim 15, wherein the processor executes the instructions to cause the controller to send a signal to increase clamp pressure if a mismatch between the first position and the second position exceeds a predetermined amount.

19. The controller according to claim 15, wherein the processor executes the instructions to cause the controller to set a flag if clamp pressure cannot be increased.

20. The controller according to claim 15, wherein the processor executes the instructions to cause the controller to send a signal to increase clamp pressure by a predetermined increment if the mismatch exceeds a predetermined amount.

* * * * *